United States Patent [19]

Nakajima et al.

[11] Patent Number: 5,525,902
[45] Date of Patent: Jun. 11, 1996

[54] MAGNETIC TAPE STORAGE APPARATUS WRITING STATUS INFORMATION TO MAGNETIC TAPE INDICATING A TAPE ABNORMALITY

[75] Inventors: Toshiya Nakajima, Ebetsu; Jun Takayama, Tokyo; Akihiro Iseno, Yokohama, all of Japan

[73] Assignees: Fujitsu Limited, Japan; Sony Corporation, Japan

[21] Appl. No.: 318,353

[22] Filed: Oct. 5, 1994

Related U.S. Application Data

[62] Division of Ser. No. 851,413, Mar. 13, 1992, Pat. No. 5,384,673.

[30] Foreign Application Priority Data

| Mar. 15, 1991 | [JP] | Japan | 3-50929 |
| Mar. 15, 1991 | [JP] | Japan | 3-50930 |
| Mar. 15, 1991 | [JP] | Japan | 3-50931 |
| Mar. 15, 1991 | [JP] | Japan | 3-50932 |
| Mar. 15, 1991 | [JP] | Japan | 3-50933 |
| Mar. 15, 1991 | [JP] | Japan | 3-50934 |
| Apr. 24, 1991 | [JP] | Japan | 3-92531 |

[51] Int. Cl.$^6$ ................................................ G01R 33/12
[52] U.S. Cl. .................... 324/212; 360/72.1; 395/185.07
[58] Field of Search .............................. 324/212; 360/31, 360/71, 72.1; 369/53, 58; 371/13, 21.6; 395/185.06, 185.07

[56] References Cited

U.S. PATENT DOCUMENTS

| 2,937,368 | 5/1960 | Newby | 324/212 |
| 5,029,022 | 7/1991 | Odaka et al. | 360/48 |
| 5,081,548 | 1/1992 | Inazawa et al. | 360/72.2 |

FOREIGN PATENT DOCUMENTS

| 0272130 | 6/1988 | European Pat. Off. . |
| 0327188 | 8/1989 | European Pat. Off. . |
| 0386362 | 9/1990 | European Pat. Off. . |
| 54-87441 | 7/1979 | Japan . |
| 54-160105 | 12/1979 | Japan . |
| 57-69514 | 4/1982 | Japan . |
| 58-19714 | 2/1983 | Japan . |
| 61-222069 | 10/1986 | Japan . |
| 62-49434 | 3/1987 | Japan . |
| 2-240867 | 9/1990 | Japan . |
| 2-246075 | 10/1990 | Japan . |
| 2-281475 | 11/1990 | Japan . |
| 2-310878 | 12/1990 | Japan . |

OTHER PUBLICATIONS

Computer Technology Review, vol. 9, No. 14, Nov. 1989, Los Angeles, CA, U.S., "Data/Dat Format Provides RandomAccess Tape Option", Karina Lion, pp. 63–64, 66–67.

(List continued on next page.)

*Primary Examiner*—Walter E. Snow
*Attorney, Agent, or Firm*—Staas & Halsey

[57] ABSTRACT

Magnetic tape storage apparatus including a drive unit for writing/reading information on and from a magnetic tape using a rotary head (RH) by the helical scan method and a storage control unit for controlling the drive unit. The magnetic tape storage apparatus further includes a system area formed at a portion of the magnetic tape other than the user area where user data is recorded and is used only by the storage control unit, table read-out device for reading out management information tables relating to the magnetic tape, written in the system area, into a memory device in the storage control unit when the magnetic tape is loaded into the drive unit, table record device, while the storage control unit refers to data of the management information tables, for performing a write/read operation on the user area on the magnetic tape and for writing status information, indicating an abnormal termination of the writing or reading of the magnetic tape, to the management information tables at a header area located at a position after a beginning of the magnetic tape and before the user area, and judgement device for judging an existence of a tape abnormality by reading the status information from the magnetic tape when the magnetic tape is loaded into the drive unit.

5 Claims, 89 Drawing Sheets

OTHER PUBLICATIONS

Patent Abstracts of Japan, vol. 7, No. 138 (P–204)(1283) Jun. 16, 1983 & JP–A–58 053 004 (Tokyo Shibaura Denki K.K.) 29 Mar. 1983, *abstract*.

Patent Abstracts of Japan, vol. 10, No. 358 (P–522)(2415) Dec. 2, 1986 & JP–A–61 153 880 (Toshiba Corp.) 12 Jul. 1986, *abstract*.

IEEE Transactions on Consumer Electronics, vol. 32, No. 3, Aug. 1986, New York, U.S., "Format of Pre Recorded R–DAT Tape and Results of High Speed Duplication", Kentaro Odaka, Takehiro Nagaki and Norikazu Horikawa, pp. 433–440.

Computer Technology Review, vol. V, No. 4, Sep. 1985, Los Angeles, California, U.S., "The PC/T Tape Format Makes Data Backup Easier, More Reliable", Steve Henry and Mike Niquette, pp. 107–114.

Patent Abstracts of Japan, vol. 7, No. 262 (P–238)(1407) Nov. 22, 1983 & JP–A–58 143 408 (Fujitsu KK) 26 Aug. 1983, *abstract*.

IBM Technical Disclosure Bulletin, vol. 31, No. 11, Apr. 1989, Armonk, NY, U.S., "Emulation of ½" Tape Format For ¼ " Streaming Tape Drives", pp. 193–200.

Neues Aus Der Technik, No. 1, 15, Feb. 1990, Wurzburg, DE, "Das Aktualisieren des Inhaltsverzeichnisses auf dem Aufzeichnungstrager in einem DAT–Spieler", * the whole document*.

Computer Technolocy Review, vol. VI, No. 1, Dec. 1985, Los Angeles, California, U.S., "A Systems Solution to Read/Write Reliability Improves Tape Backup", Steve Henry and Mike Niquette, pp. 99–105.

| TAPE MARK FLAG INFORMATION | PHYSICAL NUMBER OF FIRST BLOCK | LOGICAL NUMBER OF FIRST BLOCK |
|---|---|---|
| TAPE MARK FLAG INFORMATION | PHYSICAL NUMBER OF SECOND BLOCK | LOGICAL NUMBER OF SECOND BLOCK |
| TAPE MARK FLAG INFORMATION | PHYSICAL NUMBER OF THIRD BLOCK | LOGICAL NUMBER OF THIRD BLOCK |
|  |  |  |

| PHYSICAL NUMBER OF FIRST TAPE MARK | LOGICAL NUMBER OF FIRST TAPE MARK |
|---|---|
| PHYSICAL NUMBER OF SECOND TAPE MARK | LOGICAL NUMBER OF SECOND TAPE MARK |
| PHYSICAL NUMBER OF THIRD TAPE MARK | LOGICAL NUMBER OF THIRD TAPE MARK |
|  |  |

| | | |
|---|---|---|
| TAPE MARK FLAG=0 | PHYSICAL BLOCK OF FIRST BLOCK | LOGICAL BLOCK OF FIRST BLOCK |
| TAPE MARK FLAG=0 | PHYSICAL BLOCK OF SECOND BLOCK | LOGICAL BLOCK OF SECOND BLOCK |
| TAPE MARK FLAG=0 | PHYSICAL BLOCK OF THIRD BLOCK | LOGICAL BLOCK OF THIRD BLOCK |
| TAPE MARK FLAG=1 | PHYSICAL BLOCK OF FOURTH BLOCK | LOGICAL BLOCK OF FOURTH BLOCK |
| TAPE MARK FLAG=0 | PHYSICAL BLOCK OF FIFTH BLOCK | LOGICAL BLOCK OF FIFTH BLOCK |
| ⋮ | ⋮ | ⋮ |

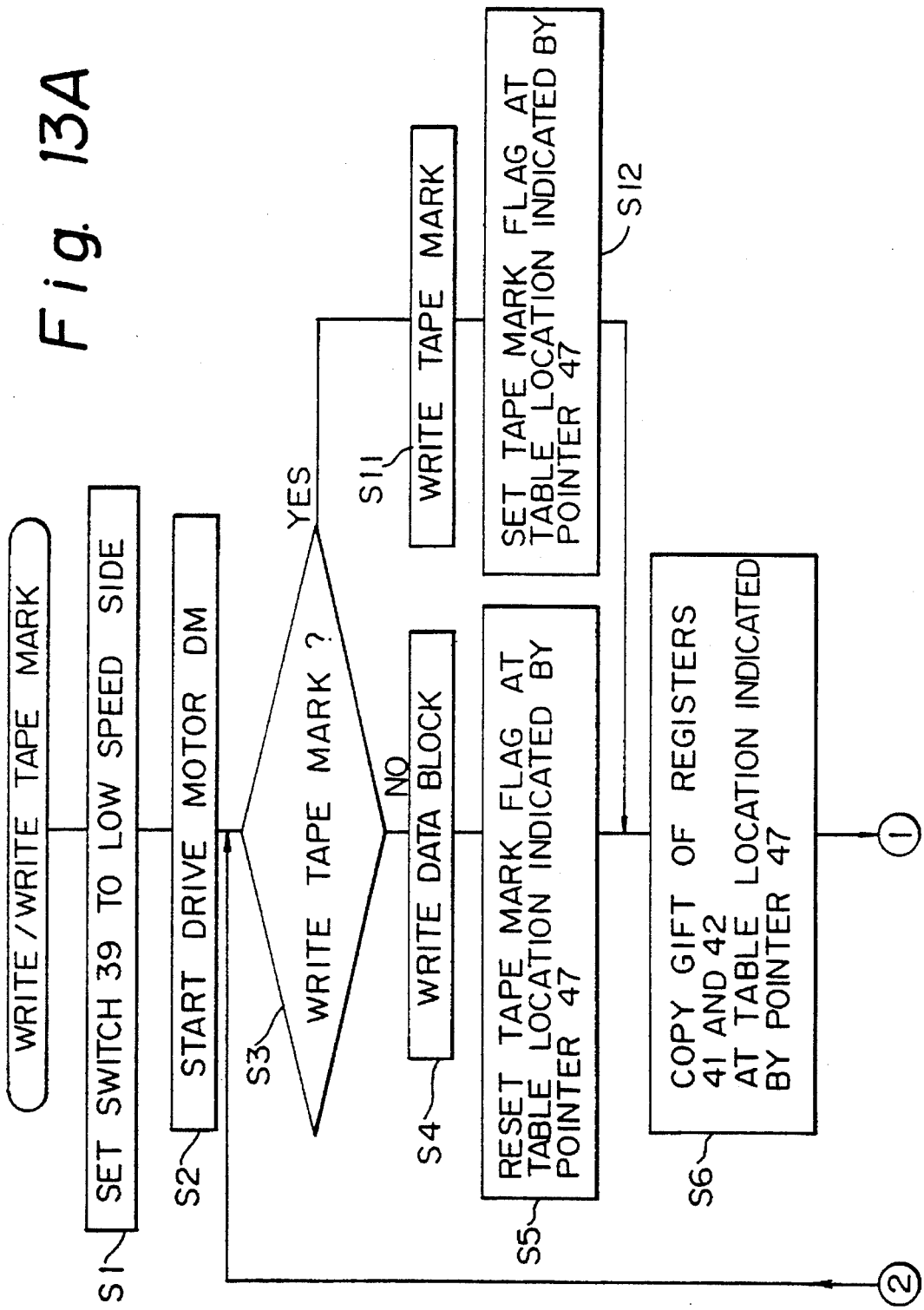

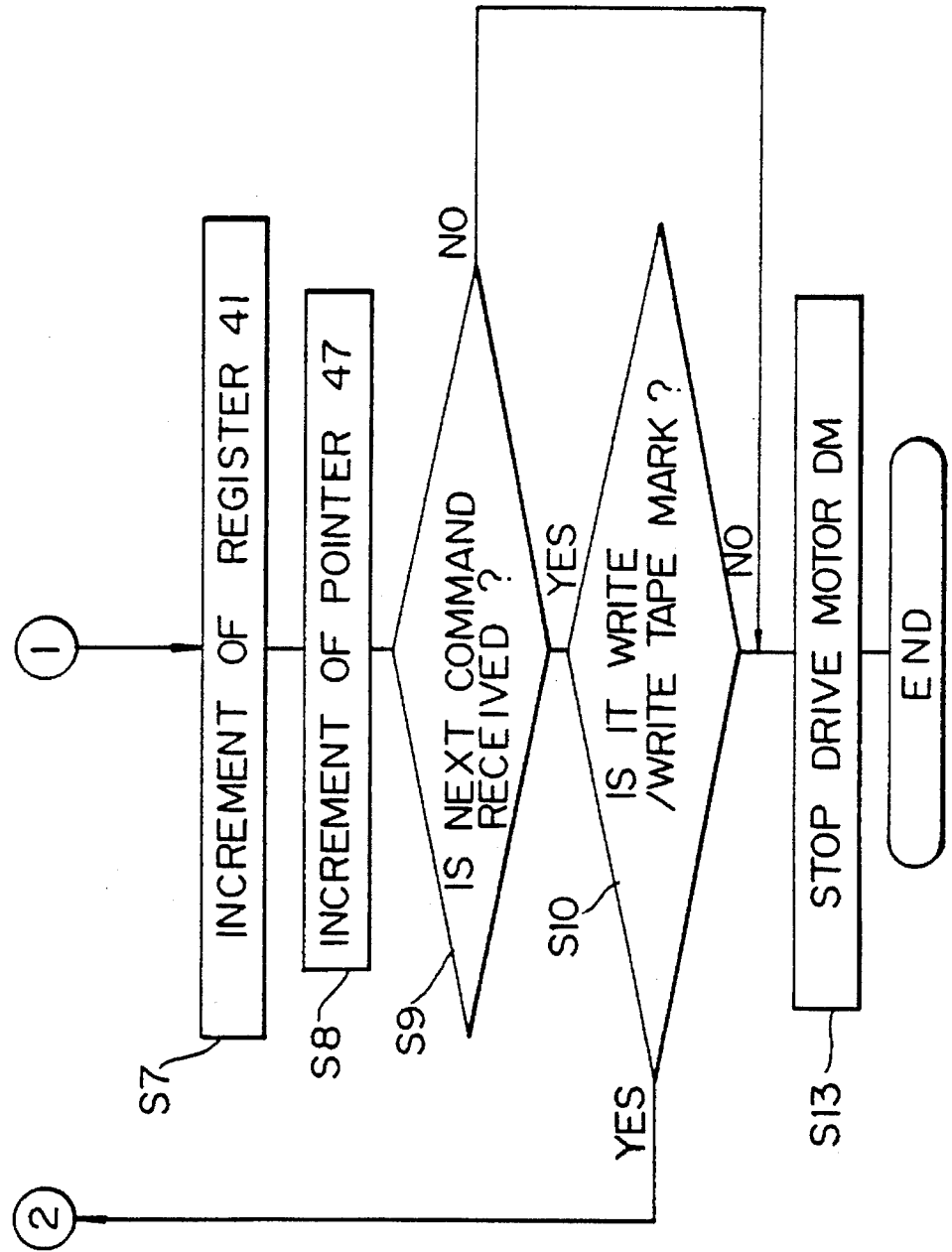

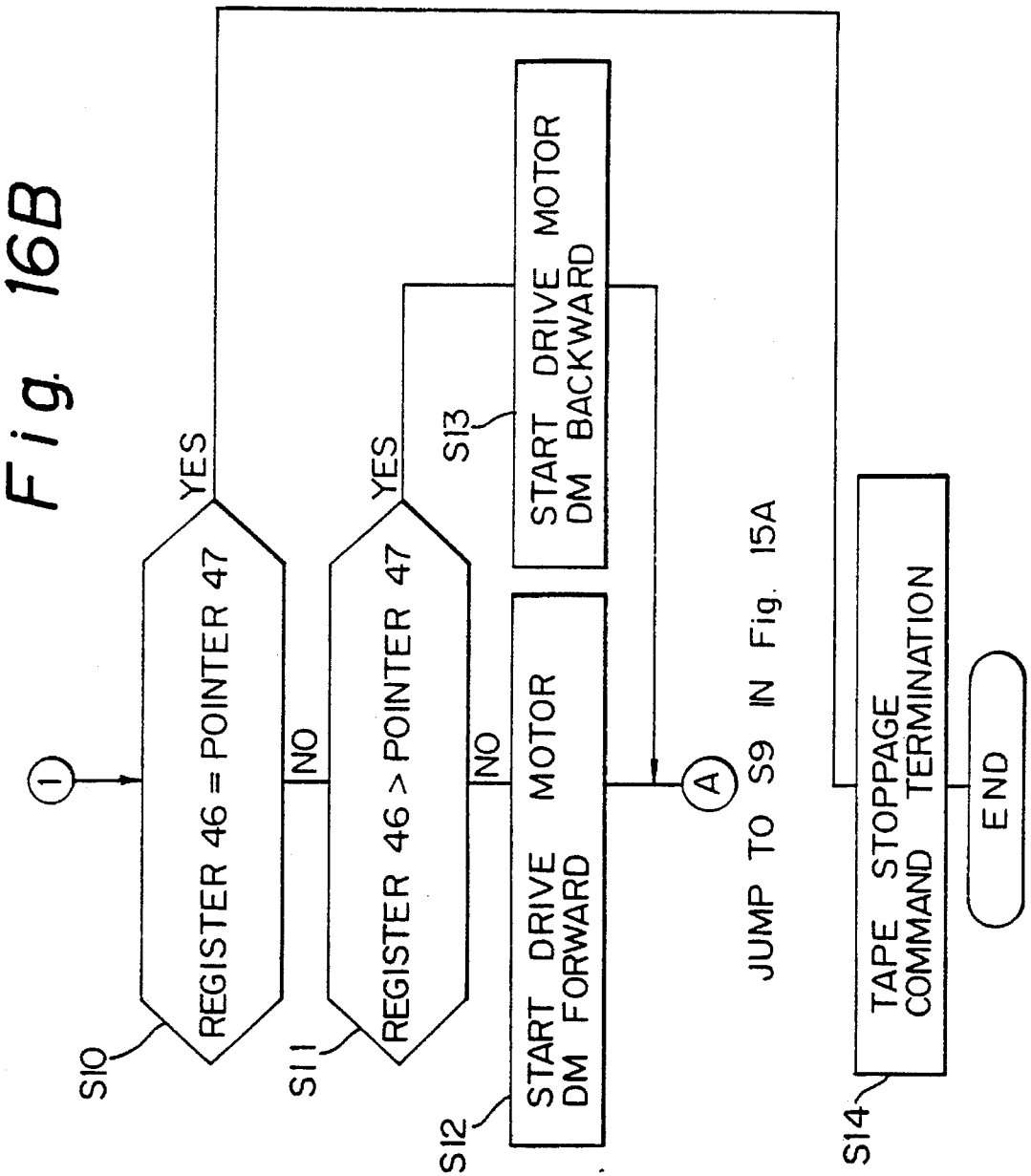

Fig. 17

| PHYSICAL BLOCK ID OF FIRST TAPE MARK | LOGICAL BLOCK ID OF FIRST TAPE MARK |
|---|---|
| PHYSICAL BLOCK ID OF SECOND TAPE MARK | LOGICAL BLOCK ID OF SECOND TAPE MARK |
| PHYSICAL BLOCK ID OF THIRD TAPE MARK | LOGICAL BLOCK ID OF THIRD TAPE MARK |
| ⋮ | ⋮ |

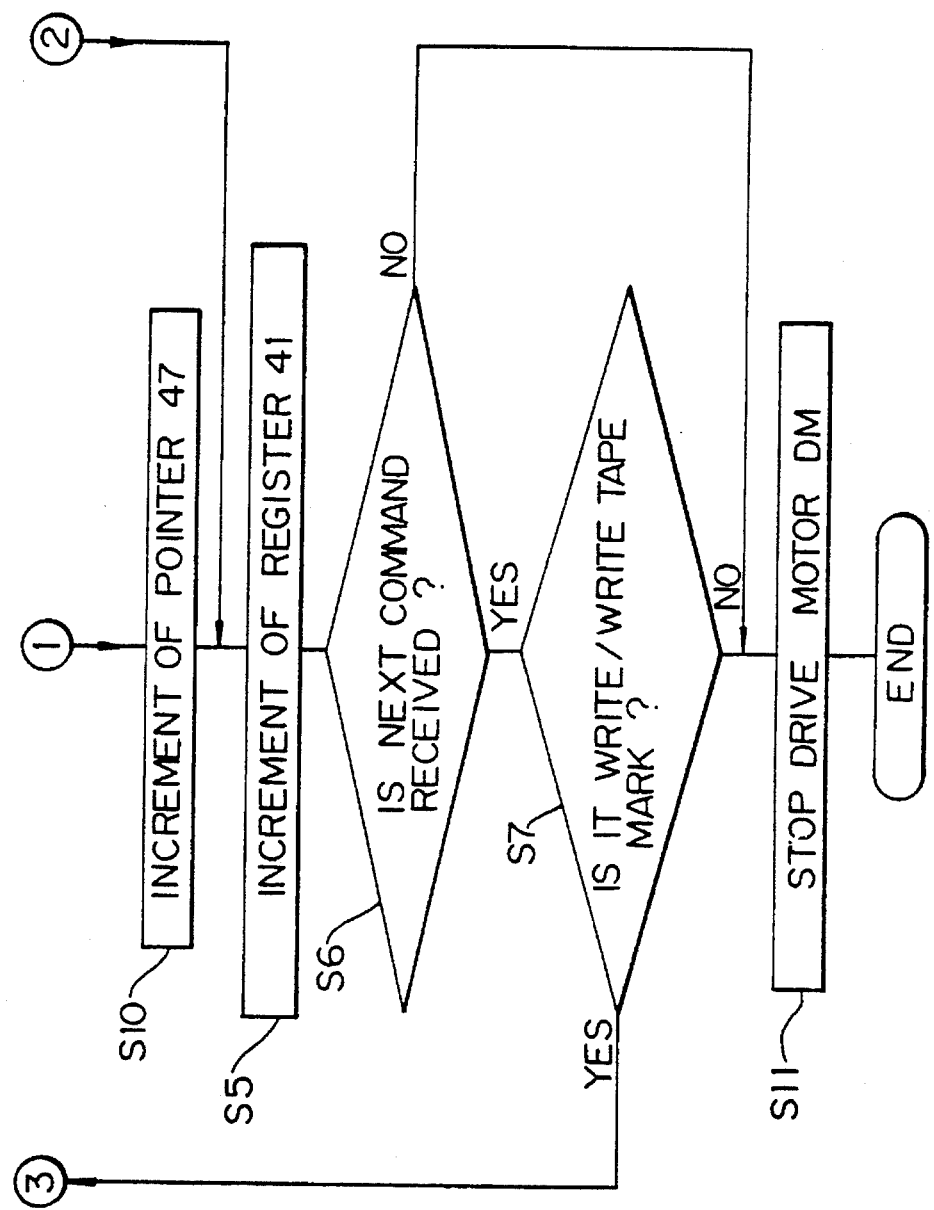

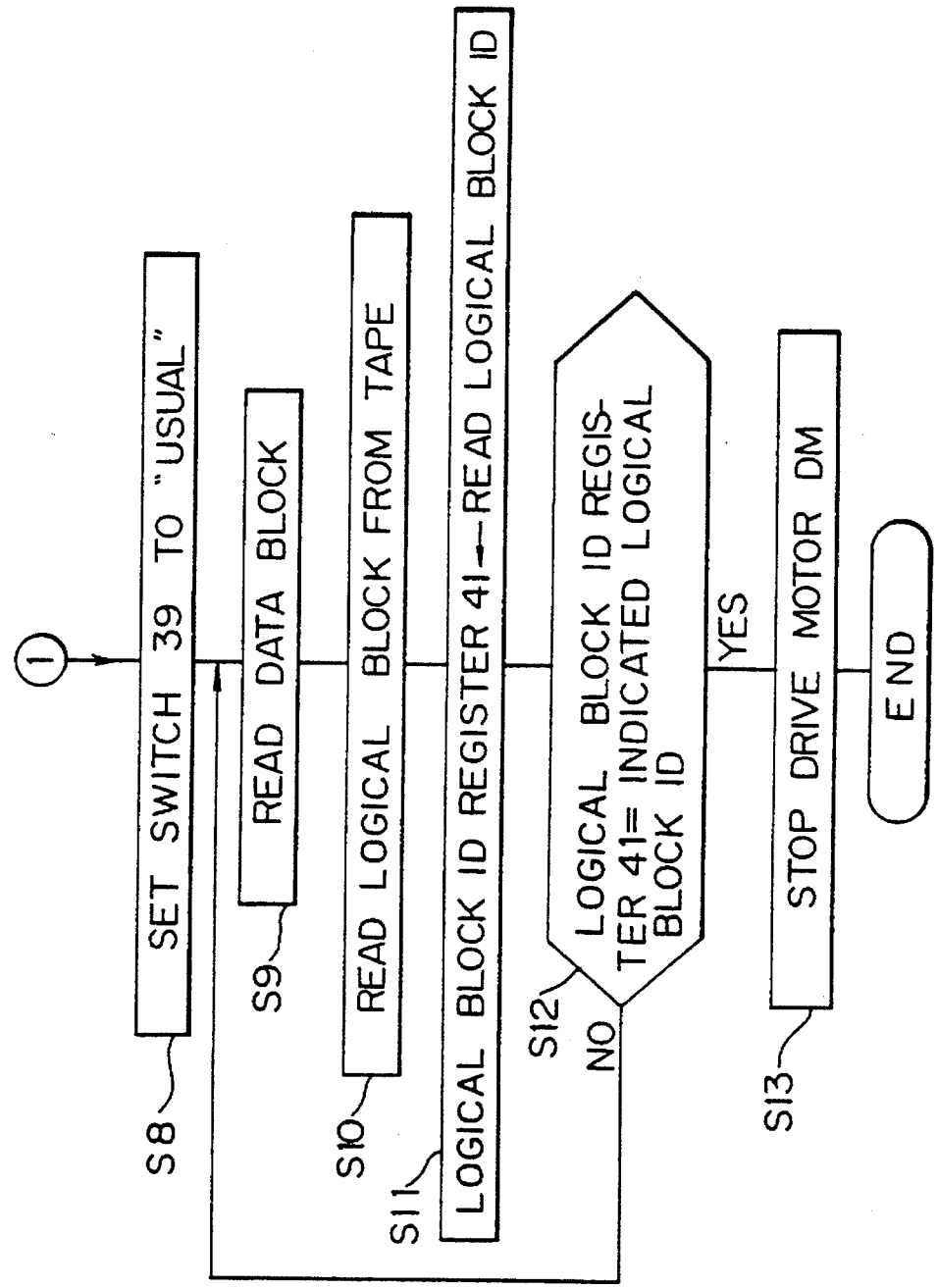

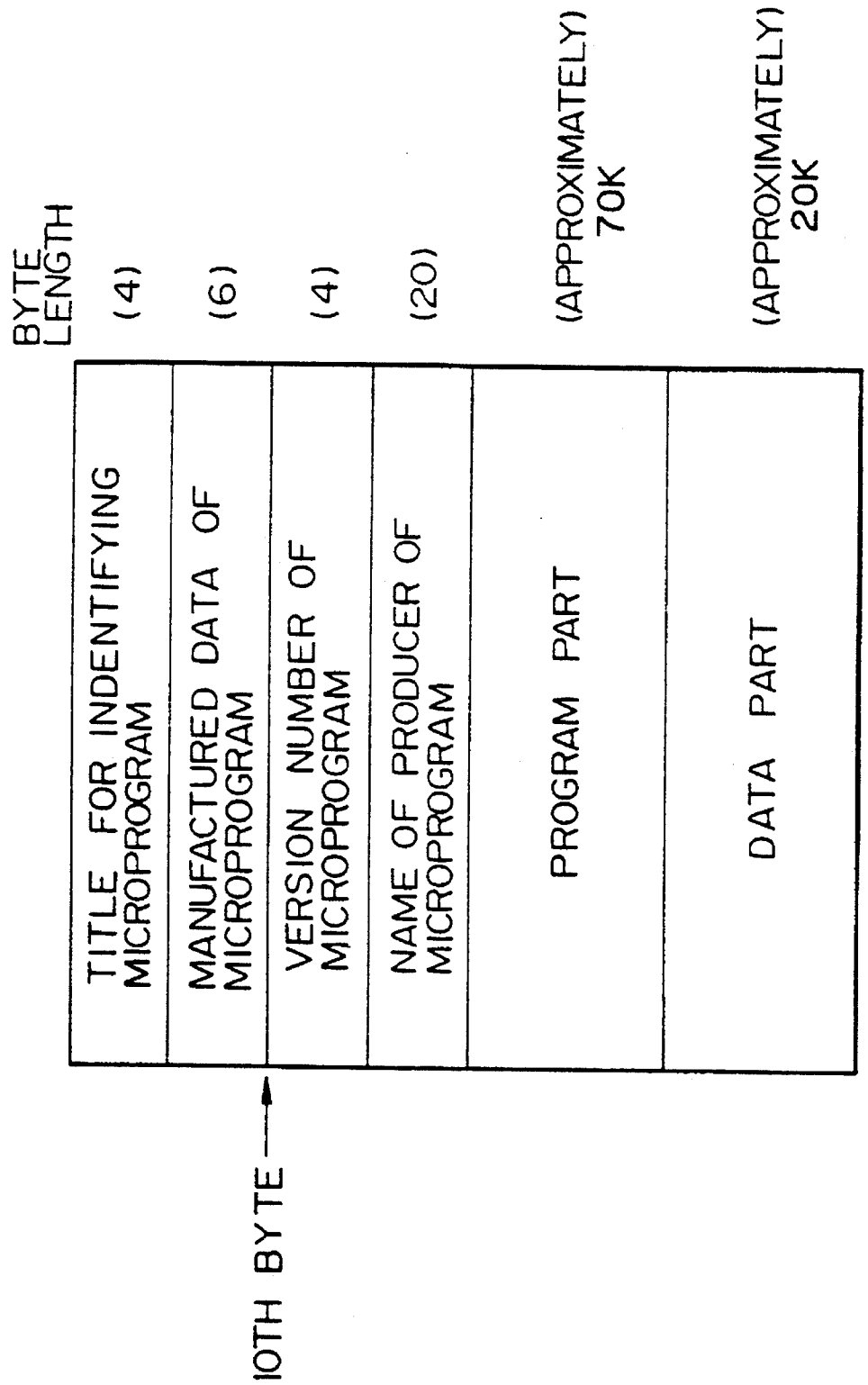

Fig. 33

| Field | BYTE LENGTH |
|---|---|
| SENSE IDENTIFICATION INFORMATION | (1) |
| INDICATION OF STATUS OF DRIVE UNIT | (3) |
| ERROR CODE | (1) |
| BLOCK ID | (4) |
| ERROR CODE QUALIFICATION INFORMATION | (6) |
| RECEIVED DRIVE COMMAND CODE | (1) |
| NUMBER OF DRIVE UNIT IN ERROR | (1) |
| (BLANK) | (3) |
| VERSION NUMBER OF DRIVE UNIT HARDWARE | (4) |
| VERSION NUMBER OF MICROPROGRAM OF DRIVE UNIT | (4) |
| MANUFACTURING NUMBER OF DRIVE UNIT | (4) |

20TH BYTE ⟵ (marker at VERSION NUMBER OF DRIVE UNIT HARDWARE)

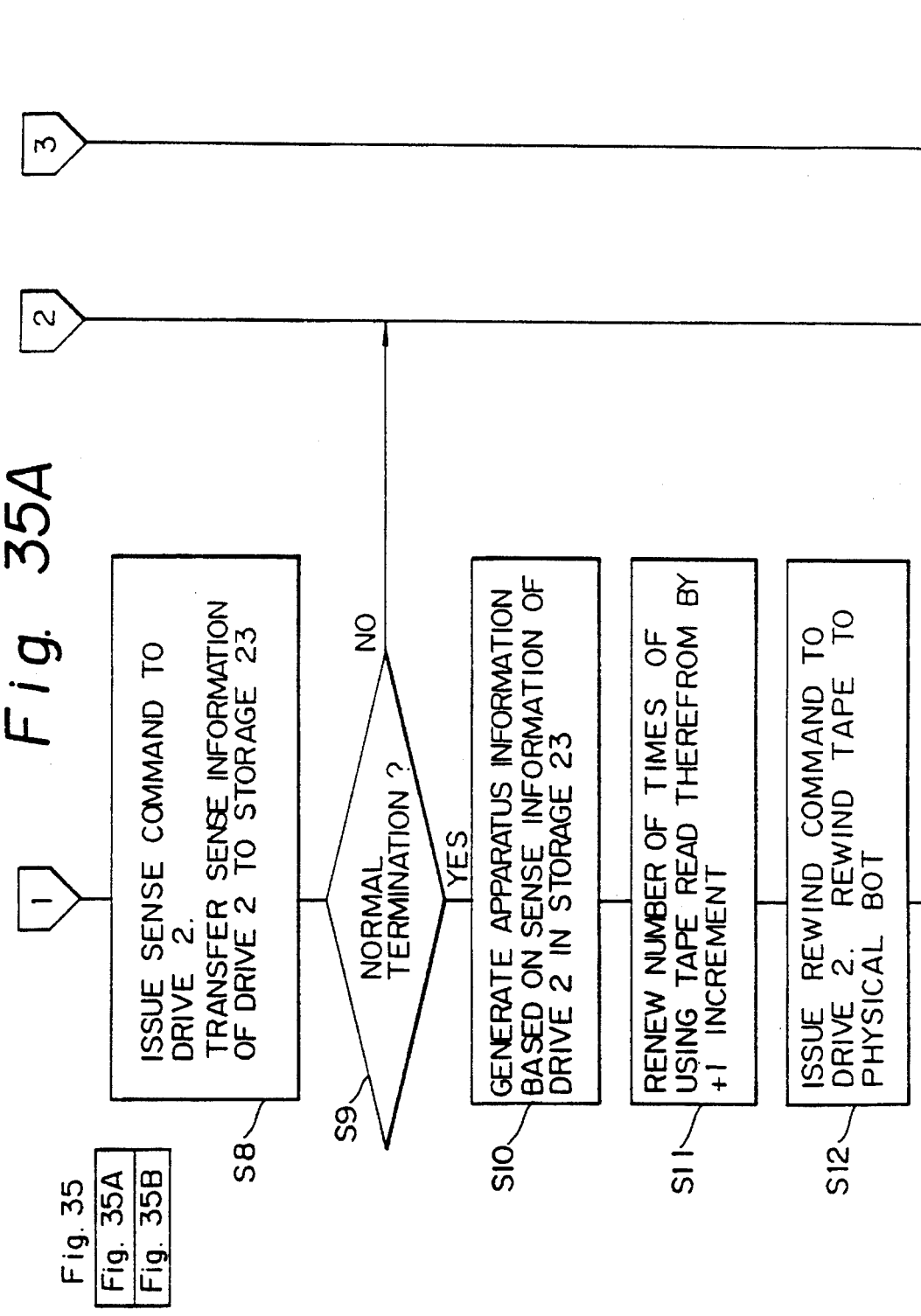

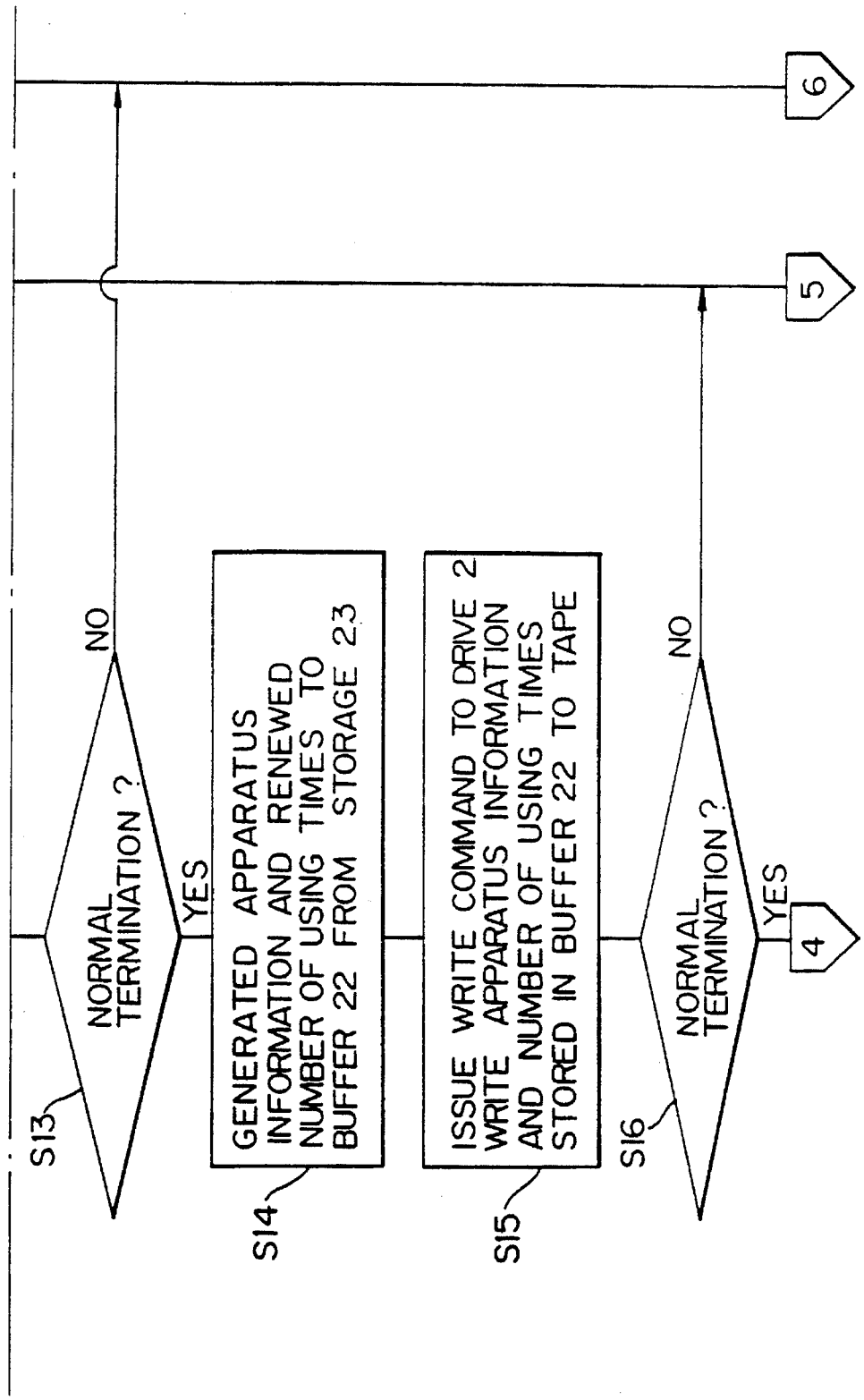

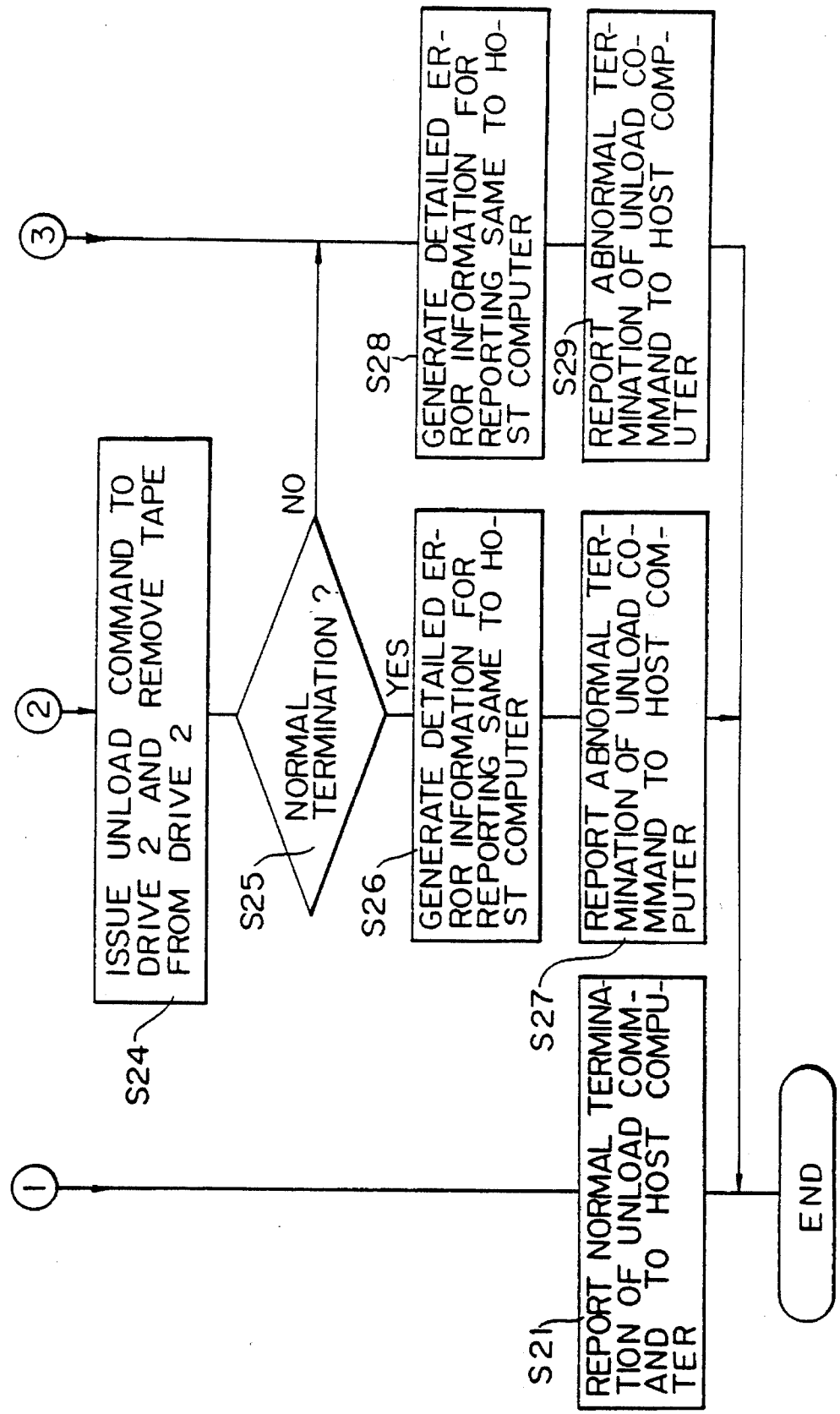

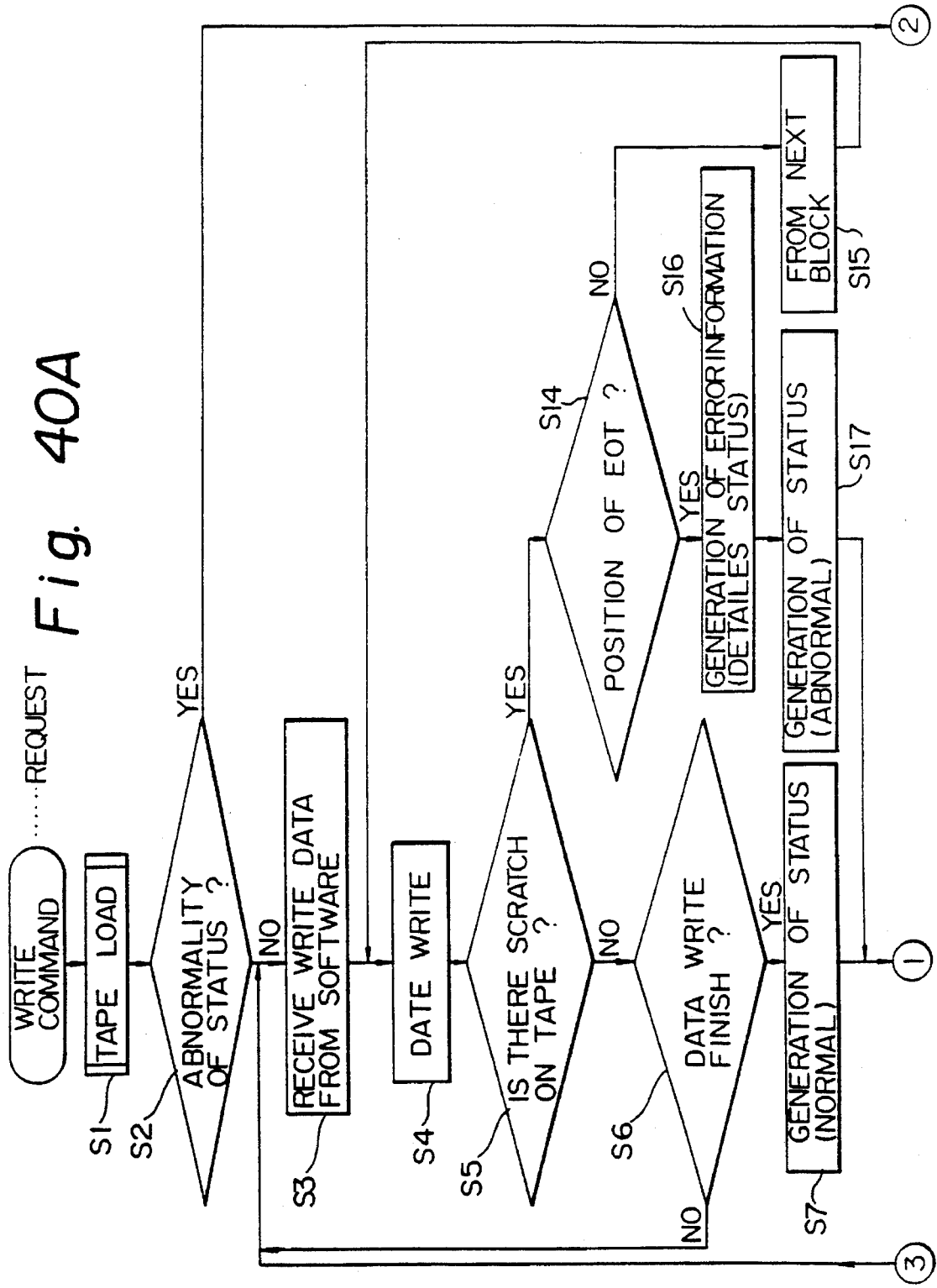

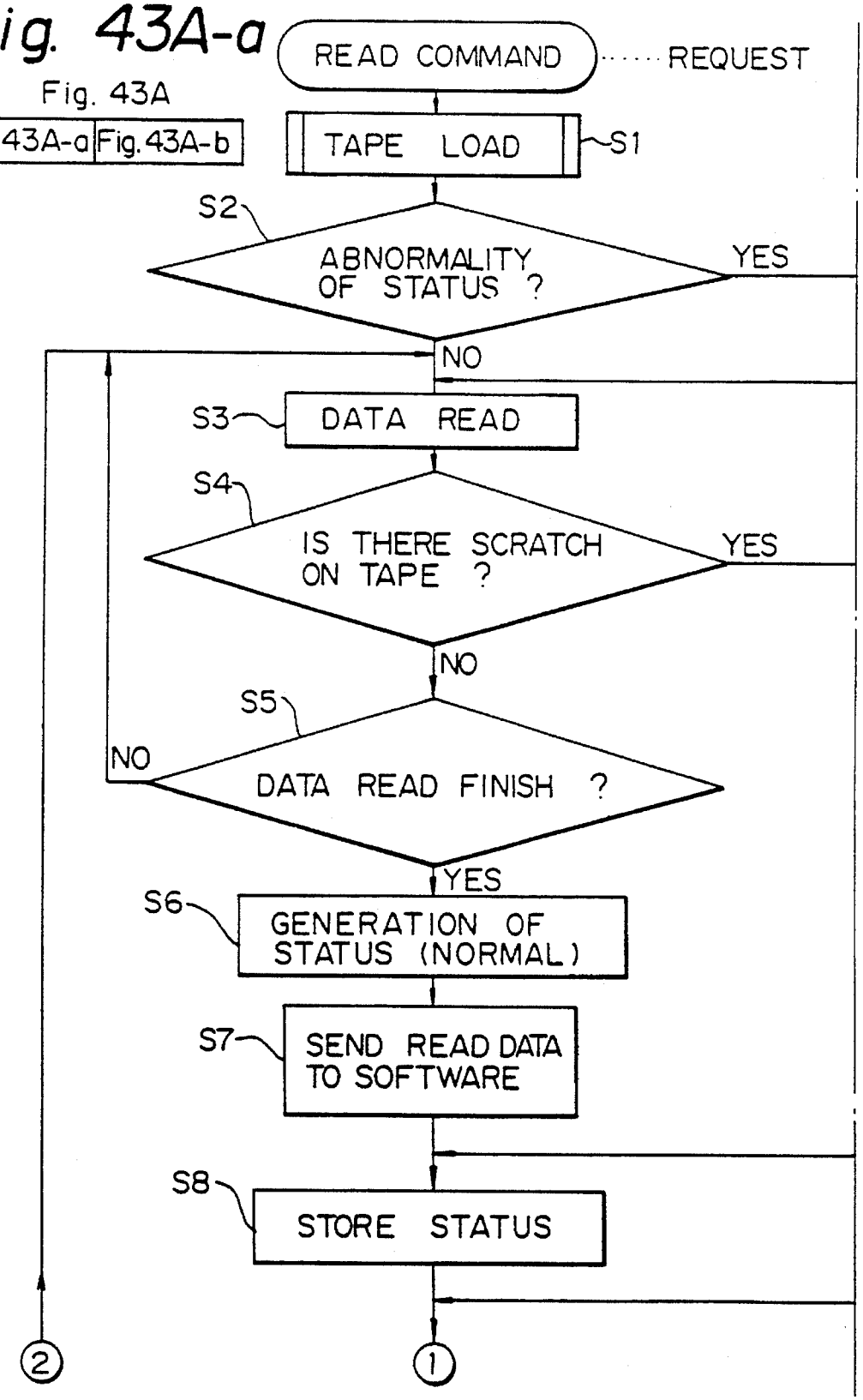

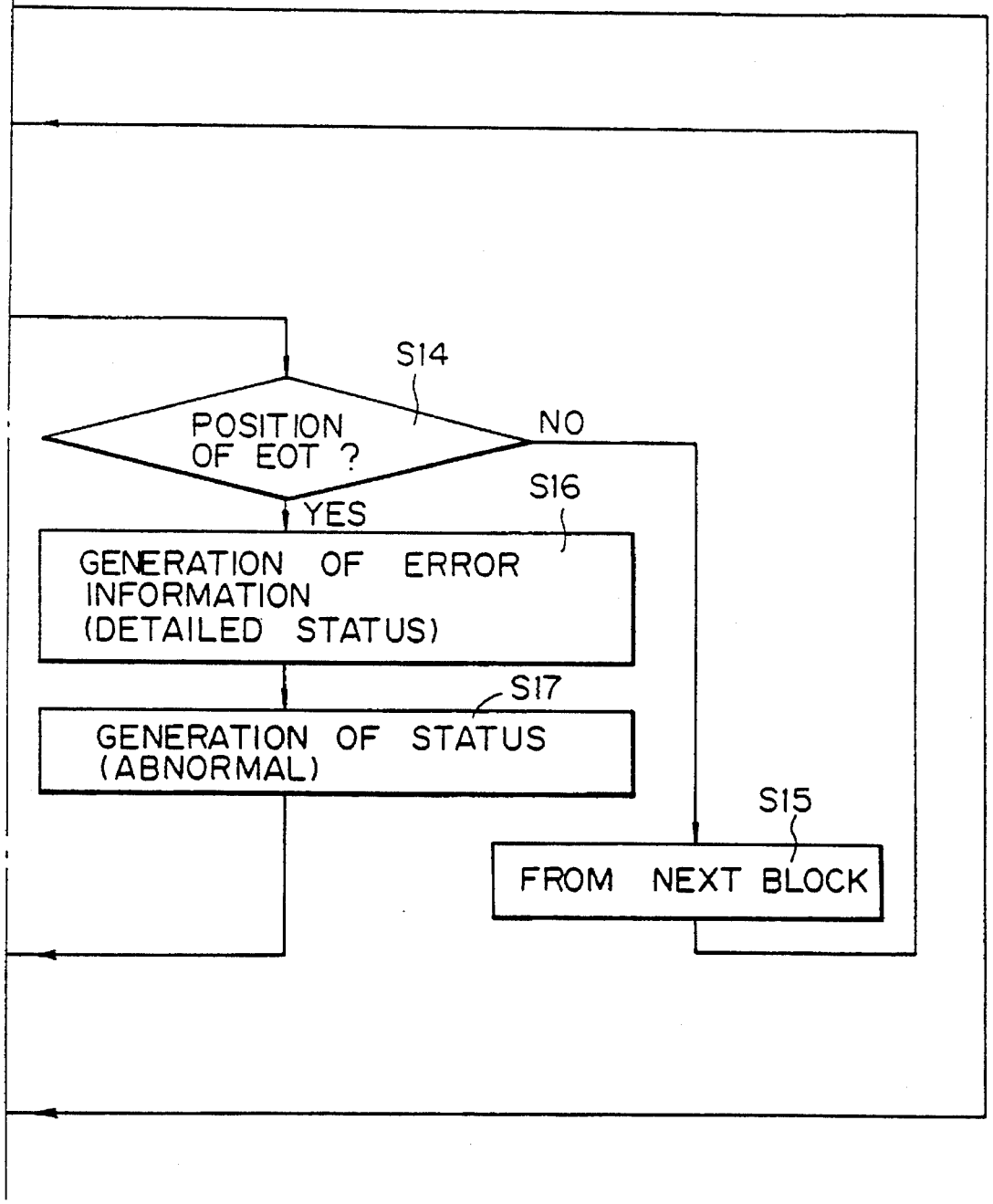
Fig. 43A-b

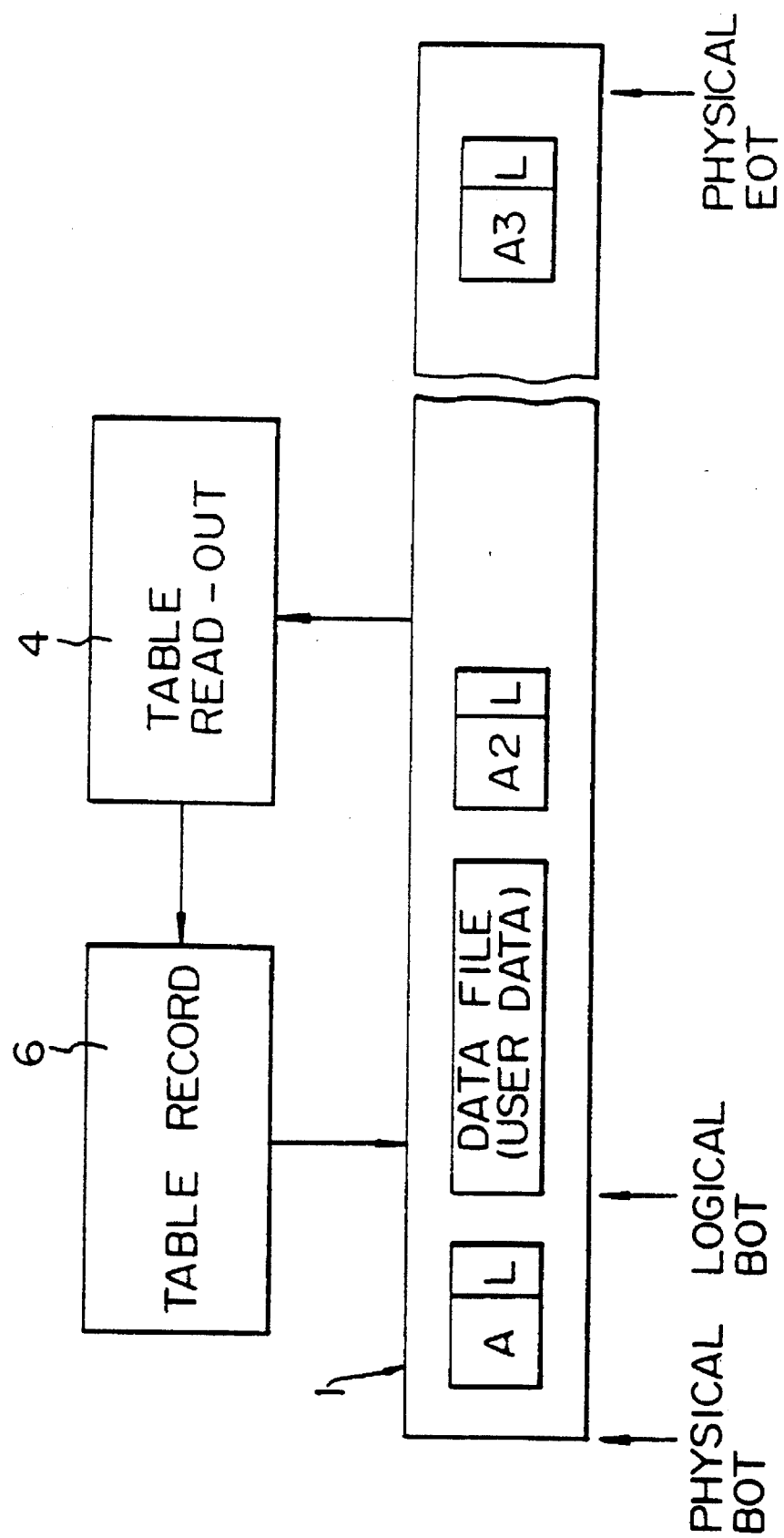

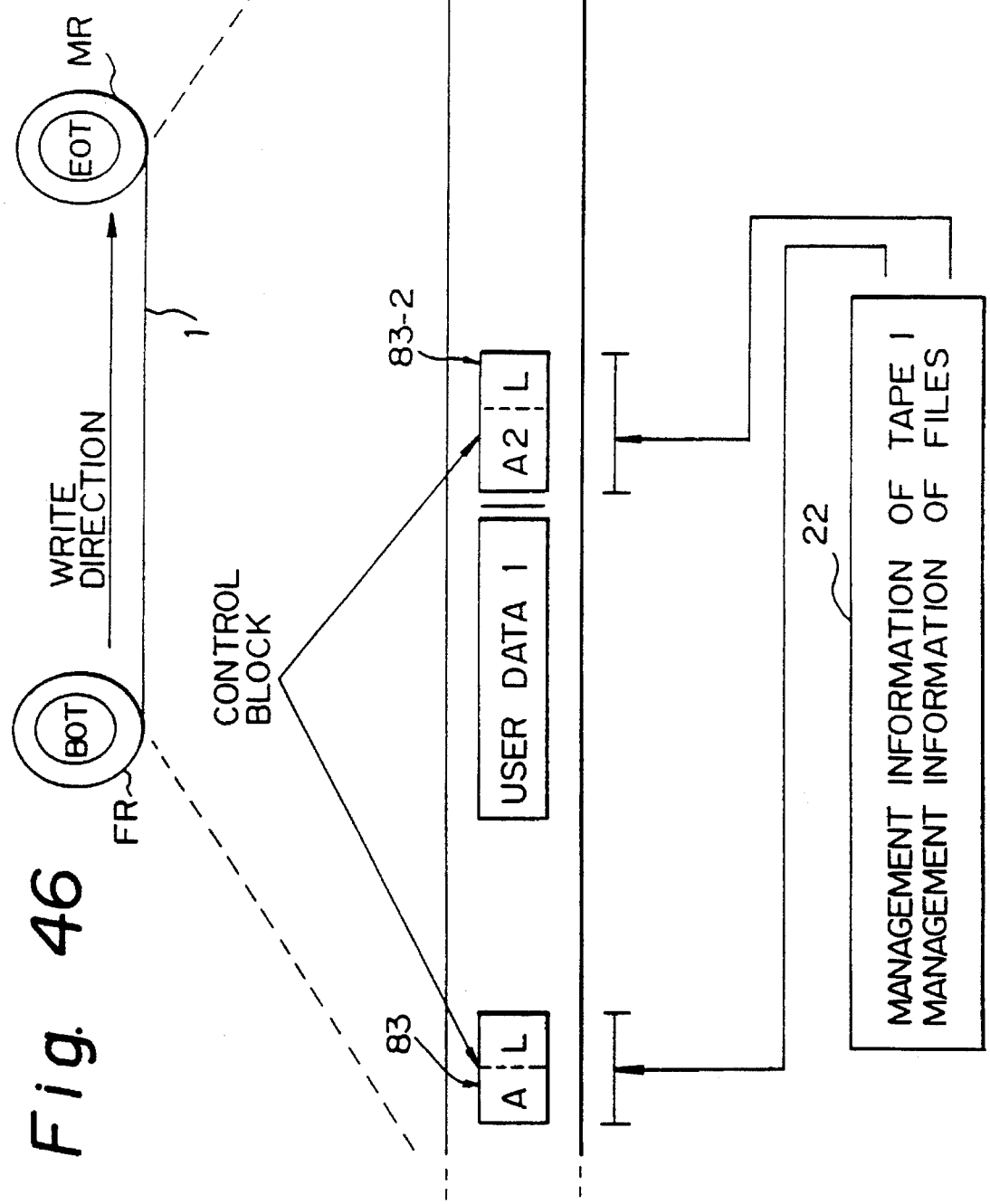

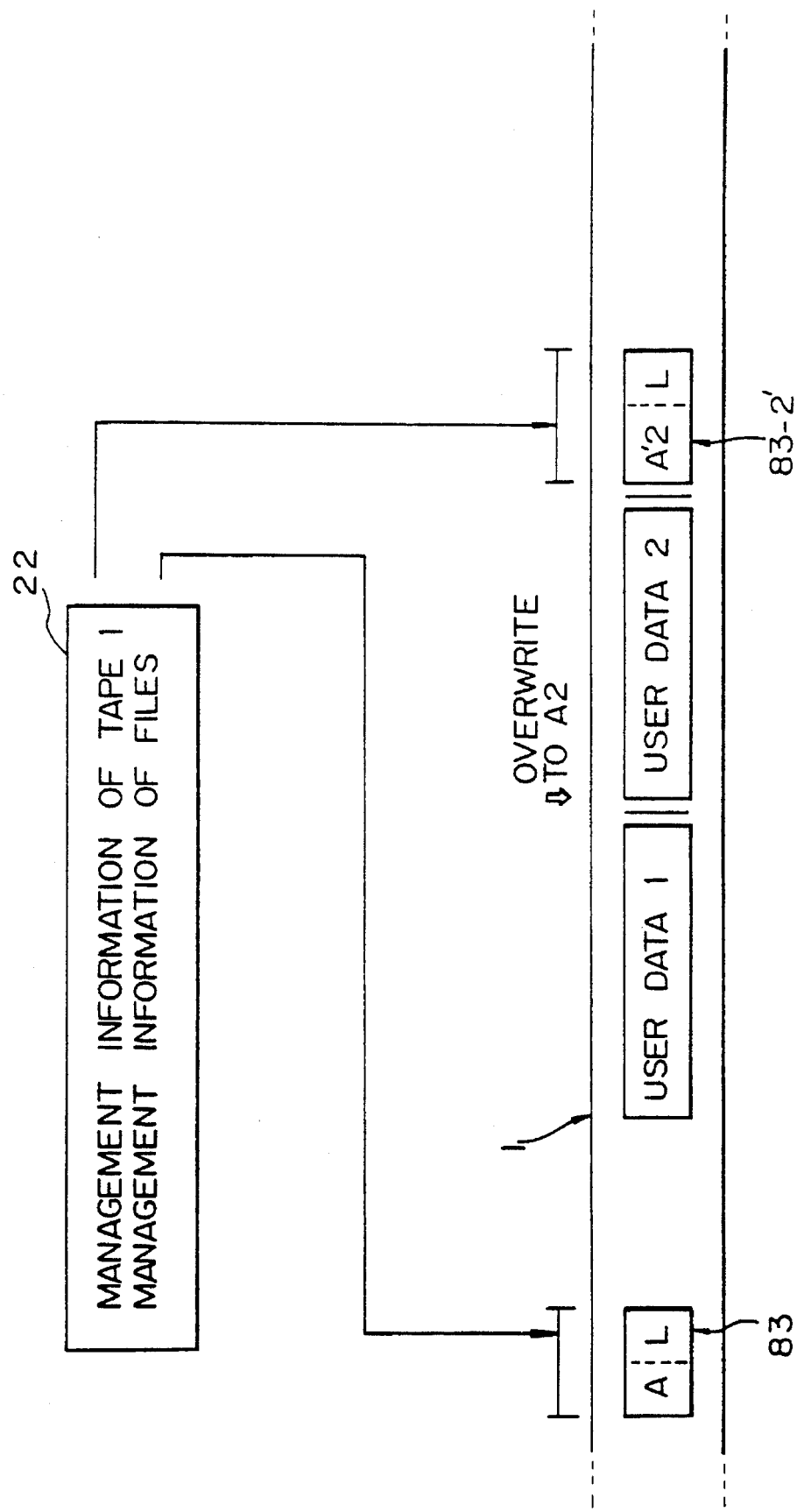

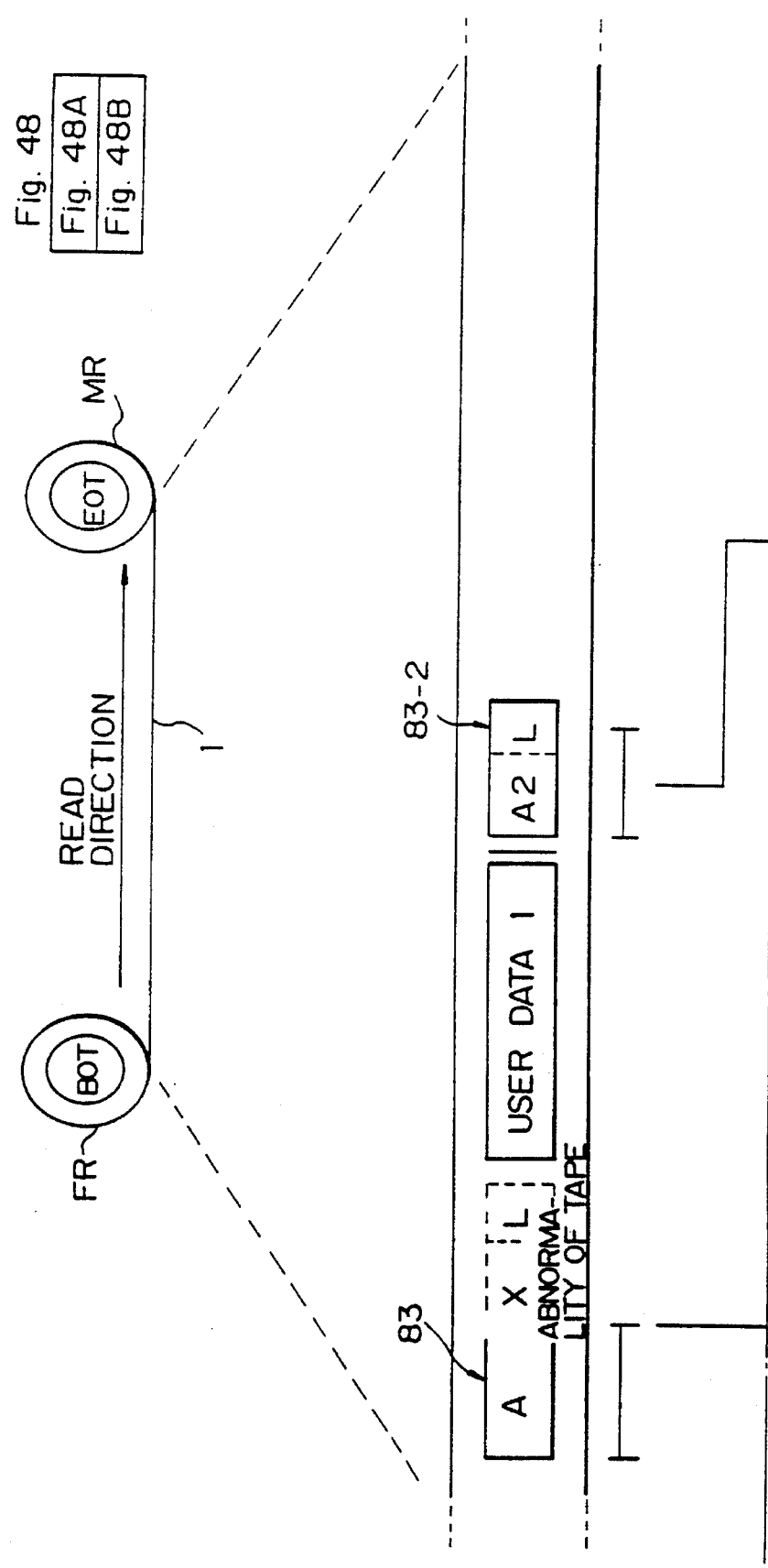

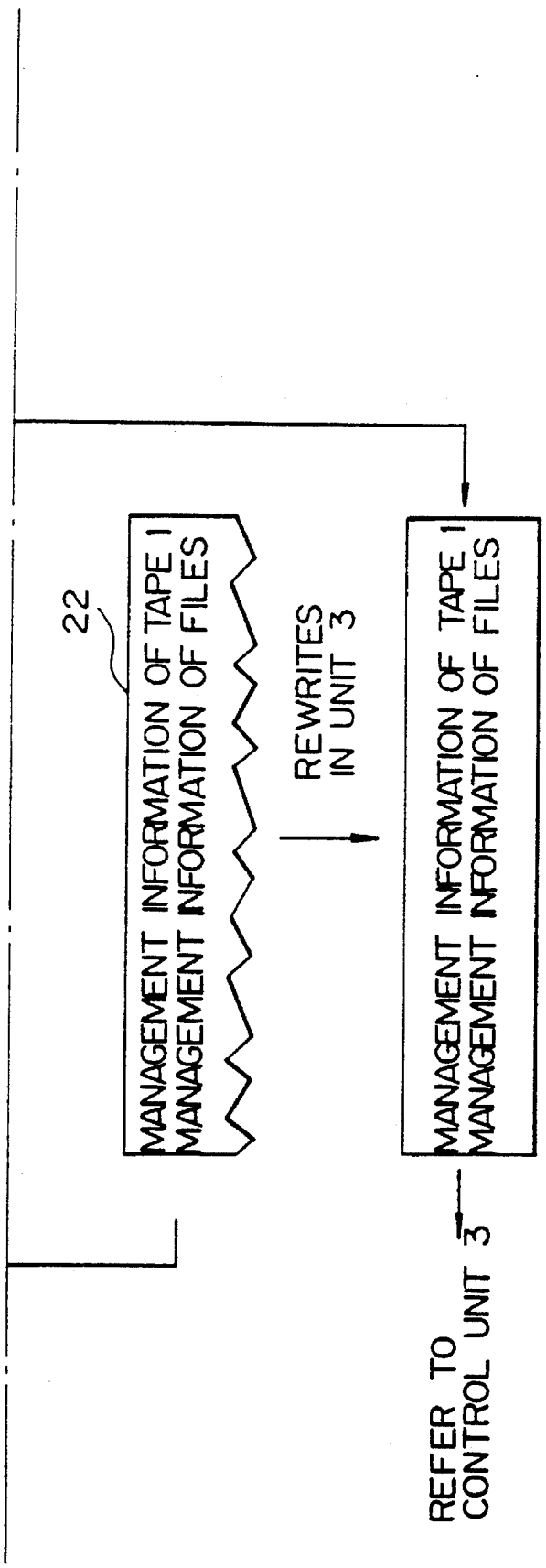

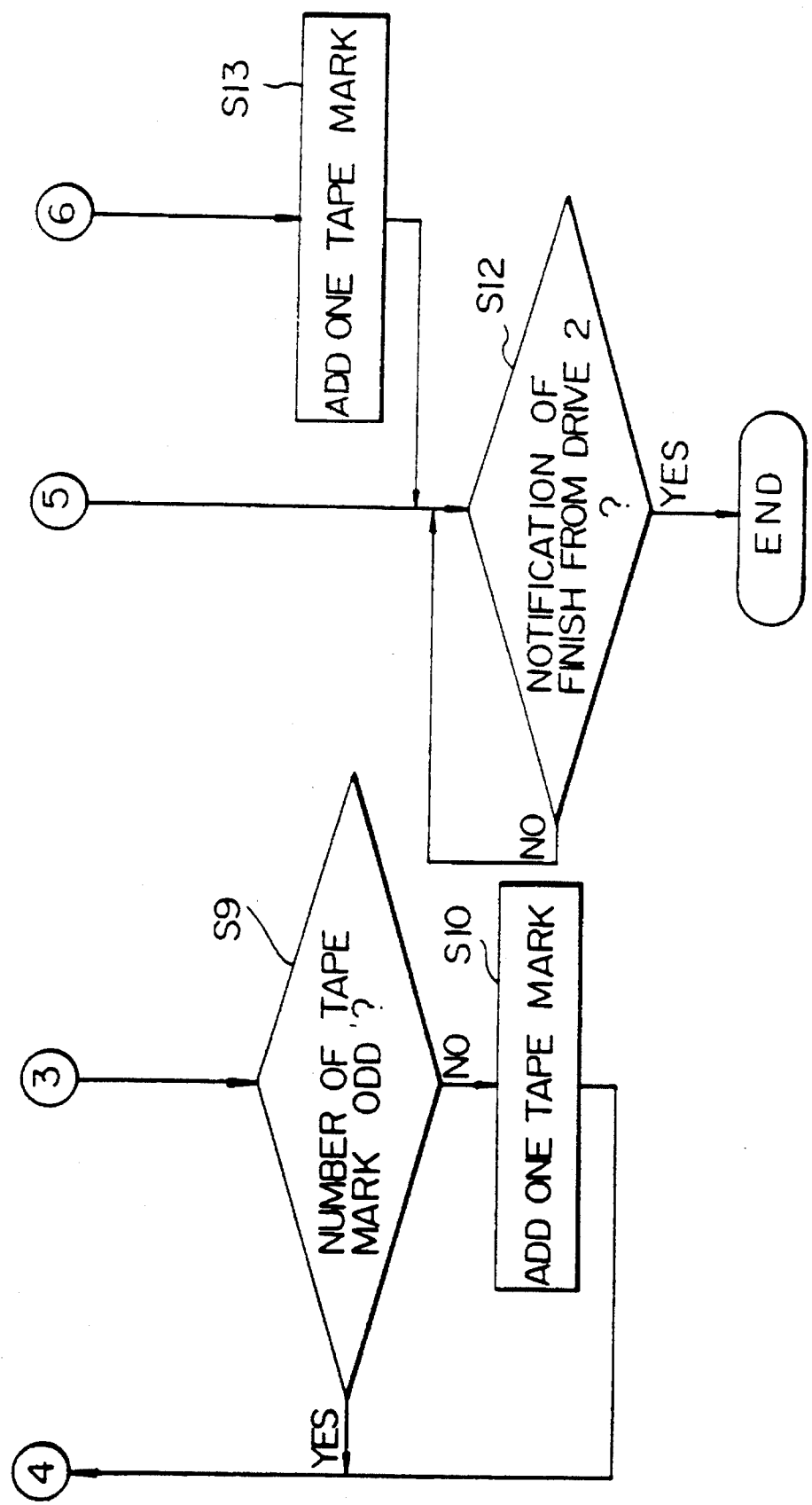

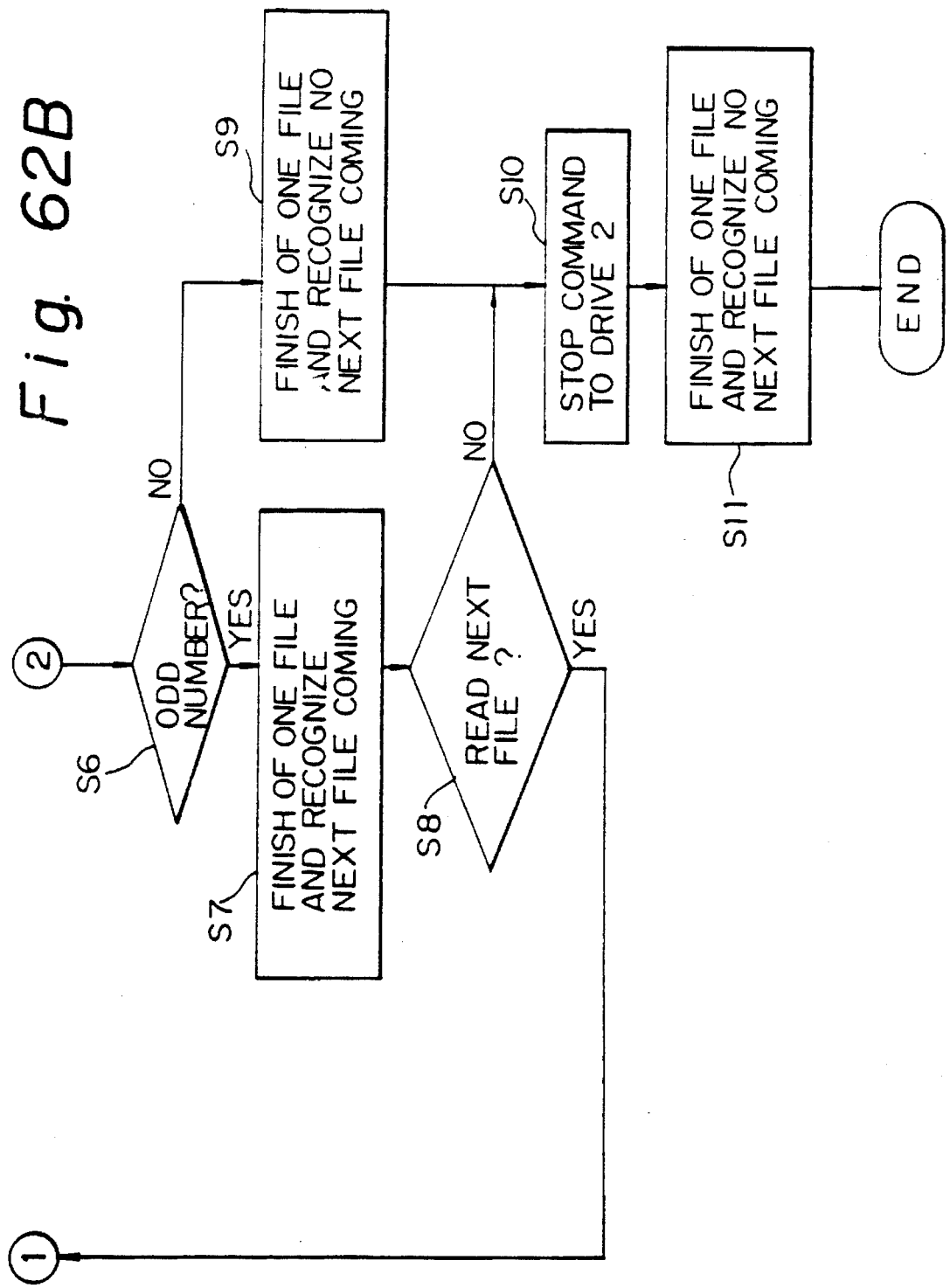

MAGNETIC TAPE STORAGE APPARATUS WRITING STATUS INFORMATION TO MAGNETIC TAPE INDICATING A TAPE ABNORMALITY

This application is a division of application Ser. No. 07/851,413, filed Mar. 13, 1992, now U.S. Pat. No. 5,384,673.

BACKGROUND OF THE INVENTION

1. Field of the Invention

The present invention relates to a magnetic tape storage apparatus, and more particularly to a magnetic tape storage apparatus which can perform writing and reading of data on and from a magnetic tape using a rotary magnetic head by the so-called helical scan method.

2. Description of the Related Art

Information is frequently written and read in video recording/reproducing apparatuses using a rotary magnetic head by the helical scan method.

The technology for writing and reading information by the helical scan method can be applied not only to such video recording/reproducing apparatuses, but also to the external storage apparatuses of computer systems. With the helical scan method, it is possible to write a large volume of information on a single magnetic tape, so, for example, it is extremely advantageous to use a helical scan type magnetic tape storage apparatus as the external storage apparatus for a large-sized computer system.

Up to now, however, commercial versions of helical scan type magnetic tape storage apparatuses for use for large-sized computer systems have not appeared on the market.

SUMMARY OF THE INVENTION

Therefore, the object of the present invention is to provide a helical scan type magnetic tape storage apparatus suitable for use in a large-size computer system.

To achieve the above-mentioned object, the present invention provides a magnetic tape storage apparatus comprised of a drive unit for writing/reading information on or from a magnetic tape using a rotary head by the helical scan method and a storage control unit for controlling the drive unit, characterized by having a system area which is formed at a portion of the magnetic tape other then the user area where the user data is recorded and which can be used only by the storage control unit. The magnetic tape storage apparatus of the invention includes a table read-out means which reads out management information tables relating to the magnetic tape itself, written in the system area, into a memory device in the storage control unit when the magnetic tape is loaded into the drive unit; and a table recording device which, while the storage control unit refers to the data of the written management information tables, performs write/read operations on the user area on the magnetic tape and simultaneously renews the data of the management information tables in the memory device, and finally, when the magnetic tape is unloaded from the drive unit, writes the management information tables in the memory device, having the renewed data, into the system area of the magnetic tape.

BRIEF DESCRIPTION OF THE DRAWINGS

The above object and features of the present invention will be more apparent from the following description of the preferred embodiments with reference to the accompanying drawings, wherein:

FIG. 6 is a view showing a table used in a first aspect of the invention;

FIG. 7 is a view showing a table used in a second aspect of the invention;

FIG. 11 is a view showing a detailed example of the table of FIG. 6;

FIG. 13A and FIG. 13B are flow charts showing the write operation of a data block on a magnetic tape and the write operation of tape marks;

FIG. 16A and FIG. 16B are flow charts showing the operation for processing a plurality of commands all together when receiving a plurality of "position to the next tape mark" commands from the host computer;

FIG. 17 is a view showing a specific example of the table of FIG. 7;

FIG. 19A and FIG. 19B are flow charts showing the operation for processing a write operation of block data and a write operation of tape marks at the file end in the case of use of the table of FIG. 17;

FIG. 21A and FIG. 21B are flow charts showing the operation of processing in the case of receipt of a "position to the next tape mark" command from the host computer in the case of use of the table of FIG. 17;

FIG. 32 is a view of the microprogram used for the storage control unit;

FIG. 33 is a view showing the structure of the sense information obtained from the drive unit 2;

FIG. 35, FIG. 39A and FIG. 39B are flow charts showing the processing (part 2) when recording apparatus information during unloading;

FIG. 36A and FIG. 36B are flow charts showing the processing (part 3) when recording apparatus information during unloading;

FIG. 38, FIG. 39A and FIG. 39B are views schematically showing a reading/writing operation vis-a-vis the fourth management information table;

FIG. 40A and FIG. 40B are flow charts showing the control processing when receiving a write command from the host computer;

FIG. 43A, 43A-a, 43A-b and FIG. 43B are flow charts showing the processing operation when receiving a read command from the host computer;

FIG. 44 is a view of the basic structure showing one example of the technique for improving the security of a management information table;

FIG. 46 is a view explaining the first write operation of user data;

FIG. 47 is an explanatory view showing the second user data write operation following the first user data write operation of FIG. 46;

FIG. 48, FIG. 48A and 48B are explanatory view showing the read processing of management information when loading the magnetic tape;

FIG. 59A, FIG. 59B, and FIG. 59C are flow charts showing the write operation in the structure of FIG. 56;

FIG. 62A and FIG. 62B are flow charts showing the read operation from the magnetic tape in the structure of FIG. 56;

DESCRIPTION OF THE PREFERRED EMBODIMENTS

Figure 1:
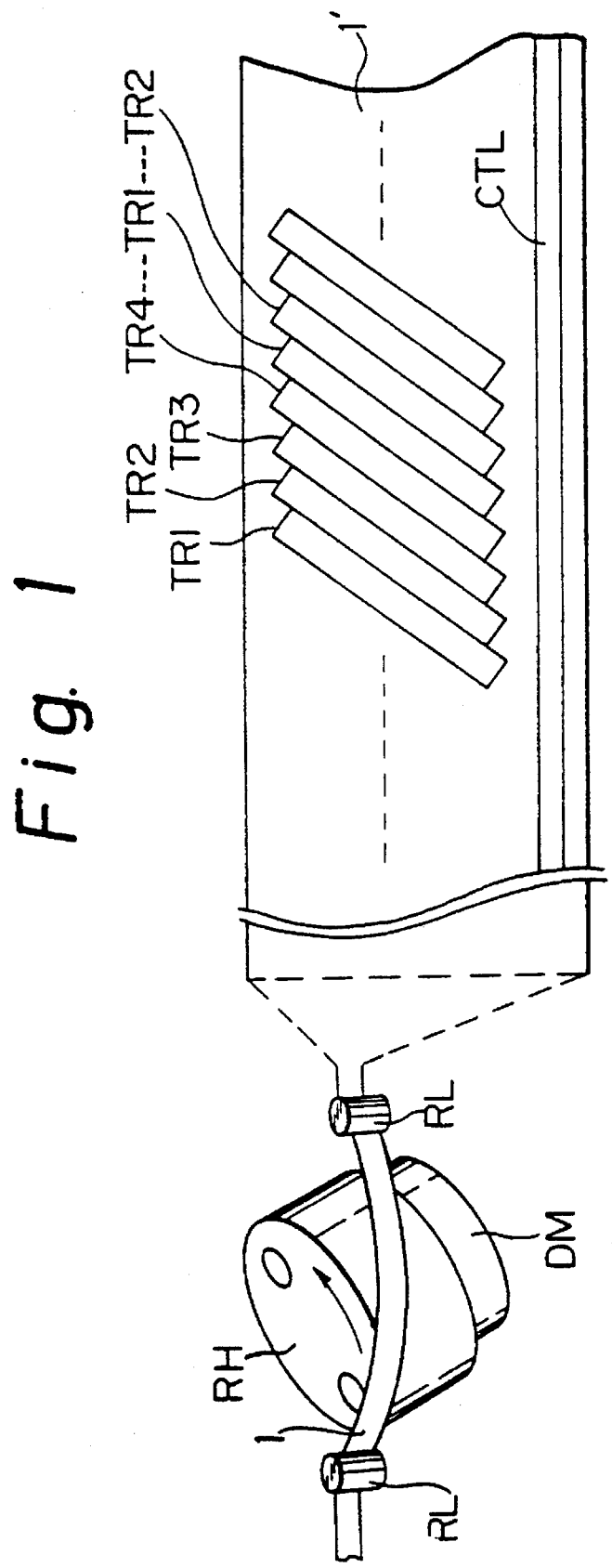
FIG. 1 is a view explaining the known helical scan method used in the present invention.

FIG. 1 is a view explaining the known helical scan method used in the present invention. In the figure, when a magnetic tape 1 is wound at a slant on a rotary magnetic head RH rotating at a high speed, the head RH is rotated, and the magnetic tape 1 is thus fed, recording tracks TR1, TR2 . . . are formed successively at a slant on the magnetic tape 1' (magnetic tape 1 shown enlarged) and the information is written in such tracks. Further, at least one control track CTL is formed on the magnetic tape 1'. DM is a drive motor and RL is a roller.

The present invention relates to a magnetic tape storage apparatus having a helical scan type drive unit explained with reference to FIG. 1.

Figure 2:
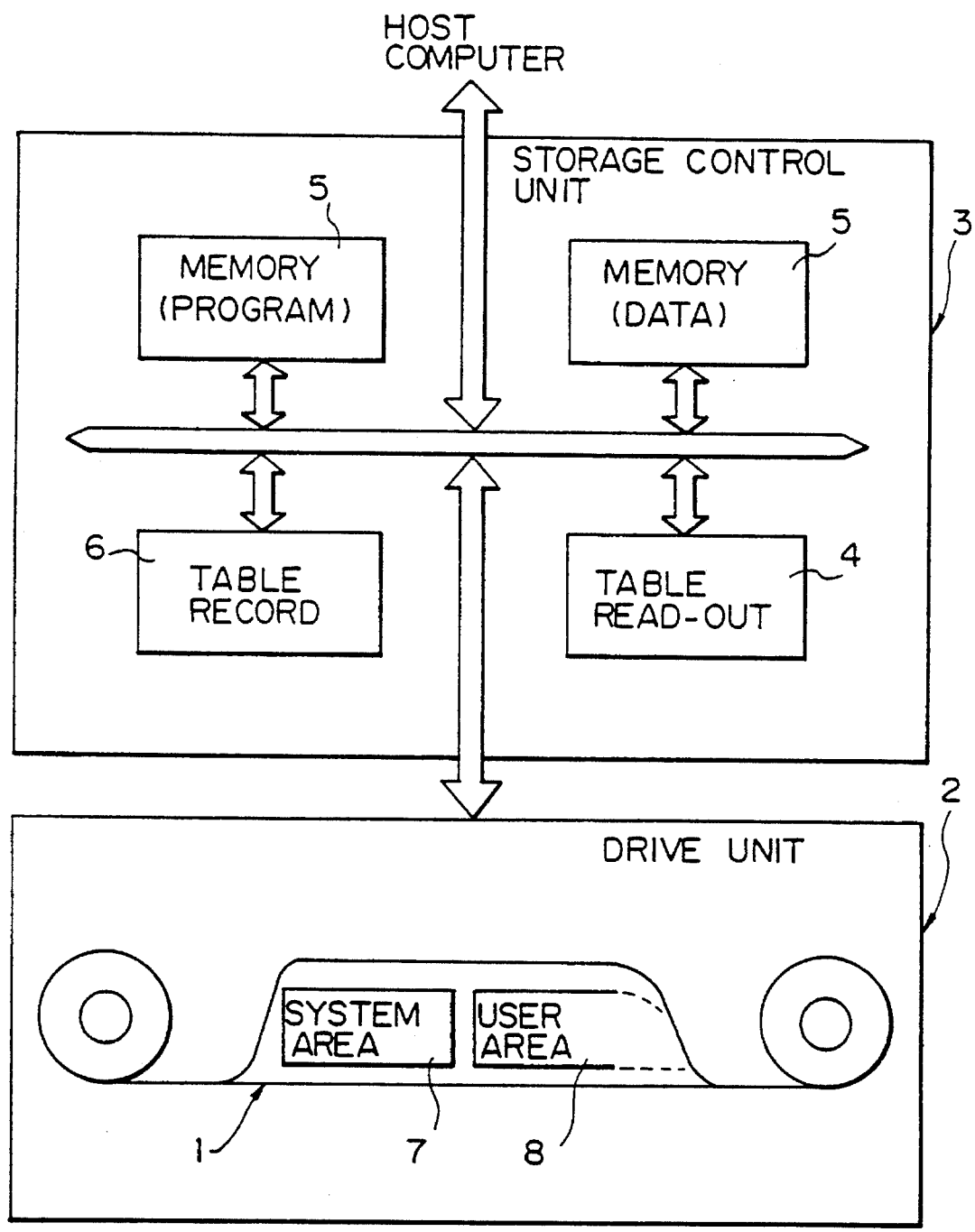
FIG. 2 is a view showing the basic structure of the present invention.

FIG. 2 is a view showing the basic structure of the present invention. The magnetic tape storage apparatus of the present invention is, generally speaking, comprised of a drive unit 2 for driving the magnetic tape 1 by the helical scan method and a storage control unit for controlling the drive unit 2 while communicating with a host computer.

According to the present invention, first, a system area 7 is formed on the magnetic tape 1. This system area 7 is formed at the portion of the tape other than the user area 8 where the user data is recorded and is available for use only by the storage control unit 3.

The system area 7 has written in it management information tables relating to the magnetic tape itself. When the magnetic tape 1 is loaded in the drive unit 2, the data in the management information tables is read out to the memory device 5 (data side) by the table reading device 4 in the storage control unit 3.

In accordance with a command from the host computer, the storage control unit 3 performs a write/read operation on the magnetic tape 1 in the drive unit 2. This write/read operation is performed while referring to the management information tables written in the memory device 5. Further, the data of the management information tables in the memory device 5 is renewed in accordance with the changes in the management information along with the progress of the write/read operation.

When the write/read operation ends and the magnetic tape 1 is unloaded from the drive unit 2, the new renewed management information tables in the memory device 5 are written into the system area 7 on the magnetic tape 1. This write operation is performed by the table recording device 6 in the storage control unit. Here, the old management information tables which had been on the magnetic tape 1 are replaced with the new management information tables.

The management information tables include various tables. The management information tables to set up may be freely determined in accordance with the functions demanded by the magnetic tape storage apparatus.

Below, an explanation will be made of several management information tables with high usage values.

First Management Information Table

By using the first management information table of the present invention, it is possible to realize a high speed positioning system for a magnetic tape storage apparatus which positions to a head a data block on a magnetic tape to be accessed by high speed tape running.

In general, in a magnetic tape storage apparatus, there are several means for positioning to recorded data blocks or tape marks. Magnetic tape, however, has to be read and written from the start of the medium due to its nature, and it is not possible to position to any place on the medium at a high speed.

To position at any data block on the magnetic tape, it is necessary to position while actually reading the data on the medium, so it is only possible to position at the same speed as normal reading and writing.

Therefore, if the amount of the data on the medium increases, a massive amount of time is taken for the positioning to a data block at the end of the medium. Improvements in recording density are expected to result in a further increase in the amount of data which may be written on a single reel of the medium in the future, so a high speed positioning device is required.

Conventional high speed positioning systems for magnetic tape storage apparatuses all do the high speed positioning by physical position information on the medium.

Figure 3:
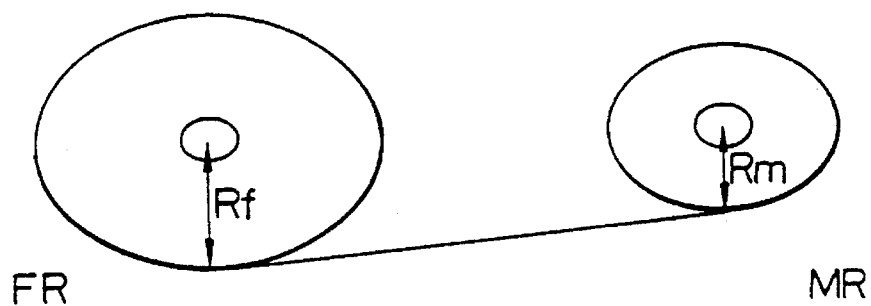
FIG. 3 is a view showing a first example of the conventional high speed positioning method.

FIG. 3 is a view showing a first example of the conventional high speed positioning method. The physical position on the magnetic tape is found from the ratio of the radii of the machine reel MR and the file reel FR (Rf/Rm). That is, the magnetic tape is wound from the file reel FR to the machine reel MR.

Therefore, use is made of a formula expressing the ratio of the radius Rf of the magnetic tape wound on the file reel FR and the radius Rm of the magnetic tape wound on the machine reel MR by a certain range of integers so as to express physical positions on the medium, these values are used for rough high speed positioning, and then normal reading is used for fine positioning.

Figure 4:
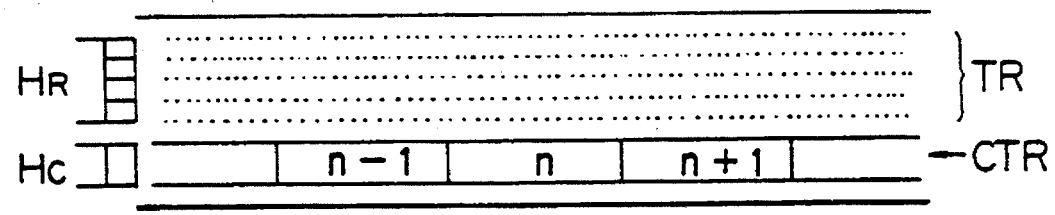
FIG. 4 is a view showing a second example of the conventional high speed positioning method.

FIG. 4 is a view showing a second example of the conventional high speed positioning method. Here, the system of FIG. 3 is made more precise. As shown in FIG. 4, in addition to data recording tracks TR on the magnetic tape, a control track CTL is provided. In this system, a control head Hc is provided separately from the data recording head Hr on the magnetic tape.

The control track CTL written on by the control head Hc has values written on it which increase by one with every certain distance. The control track CTL further has a different recording frequency so as to enable higher speed reading than normal reading and writing.

Therefore, the information on the control track CTL may be read at a high speed to enable high speed positioning.

Such conventional high speed positioning systems, however, have a common defect. The defect is the lack of device for managing the physical positions of the data blocks on the medium.

That is, to position to any data block on the magnetic tape or a tape mark made at the end of a data file comprised of one or more data blocks, it is necessary to store the physical position of the data block or the tape mark.

This storage of the physical position of the data block or tape mark must be left to the management of the host computer. This would be acceptable if there were only several dozen reels of recording media, but is not practical at present where there are several thousands or tens of thousands of reels due to the problem of where to store the physical positions. Also, due to the nature of magnetic tapes, the media are interchangeable. There is in actuality no means for managing the physical positions of media written by other computers. At the present, conventional high speed positioning systems are not in fact being used much.

According to the first management information table according to the present invention, it is possible to position at a high speed to any data block by suitable management of the physical positions on the medium without burdening the host computer.

Figure 5:
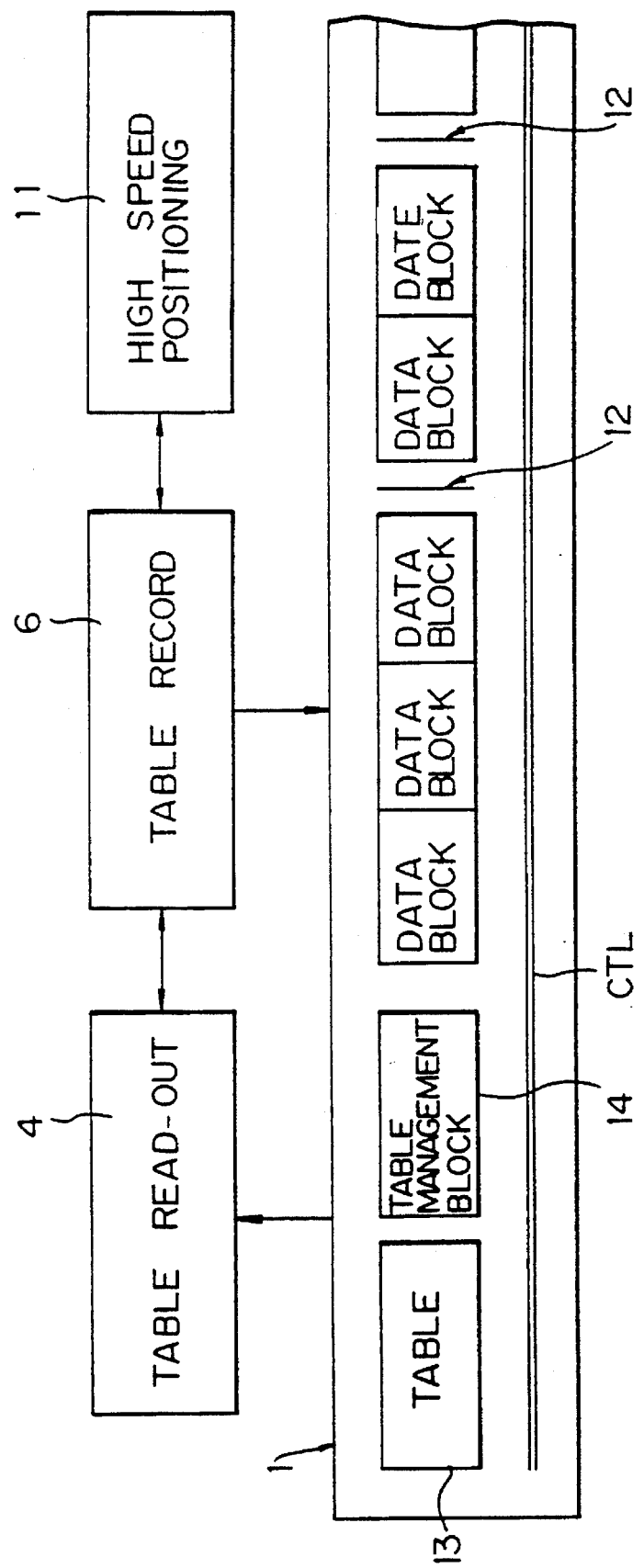
FIG. 5 is a view showing the basic structure in the case of use of a first management information table according to the present invention.

FIG. 5 is a view showing the basic structure in the case of use of a first management information table according to the present invention. Basically, a table 13 of correspondence between the position information on the magnetic tape 1 and the information of divisions of the data on the magnetic tape 1 is prepared and written on the magnetic tape 1 (by a table recording means 6). This table 13 is referred to when performing the positioning control.

Here, the table 13 is recorded on the system area 7 of the magnetic tape 1 available to use by only the unit 3.

FIG. 6 is a view showing a table used in a first aspect of the invention.

The first aspect of the invention lies in the preparation of a table 13 of FIG. 6 giving correspondence to the logical numbers of the data blocks and tape marks on a magnetic tape 1, the physical numbers showing the physical positions of the data blocks and tape marks on the magnetic tape 1, and flag information showing if the data blocks are tape marks 12 and writing of this table on the magnetic tape 1 (by the table recording means 6).

The table 13 recorded on the magnetic tape 1 is written into the unit 3 (by the table reading device 4). When positioning to a data block or tape mark 12 corresponding to any logical number, the table read out to the unit 3 by the table reading device 4 is referred to, the physical number of the desired data block or tape mark on the magnetic tape is obtained from the logical number, tape mark 12, or flag information, and thus a position of a desired data block or tape mark 12 can be reached at high speed (by a high speed positioning device).

Here, the high speed positioning means 11 positions at a high speed to just before the target data block, then switches to the usual speed to position precisely to the target block.

FIG. 7 is a view showing a table used in a second aspect of the invention.

The second aspect of the invention lies in the preparation of a table shown in FIG. 7 giving correspondence to the logical numbers of the tape marks 12 showing the end positions of data files on a magnetic tape 1 comprised of one or more data blocks and the physical numbers showing the physical positions of the tape marks 7 on the magnetic tape 1' and writing this on the magnetic tape 1 (by the table recording means 6). The table recorded on the magnetic tape 1 is written into the unit 3 by the table reading device 4. When positioning to a data block, the table read out by the table reading means 4 is referred to, the physical number on the magnetic tape 1 corresponding to the logical number of the tape mark 12 closest to the target data block is obtained, the tape mark 12 is positioned to, then the normal speed is switched to so as to position to the target data block (by the high speed positioning device 5).

In both of the first aspect of the invention and the second aspect of the invention, the table reading device 4 reads out the table 13 into the memory device 5 of the unit 3 when the magnetic tape 1 is loaded, and the tape recording device 6 renews the table 13 in the memory device 5 in accordance with accessing of the magnetic tape 1 and, further, writes the table 13 on the memory device 5 into the magnetic tape 1 or just adds the changes to the table when the magnetic tape 1 is unloaded.

In addition to the high speed positioning device of the first aspect of the invention and the second aspect of the invention, there are further provided a flag recording device which sets a management flag showing the renewal of the table 13 and records this in the area of the table management block 14 following the recording area of the table on the magnetic tape 1 during unloading, a reset device which resets the management flag of the table management block 14 when the magnetic tape 1 is loaded, and a flag judgement means which judges that the table has been renewed normally at the previous unloading if the management flag is in the set state before the resetting at the loading and judges if the table was renewed normally when the flag has been reset.

According to the high speed positioning device of the magnetic tape storage apparatus of the present invention provided with this construction, the following action is obtained.

First, in the first aspect of the invention, a table 13 shown in FIG. 6 is prepared and recorded on the magnetic tape 1. The table 13 of FIG. 6 gives correspondence between the physical numbers showing the physical positions of the data blocks on the magnetic tape (values obtained from control track CTL) and the flag information showing if the data blocks are data blocks showing the tape marks 12.

When loading the magnetic tape 1 into the unit, the table 13 is read out to the memory device 5 in the storage control unit 3, then the table 13 stored in the memory device is referred to during the operation.

The table 13 is referred to and renewed in the memory device. That is, each time there is a command for writing a data block or tape mark, the table 13 in the memory device is renewed to show the latest information. The renewal of the table 13 corresponding to the magnetic tape 1 is performed all at once when unloading the magnetic tape 1.

On the other hand, in the second aspect of the invention, the table 13 shown in FIG. 7 is prepared and stored on the magnetic tape 1.

The table 13 of FIG. 7 gives the correspondence between the logical numbers of the tape marks 12 showing the end positions of the data files on the magnetic tape 1 comprised of one or more data blocks and the physical numbers showing the physical positions of the tape marks 12 on the magnetic tape.

The data blocks in the second aspect of the invention cannot be positioned directly as in the first aspect of the invention, so high speed positioning is performed to the physical number of the tape mark closest to the target data block, then the normal speed is switched to and the target block is positioned to while reading the data.

Therefore, the efficiency is less than that of the first aspect of the invention, but the table 13 is simple in structure and the size of the memory may be reduced.

The reading during loading, the renewal of the table in the memory device, and the renewal of the table on the magnetic tape during unloading are performed in the same way as in the first aspect of the invention.

As a result, the magnetic tape storage apparatus shown in FIG. 5 can refer to the table 13 by itself so as to find the physical position and perform high speed positioning so long as it is given the logical number of the data block (logical block identification) ID or the logical number of the tape mark.

Further, there is a command (LOCATE COMMAND) to "position to the next tape mark", which is made much use of in magnetic tape storage apparatuses. It is also possible to refer to the table 13 and find the position of the tape mark closest from the current position so as to perform high speed positioning by this command as well.

Further, in the past, there was no device for determining how many tape marks were written on the magnetic tape and at what positions they were written at, so this had been performed with each command of "position to the next tape mark", but the tape marks are usually written as divisions of the data files. When there are a plurality of files on the magnetic tape 1, often a number of commands of "position to the next tape mark" are issued in succession to retrieve a file.

Currently, the time lost at the starting and stopping of the tape, performed with each plurality of commands, has been a cause of reduced speed of file retrieval.

According to the present invention, however, if the table 13 is retrieved, it is possible to determine the position of all the tape marks on the medium, so it is possible to perform a number of commands "position to the next tape mark" all together.

This enables the time taken during starting and stopping of the table to be held to a minimum, so if this is used together with high speed positioning, it is possible to further increase the speed of file retrieval.

Further, if a special command is prepared and the content of the table 13 is transferred to the host computer, then it would also be possible to perform retrieval at an even higher speed, so the positions of all the data blocks and tape marks on the medium can be determined by the computer.

Also, in both the first aspect of the invention and the second aspect of the invention, the table 13 on the memory device 5 is renewed between the loading and unloading of the magnetic tape 1, so when normal unloading is not possible due to a power outage or other mishap, there is a chance that the table on the memory device and the information written on the magnetic tape may not match.

Therefore, the table management block 14 is written separately on the magnetic tape 1 from the table 13. The table management block 14 has recorded in it a table renewal flag which is set when the table 13 on the magnetic tape 1 is renewed, that is, unloaded. Further, the table renewal flag is reset when the magnetic tape 1 is loaded.

Therefore, when the table renewal flag is not recorded, that is, when it is not reset, it may be judged that the table on the magnetic tape 1 was not normally renewed at the previous unloading and it becomes possible to prevent in advance the positioning to an erroneous position using a non-renewed table due to a power outage or other mishap.

To restore the table in this case, a special table restructuring support command may be provided or else the magnetic tape storage apparatus may perform table restructuring automatically when loading or unloading the tape.

When the table has not been renewed and a positioning command is received before the table restructuring processing, the positioning is performed referring to the data in the same way as the past, i.e., the table is not referred to.

Figure 8:
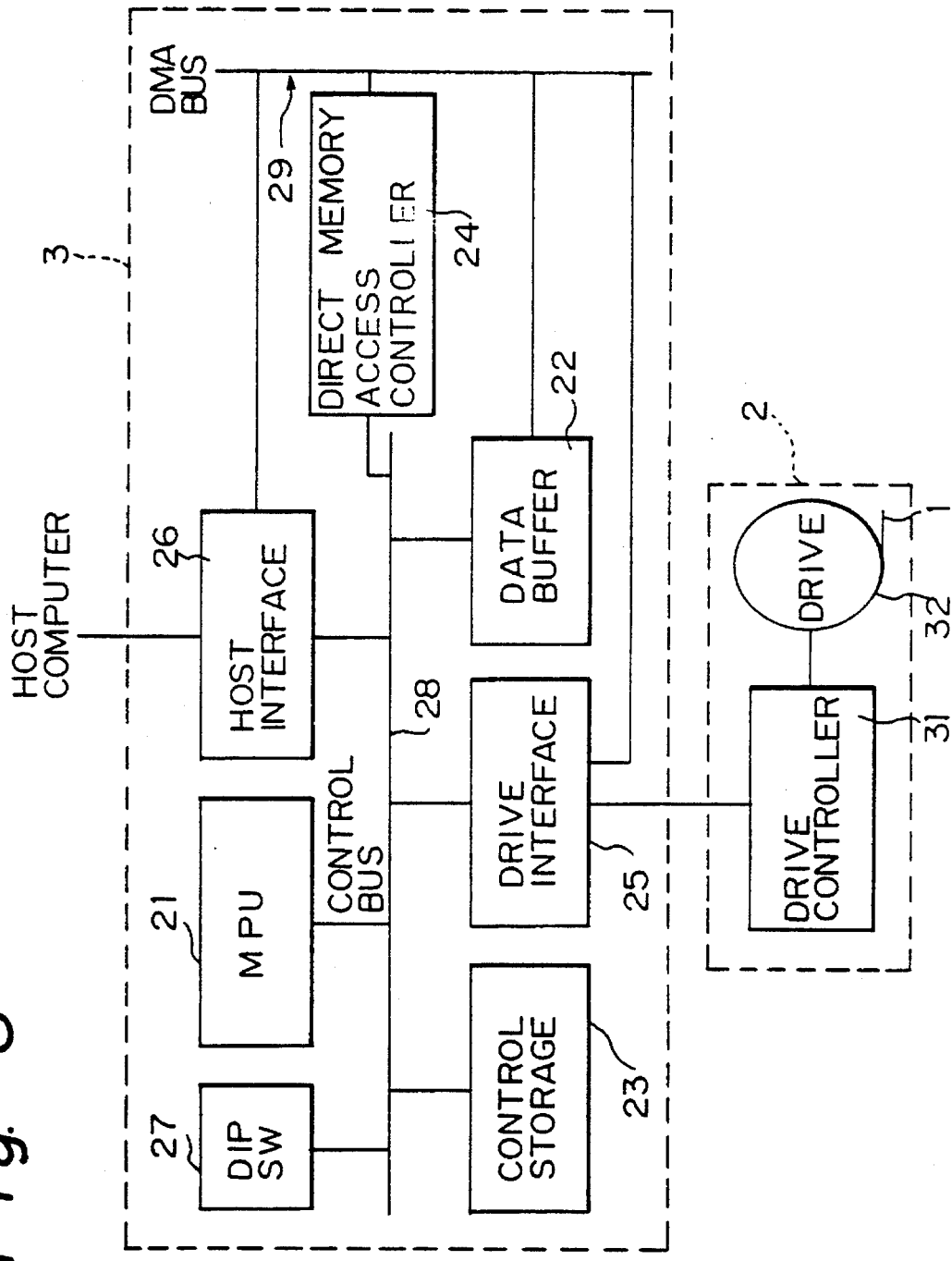
FIG. 8 is a view showing an embodiment of a magnetic tape storage apparatus to which the present invention is applied.

FIG. 8 is a view showing an embodiment of a magnetic tape storage apparatus to which the present invention is applied.

In FIG. 8, the magnetic tape storage apparatus of the present invention may be roughly divided into a storage control unit 3 and a drive unit 2. The drive unit 2 is provided with a drive controller 31 and a drive mechanism 32.

The drive controller 31 performs the loading, writing, reading, unloading, and other direct operations on the magnetic tape by operating the drive mechanism 32 by commands from the storage control unit 3.

Therefore, the drive mechanism 32 pulls out and brings the head into contact with the magnetic tape accommodated in the cassette case, provided with a file reel (feed reel) FR and machine reel (takeup reel) upon loading, as shown in FIG. 3.

Provision is made of a read/write head for the magnetic tape 1 loaded in the drive mechanism 32 and a head for performing reading and writing on the control track for obtaining the physical positions on the magnetic tape.

Among these, for the head for recording/reproducing data, use is made of a rotary head RH (FIG. 1) for increasing the recording density.

The storage control unit 3 analyzes and processes commands and data received from the host computer, controls the operation of the drive unit 2, positions to the magnetic tape, and then reads or writes data.

The storage control unit 3 is provided with a microprocessor (MPU) 21, which centrally controls the storage control unit as a whole.

The communication with the host computer is performed by a host interface 26, while communication with the drive unit 2 is performed by a drive interface 25.

A data buffer 22 is a buffer used when transferring data along with reading or writing of the magnetic tape. The transfer of data using the data buffer 22 is directly managed by a direct memory access (DMA) controller 24.

A control storage 23 opens the microprogram executed by the microprocessor 21 internally and also is used for a temporary storage area for the registers, pointers, etc. required for microprogram control, including high speed positioning control.

Reference numeral 27 is a DIP switch, which is used for setting the version number of hardware of the storage control unit 3 at the time of factory shipment.

Figure 9:
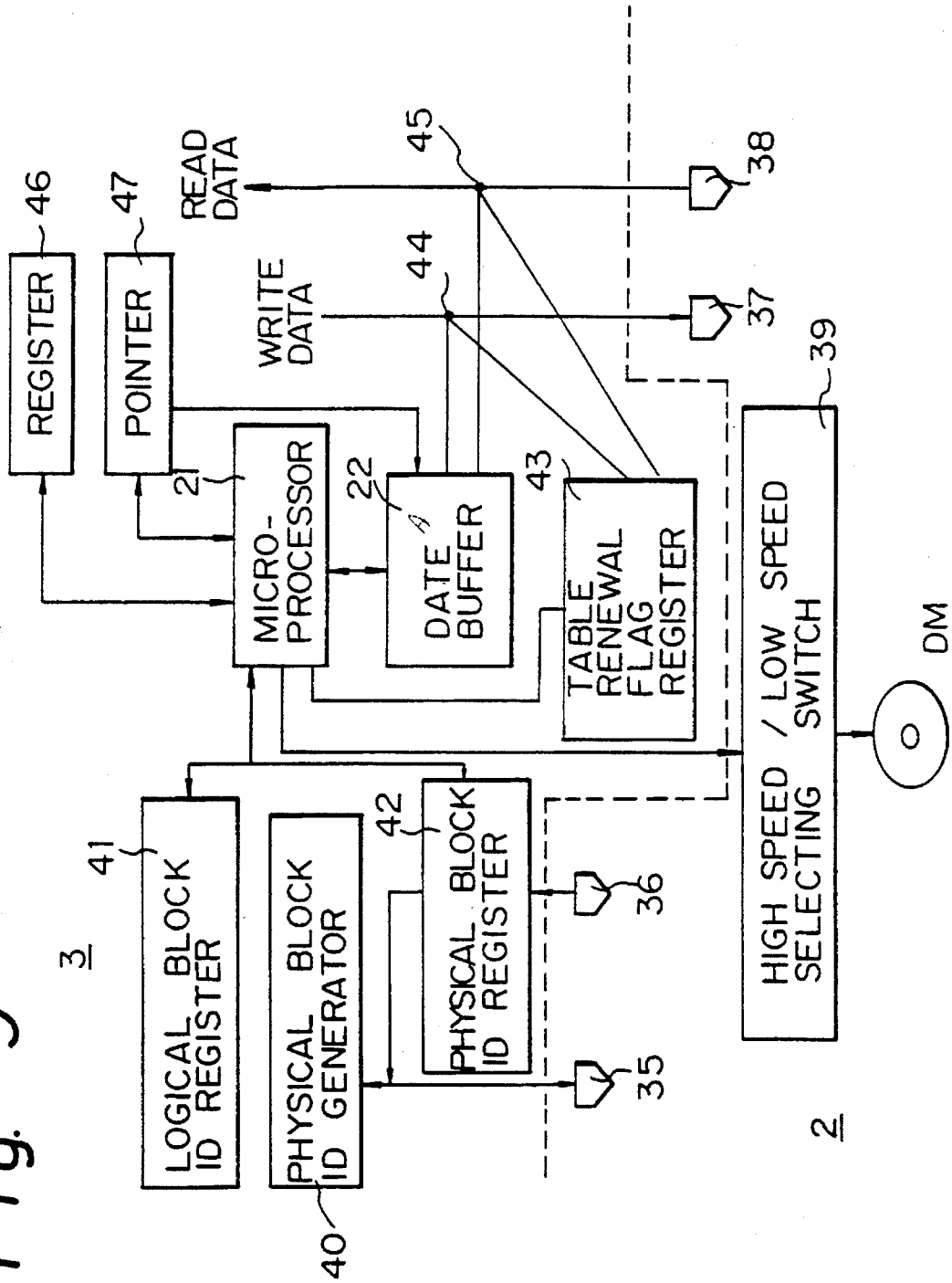
FIG. 9 is a view showing a detailed example of key portions of the structure of FIG. 8 in the case of use of the Table 13.

FIG. 9 is a view showing a detailed example of key portions of the structure of FIG. 8 in the case of use of the table 13.

In FIG. 9, first, at the drive unit 2 side, provision is made of a write head 37 for writing data using a rotary head RH, a read head 38 for reading data, a control track write head 35 for the control track CTL for obtaining physical positions on the magnetic tape, and a control track read head 36.

Further, the drive motor DM for driving the magnetic tape 1 is provided with a high speed/low speed selecting switch 39 for changing the speed of tape drive to several stages.

Here, "low speed" means the running speed during normal writing or reading of a magnetic tape.

On the other hand, at the storage control unit 3 side, provision is made of a microprocessor 21 and a data buffer 22. In the data buffer 22, as will be clarified later, the table 13 recorded in the magnetic tape is opened.

At the storage control unit 3 side, provision is made of a physical block ID generator 40, a logical block ID register 41, a physical block ID register 42, a table renewal flag register 43, a pointer 47, and a register 46.

These generator, registers, and pointer are realized using the control storage 23 shown in FIG. 8.

The data lines from the write head 37 and the read head 38 are provided with switches 44 and 45. The switch 44 switches the path to the write head 37 of the write data from among the host computer, data buffer 22, and table renewal flag register 43.

The switch 45 switches the path of the read data to among the host computer, data buffer 22, or table renewal flag register 43 from the read head 38.

Figure 10:
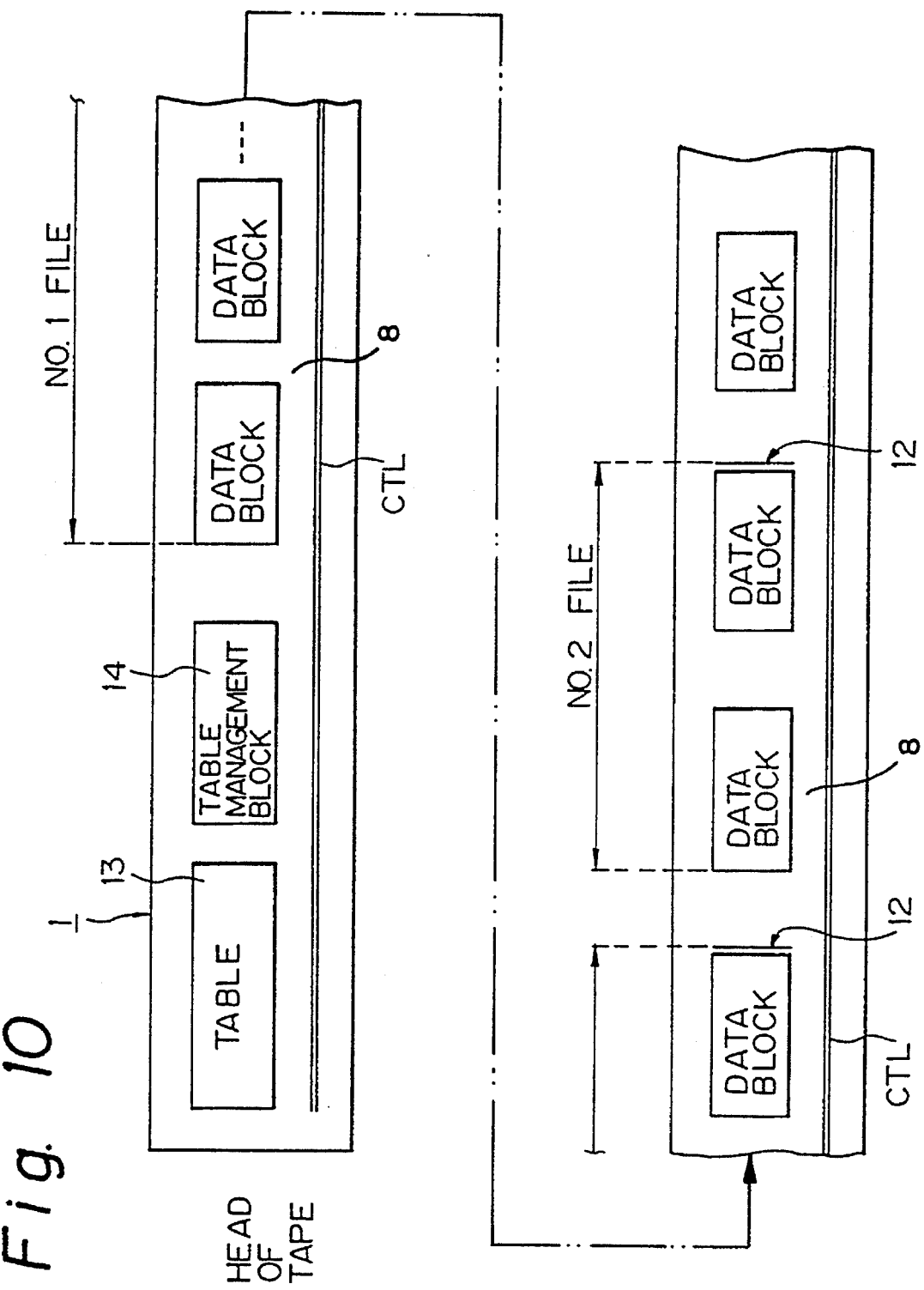
FIG. 10 is a view showing one example of the format of a magnetic tape used in the present invention.

FIG. 10 is a view showing one example of the format of a magnetic tape used in the present invention.

In FIG. 10, the table 13 used for high speed positioning is recorded at the head of the magnetic tape 1. Next to the table 13 is recorded a table management block 14 which records the management flag showing the performance of table renewal.

The areas of the magnetic tape 1 where the table 13 and the table management block 14 are recorded can be accessed only by the storage control unit 3, i.e., from a system area 7 which cannot be accessed by the user.

After the table management block 14 comes the user area 8, in which data blocks are successively recorded, as illustrated.

In the example of FIG. 10, the no. 1 file is comprised of three data blocks from the head of the user area. After the third data block, the end of the file, a tape mark 12 is recorded.

After this tape mark 12 are recorded two data blocks comprising a no. 2 file. After the data block serving as the end of the no. 2 file is similarly recorded a tape mark 12.

Further, the magnetic tape 1 has recorded on it a control track CTL parallel to the data area. The control track CTL, as shown in FIG. 4, has written on it values which increase by one every predetermined distance and is different in the recording frequency so as to allow reading at a higher speed than normal reading and writing. By reading the information on the control track CTL, it is possible to specifically determine physical positions on the magnetic tape 1.

FIG. 11 is a view showing a detailed example of the table of FIG. 6.

In FIG. 11, the table 13 of FIG. 6 has recorded three correspondence relationships of the tape mark flags, data block physical block IDs (physical number), and data block logical block IDs (logical number).

Figure 12:
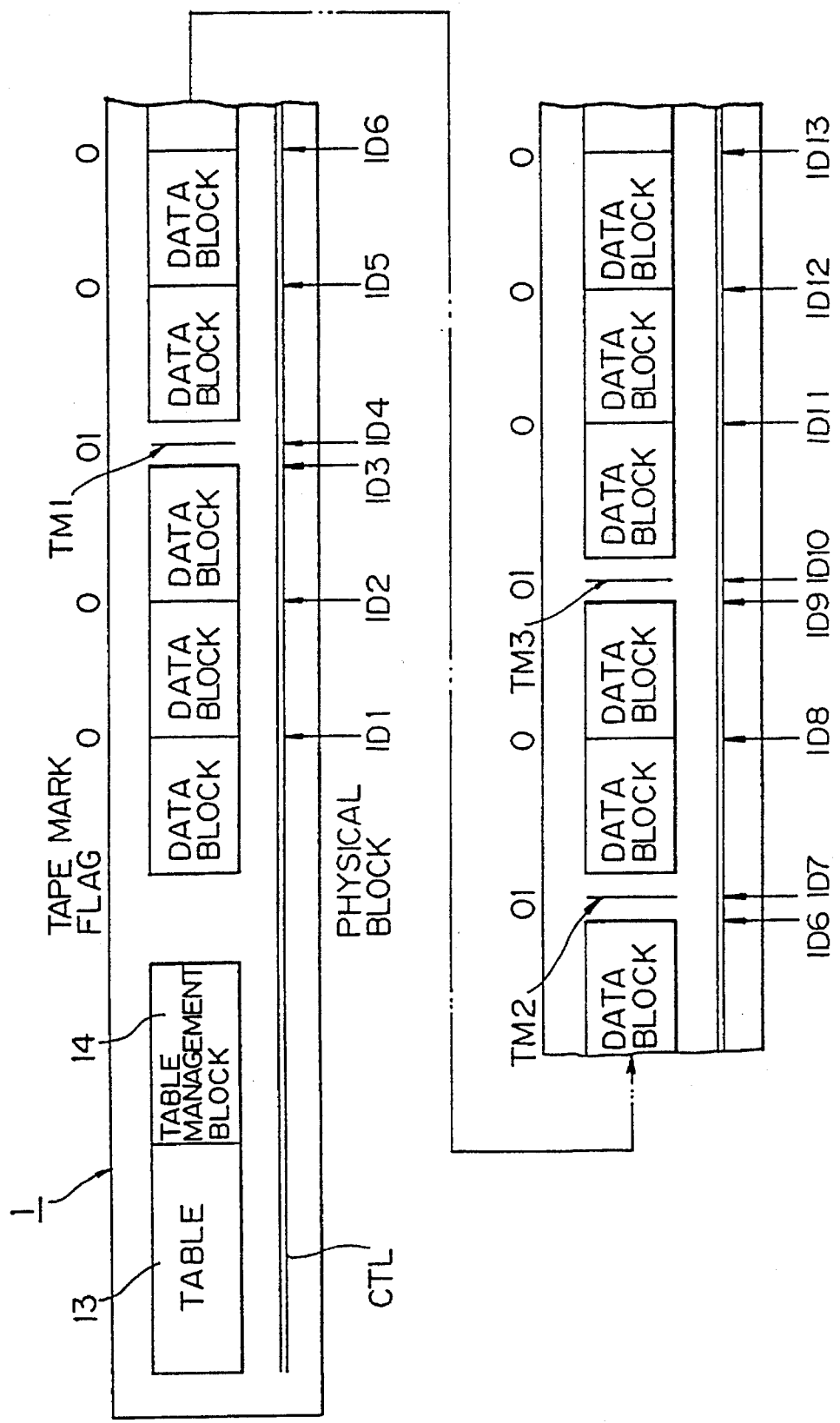
FIG. 12 is a view showing the content recorded in the magnetic tape corresponding to the table structure of FIG. 11.

FIG. 12 is a view showing the content recorded in the magnetic tape corresponding to the table structure of FIG. 11.

First, for the tape mark flags of FIG. 11, "1" is set for the tape marks TM1, TM2, and TM2 at the ends of the data files, while "0" is reset for the data blocks other than the tape marks.

The physical block IDs of the data blocks are determined by the count of the control track CTL. For example, they are registered in the table 13 as shown in FIG. 11 in the order of the physical blocks ID1, ID2, and ID3 of the file comprised of the first three data blocks.

In this case, looking at the tape mark flags of the data blocks, the tape mark flags of the first, second, and third physical blocks ID1, ID2, and ID3 are reset to "0", while the tape mark flag of the physical block ID4 of the fourth tape mark TM1 is set to "1".

Correspondence is given to the flags showing the presence of tape marks on the magnetic tape 1 and the physical block IDs of the blocks with the logical block IDs of the data blocks used for the data access in the storage control unit.

Referring again to FIG. 10, a management flag showing the existence of table renewal is recorded in the table management block 14 provided after the table 13.

Figure 22:
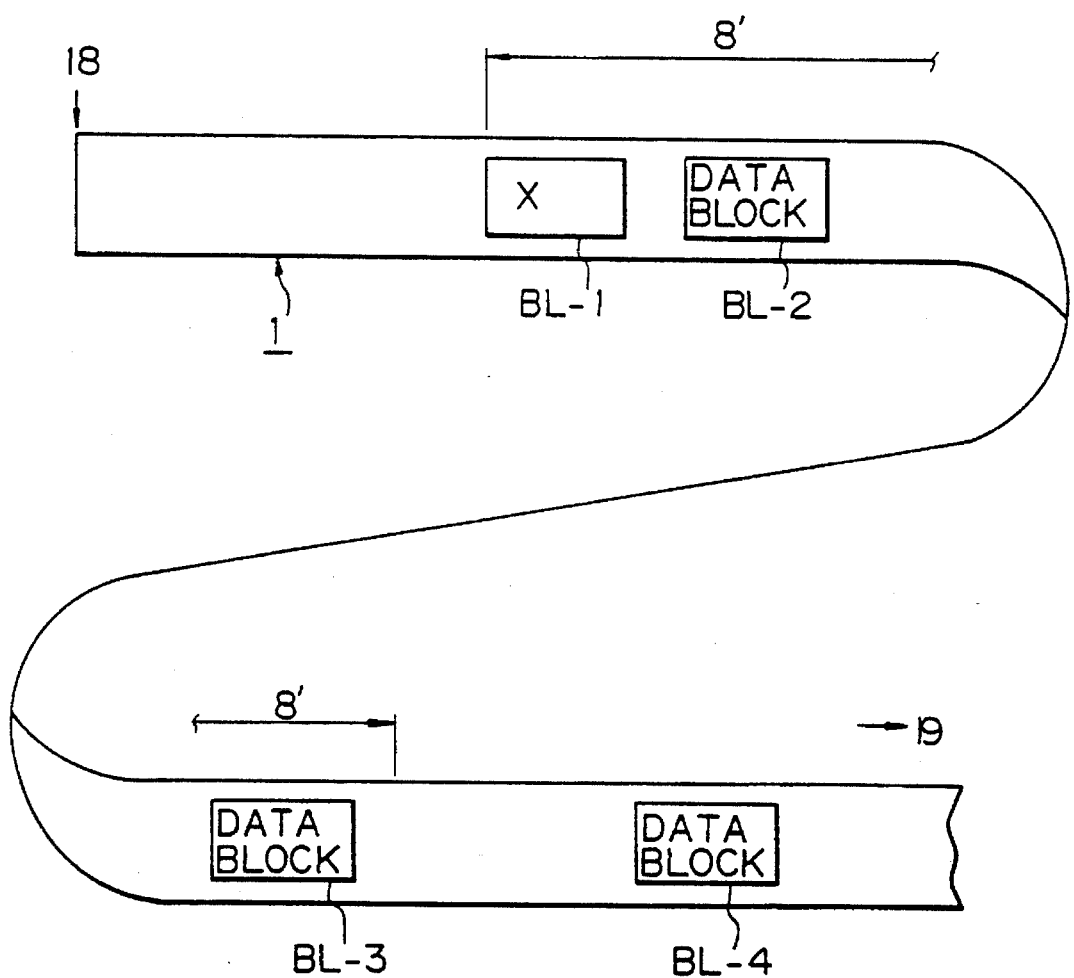
FIG. 22 is a view for explaining conventional magnetic tape access management.

That is, the table 13 at the head of the magnetic tape 1 is read and opened in the data buffer 22 shown in FIG. 22 when the magnetic tape 1 is loaded into the drive unit 2. The table 13 shown in FIG. 11, for example, opened in the data buffer 2 is used for high speed positioning on the magnetic tape.

When writing is performed on a new magnetic tape 1, the table 13 in the data buffer 22 is renewed each time.

On the other hand, when unloading the magnetic tape 1, the table 13 opened in the data buffer 22 is renewed by recording it in the area of the table 13 at the head of the magnetic tape 1.

When the magnetic tape is unloaded due to a power outage or other mishap, however, it is not possible to record or renew the table 13 in the data buffer 22 on the magnetic tape 1.

To judge if the table 13 has been normally renewed upon unloading, a management flag is recorded in the table management block 14.

That is, when the table 13 has been normally renewed, i.e., recorded on the magnetic tape 1, the management flag in the table management block 14 is set to "1". On the other hand, at loading, the management flag in the table management block 14 is reset to "0".

Therefore, when renewal of the table 13 was not possible in unloading due to a power outage etc., the management flag of the table management block 14 of the magnetic tape 1 remains reset at "0" and during the next loading, the management flag remains reset at "0" even if the table management block 14 is read. It may be judged that the table 14 on the magnetic tape 1 had not been normally renewed at the previous unloading.

The management flag of the table management block 14 of the magnetic tape 1 is set and reset using the table renewal flag register 43 of FIG. 9.

That is, during loading of the magnetic tape, the table management block 14 of the magnetic tape 1 is read by the write head 37 and stored in the table flag renewal register 43, and the set/reset state of the management flag is notified to the microprocessor 21.

If the management flag has been reset to "0" during loading, the microprocessor 21 judges that the table 13 of the magnetic tape 1 has been normally renewed during the previous unloading and, for example, executes a special table restructuring command so as to automatically restructure the table during loading or unloading.

Further, when a positioning command is received from the host computer before the table restructuring processing, positioning is performed while the data of the magnetic tape 1 is being read by the read head 38 without using the table 13 opened in the data buffer 22.

Next, an explanation will be given of the processing operation of the magnetic tape storage apparatus in the case of use of the table 13 shown in FIG. 11, while referring to FIG. 13 to FIG. 16.

FIG. 13A and FIG. 13B are flow charts showing the write operation of a data block on a magnetic tape and the write operation of tape marks.

First, at step S1, the high speed/low speed switch 39 is set to the usual speed, and at step S2, the drive motor DM is started.

Next, at step S3, it is judged if the command from the host computer is "write tape mark".

Here, as shown in FIG. 10 to FIG. 12, the tape mark 12 is made at the end of a file comprised of a plurality of blocks, so the initial command is not "write tape mark", but a write command for a data block. The routine therefore proceeds to step S4, where the data block is written on the magnetic tape 1.

Next, at step S5, the tape mark flag at the table location shown by a pointer 47 is reset since the tape mark is not written. Further, the pointer 47 is initialized to "0" each time the tape head position is reached.

Next, at step S6, the physical block ID register 42 and the logical block ID register 41 are copied to the position of the table 13 shown by the pointer 47 at that time. By this, the correspondence between the single tape mark flag shown in FIG. 11, the physical block ID, and the logical block ID is registered.

Next, at step S7, the physical block ID register 41 is incremented. Similarly, at step S8, the pointer 47 is incremented. Subsequent to this, similar processing is repeated through the steps S9 and S10 each time a write command for a data block is received.

When the write operation for the final block of a number of data blocks is completed, a command "write tape mark"

is issued from the host computer. The routine proceeds from step S3 to step S11, where the tape mark is written on the magnetic tape. At step S12, the tape mark flag of the location of the table 13 shown by the pointer 47 at that time is set to "1".

The rest of the processing is the same as the write operation of a data block.

If it is judged at step S9 that the command chain has been broken during a write operation of the data block or a write operation of a tape mark, the routine proceeds to step S1, where the drive motor DM is stopped.

Figure 14A:
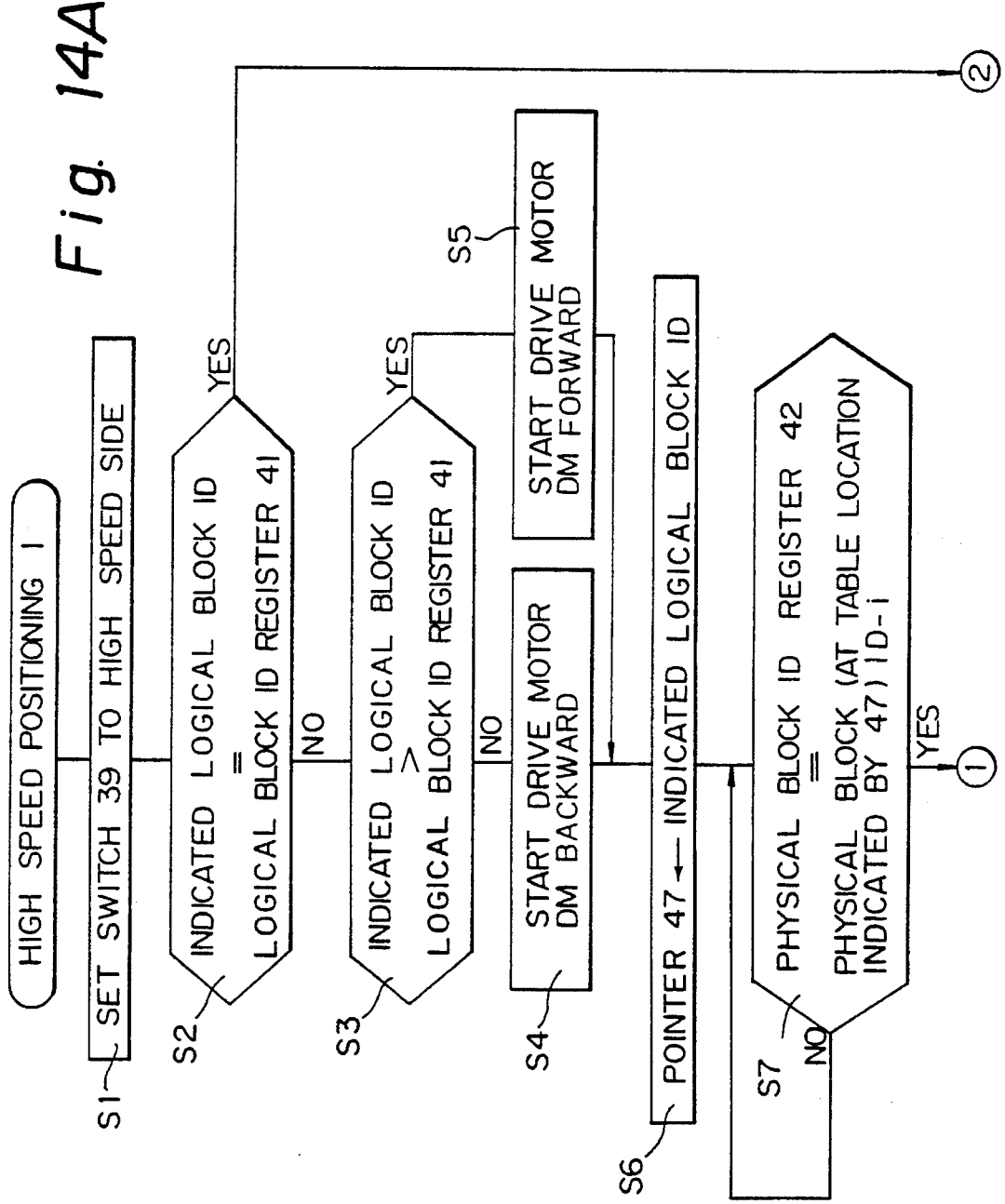
FIG. 14A and FIG. 14B are flow charts showing the operation for processing a high speed positioning command by specification of the logical block ID from a host computer.
Figure 14B:
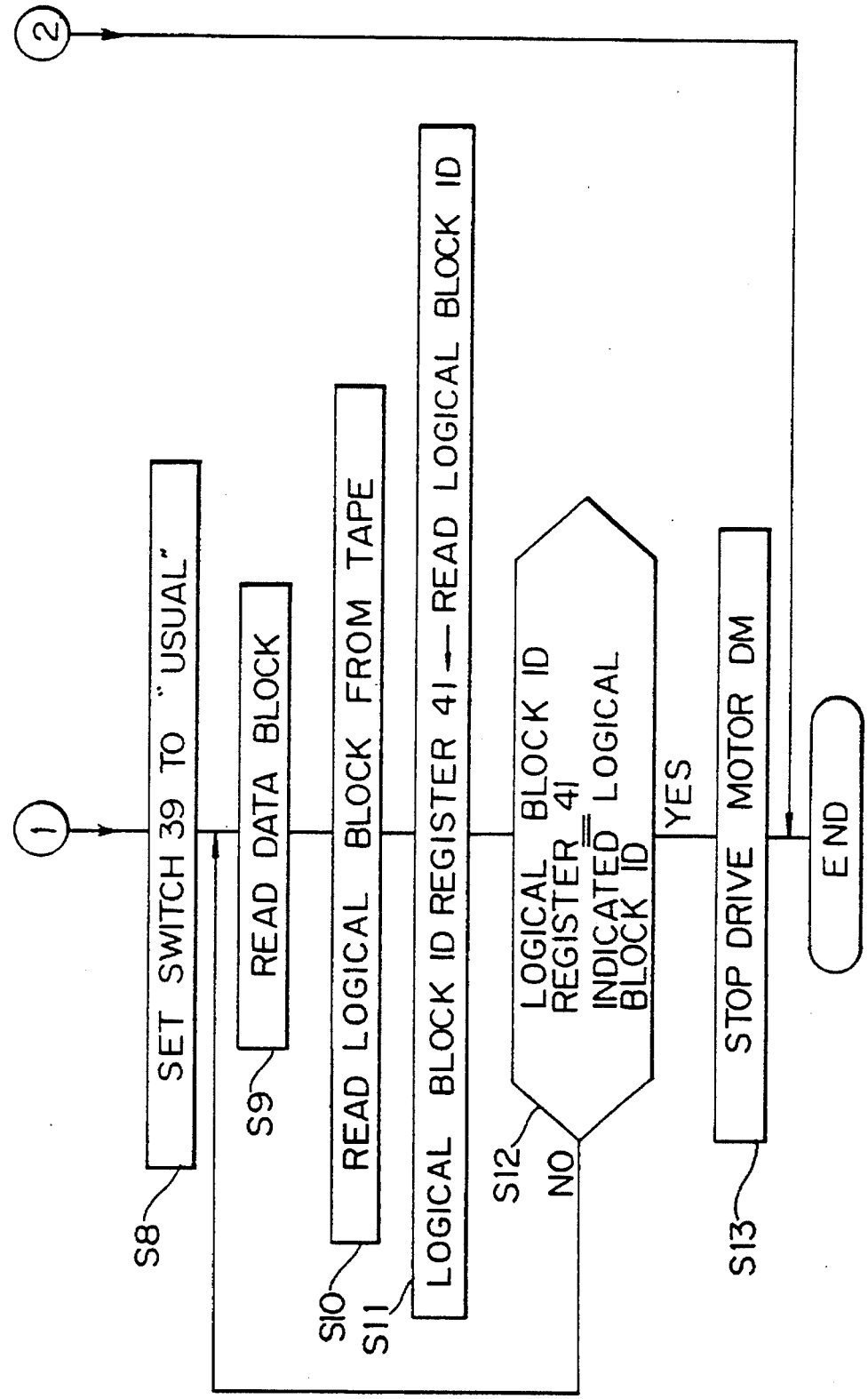

FIG. 14A and FIG. 14B are flow charts showing the operation for processing a high speed positioning command by specification of the logical block ID from a host computer.

When a high speed positioning command is received from the host computer, at step S1 the high speed/low speed switch 39 is set to the high speed side, then at step S2 it is checked if the logical block ID indicated is equal to the value of the logical block ID register 41 at the present time. If equal, the tape positioning is ended, so the series of processing steps ends.

If it is judged that the two do not match at step S2, the routine proceeds to step S3, where it is checked if the indicated logical block ID is larger than the value of the logical block ID register 41. If smaller, at step S4, the drive motor DM is started backward, while if larger, at step S5, the drive motor DM is started forward.

Next, at step S6, the logical block ID indicated by the host computer is set in the pointer 47, while at step S7, it is checked if the physical block ID obtained from the control track CTL during the high speed running becomes equal to the value obtained by subtracting a predetermined "i" from the physical block ID of the table 13 corresponding to the physical block ID set in the pointer 47.

The value of "i" relates to the time for switching from high speed to the normal low speed.

If it is judged at step S7 that the value of the physical block ID register 42 matches the value obtained by subtracting this predetermined "i" from the physical block ID of the table location indicated by the pointer 47, at step S8 the high speed/low speed switch 39 is set to the usual speed, then starting from step S9, the read operation of the data block by normal tape running is started.

That is, at step S10, the logical block ID is read from the tape, at step S11, the logical block ID read out is set to the logical block ID register 41, at step S12, it is judged that the positioning to the target data block is completed when the value of the logical block ID register 41 and the value of the logical block ID indicated match, and at step S13, the drive motor DM is stopped.

Figure 15A:
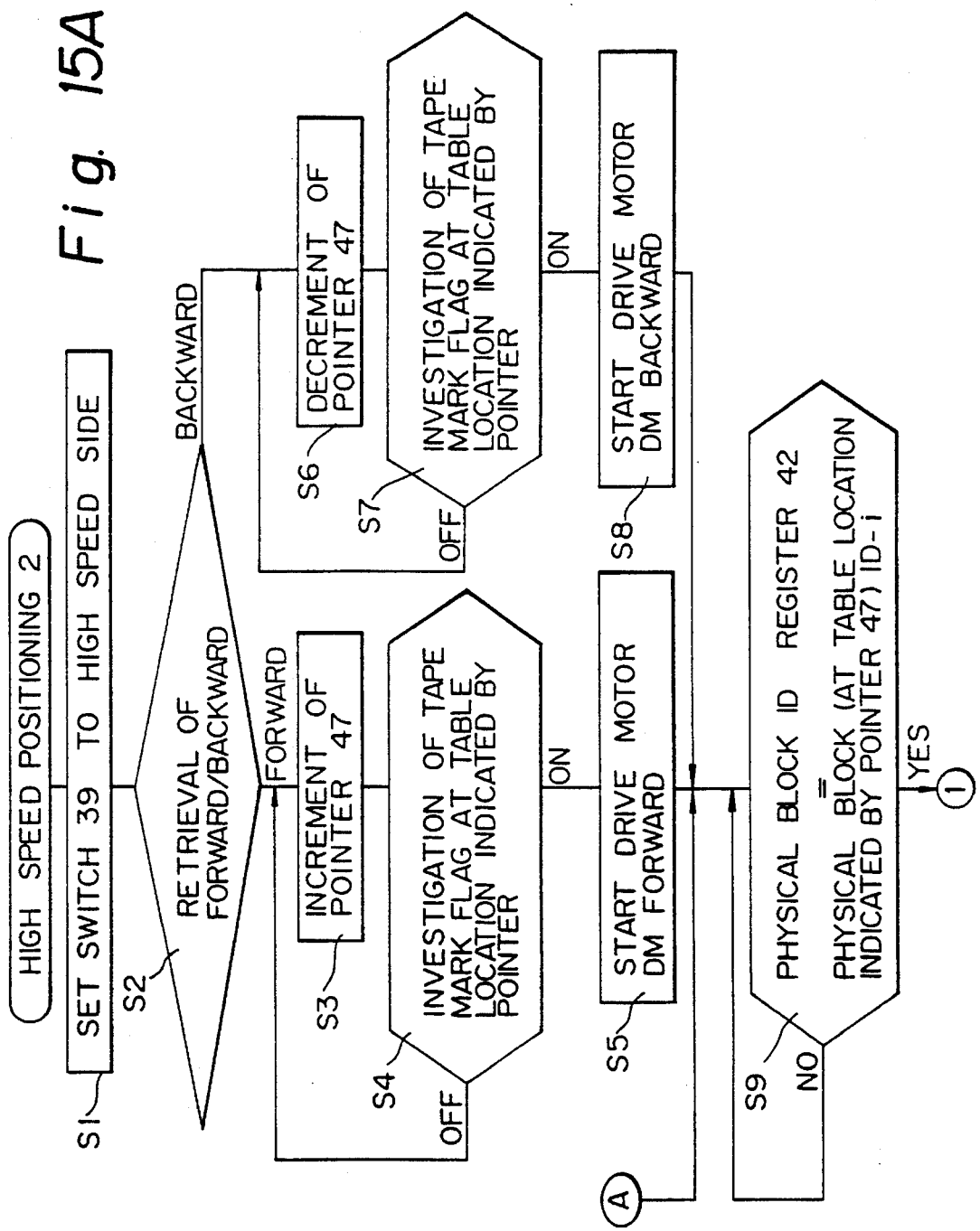
FIG. 15A and FIG. 15B are flow charts showing the operation for processing in the case of receipt of a positioning command to the next tape mark from the host computer.
Figure 15B:
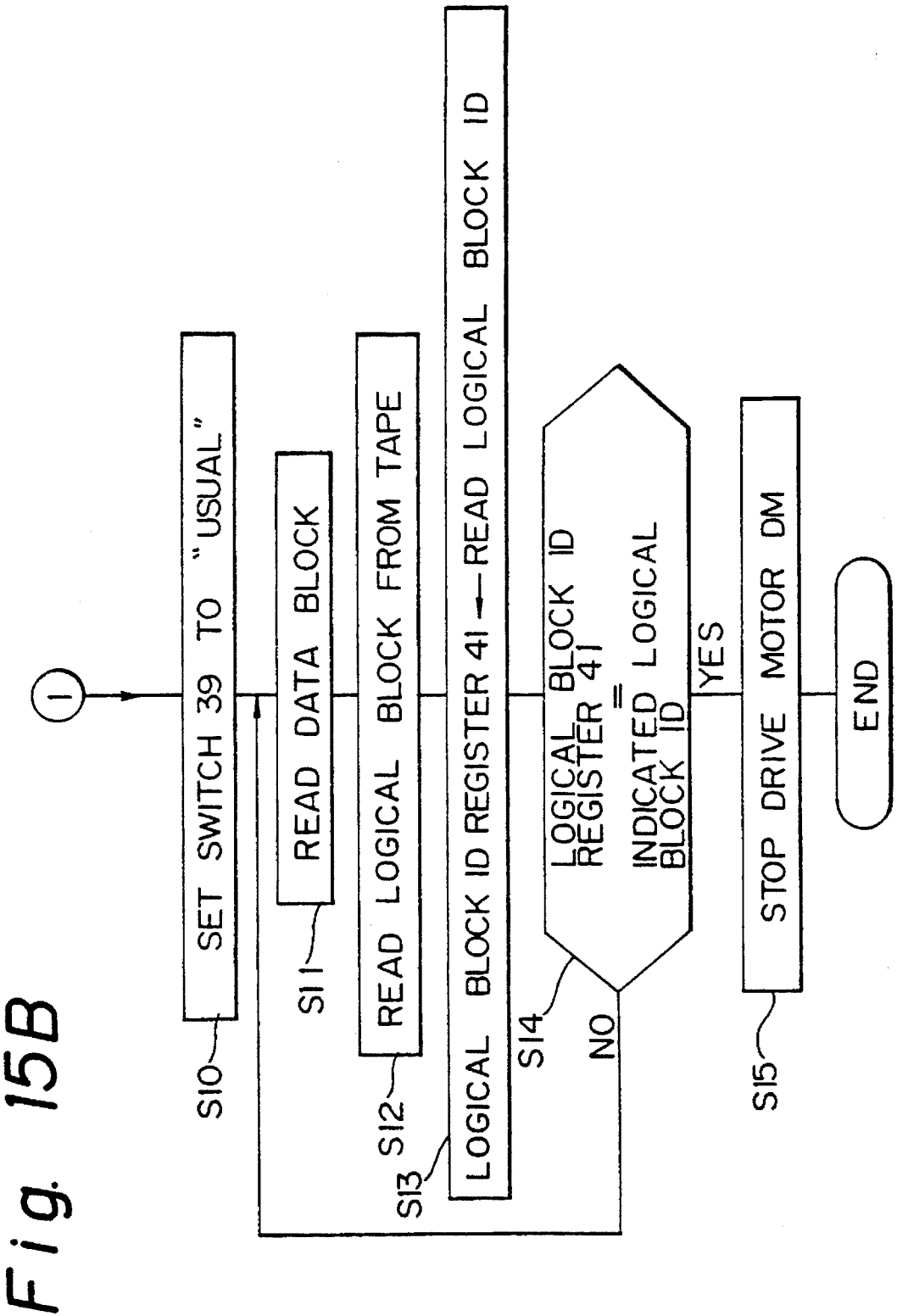

FIG. 15A and FIG. 15B are flow charts showing the operation for processing in the case of receipt of a positioning command to the next tape mark from the host computer.

First, at step S1, the high speed/low speed switch 39 is set to the high speed, then at step S2, it is judged if a forward or backward retrieval is performed.

If a forward retrieval, the routine proceeds to step S3, where the pointer 47 is incremented. At step S4, the tape flag of the table location indicated by the pointer 21 is investigated at step S4.

The tape mark flag is off if the location is not the file end. Since it is on at the file end, if it is judged at step S4 that the tape mark flag at the file end is on, the routine proceeds to step S5, where the drive motor DM is started forward.

On the other hand, when it is judged at step S2 that the retrieval is a backward one, at step S6, the pointer 47 is decremented. Similarly, at step S7, the tape mark flag of the table location indicated by the pointer is investigated. When the value of the pointer 47 giving an on tape mark flag is obtained, at step S8, the drive motor DM is started backward.

If the drive motor DM is started at step S5 or step S8, at step S9, the tape is run at a high speed until the value of the physical block ID register 42 and the value obtained by subtracting the predetermined value "i" from the physical block ID of the table location indicated by the pointer 47 match. When the two match, the routine proceeds to step S10, where the high speed/low speed switch 39 is set to the usual low speed and the tape is run normally. At step S11, the data block is read. At step S12, the logical block ID from the tape is read, at step S13, the logical block ID is stored in the logical block ID register 41, at step S14, it is judged if the value of the logical block ID register 41 and the value of the logical block ID indicated match, and at step S15, if they match, the drive motor DM is stopped and the positioning is ended.

Figure 16A:
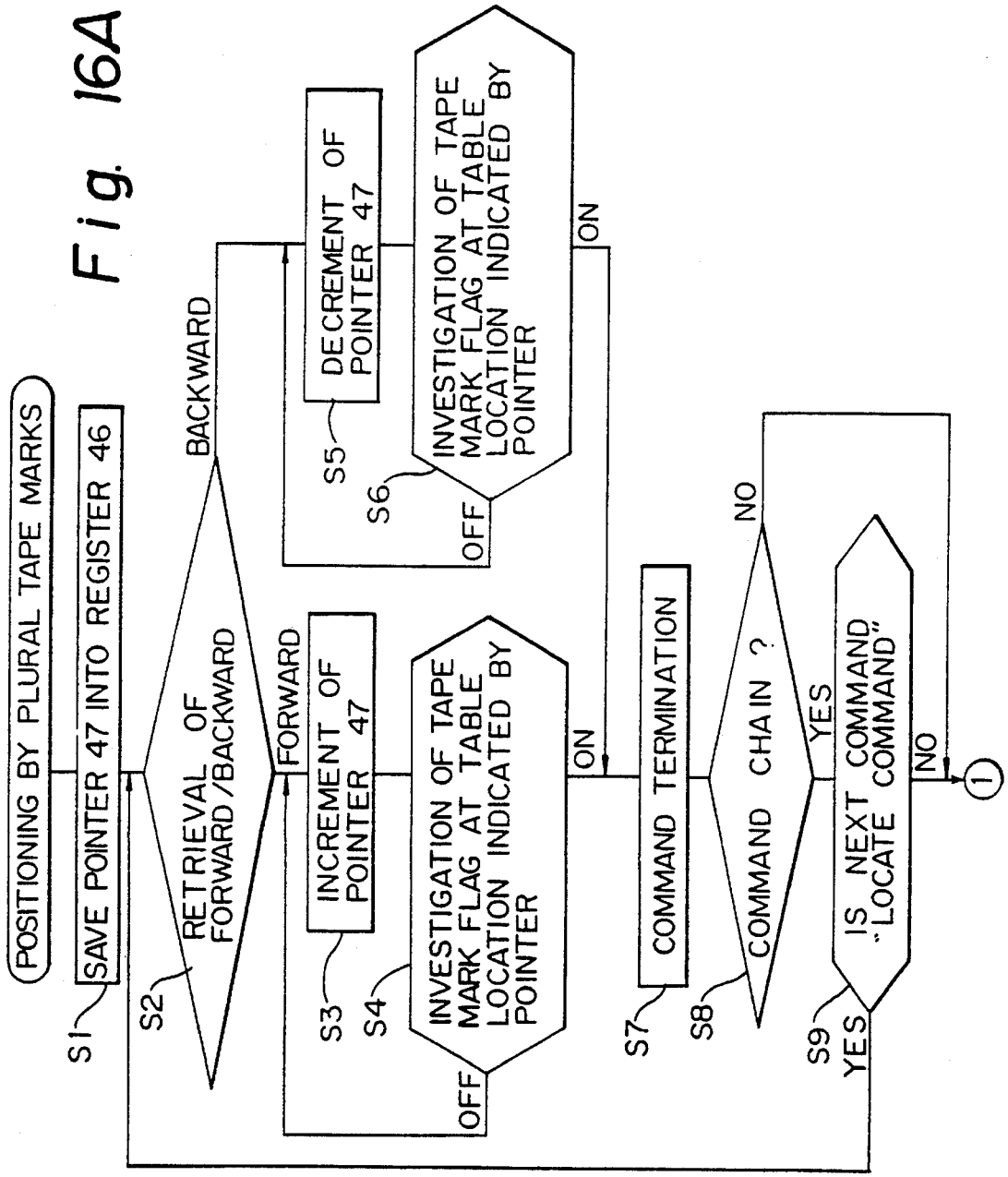

FIG. 16A and FIG. 16B are flow charts showing the operation for processing a plurality of commands all together when receiving a plurality of "position to the next tape mark" commands from the host computer.

At step S1, the pointer 47 is first saved in the register 46.

Next, at step S2, it is checked if the retrieval is a forward or backward one. If a forward one, then at step S3, the pointer 47 is incremented and, at step S4, the pointer 47 is repeatedly incremented until the tape mark flag at the table location indicated by the pointer becomes asserted.

On the other hand, if a backward retrieval is to be performed, at step S4, the pointer 47 is decremented, while at step S6, the pointer 47 is repeatedly decremented until the tape mark flag of the table location indicated by the pointer becomes asserted.

Next, at step S7, a command termination processing is executed and at step S8 it is checked if the next command chain exists.

When a number of commands continue, it is judged at step S8 that a command chain exists. At step S9, it is checked if the next command is a command of "position to the next tape mark" (LOCATE COMMAND). If this command, then the routine returns once again to step S2, where the processing is repeated in the same way.

If the command chain has broken at step S8 or if the command is another one at step S9, the routine proceeds to step S10, where the value of the register 46 where the initial value of the pointer 47 was saved and the value of the pointer 47 changed at step S3 or step S5 are compared. If the two match, the tape has not been driven at all, so the routine proceeds to step S14, where the tape is stopped and the command is terminated.

On the other hand, if the tape is not run normally, the two do not match at step S10, so the routine proceeds to step S11. At step S11 the initial value of the pointer 47 saved in the register 46 and the value of the pointer 21 at the present time are compared in magnitude. If the initial value of the pointer is smaller than the current value, at step S12, the drive motor DM is started forward and a high speed feed of the magnetic tape is started.

On the other hand, if the initial value of the pointer is larger than the current value of the pointer at step S11, at step S13 the drive motor DM is started backward and similarly a reverse high speed tape feed is performed.

Next, the routine jumps to step S9 in FIG. 15A, where like the processing operation of the first "position to next tape mark" command, high speed positioning of the tape is performed to a position found by subtracting the predetermined value "i" from the physical block ID of the table shown by the pointer 47 based on the plurality of tape marks, and then the target block is positioned to by a usual read operation.

FIG. 17 is a view showing a specific example of the table of FIG. 7.

In FIG. 17, the table 13 of FIG. 7 has registered in it the correspondence relationship between the physical block IDs corresponding to the tape marks showing the file ends of the magnetic tape and the logical block IDs corresponding to the tape marks.

Figure 18:
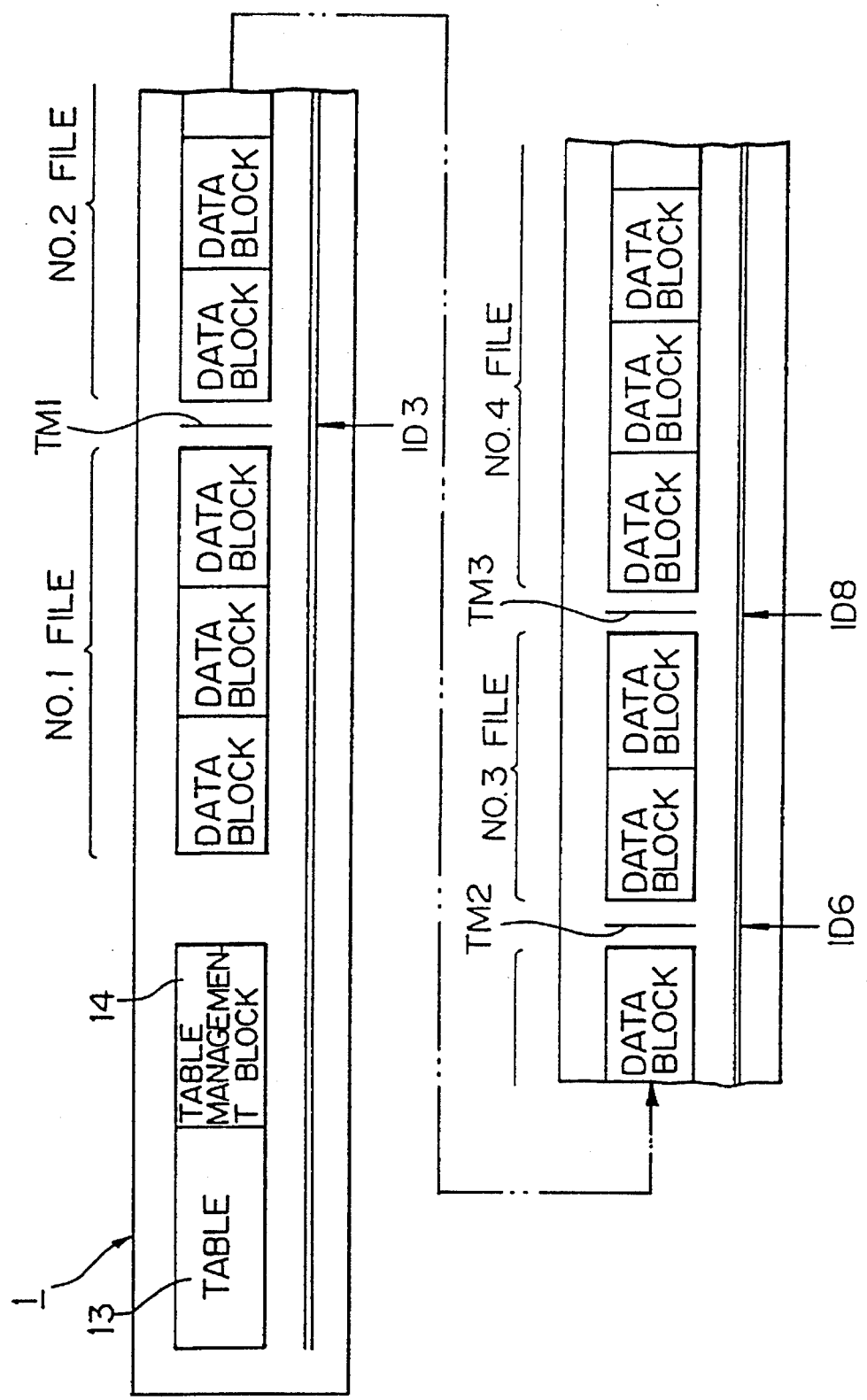
FIG. 18 is a view showing the content recorded on a magnetic tape corresponding to the table structure of FIG. 17.

FIG. 18 is a view showing the content recorded on a magnetic tape corresponding to the table structure of FIG. 17. In the figure, the magnetic tape 1 has registered on it in the user area 8 following the table 13 and the table management block 14 a no. 1 file comprising a number of data blocks, a no. 2 file, a no. 3 file ... At the ends of the files are registered tape marks TM1, TM2, TM3 ...

The table 13 of FIG. 17 has registered in it the correspondence relationship between the physical block ID3 of the initial tape mark TM1 of FIG. 18 and the corresponding logical block ID3. The same applies to the tape marks TM2 and TM3.

In this way, the table 13 of FIG. 17 does not have a correspondence table for all the data blocks on the table 13 as in FIG. 11, but is given a correspondence table only for the tape marks to simplify the same.

The high speed positioning using the table 13 of FIG. 7 entails finding from table 13 the physical block ID of the tape mark closest to the data block of the desired destination, positioning to this at a high speed, then switching to the normal low speed running to find the actual data block.

Therefore, the efficiency is lower than the table 13 of FIG. 11, but the structure of the table 13 of FIG. 17 is simple and it is possible to greatly reduce the amount of the data buffer 22 occupied by the table when loading the tape into the unit 2.

Next, the processing operation of the magnetic tape storage apparatus in the case of use of the table 13 of FIG. 17 will be explained while referring to FIG. 19 to FIG. 21.

Figure 19A:
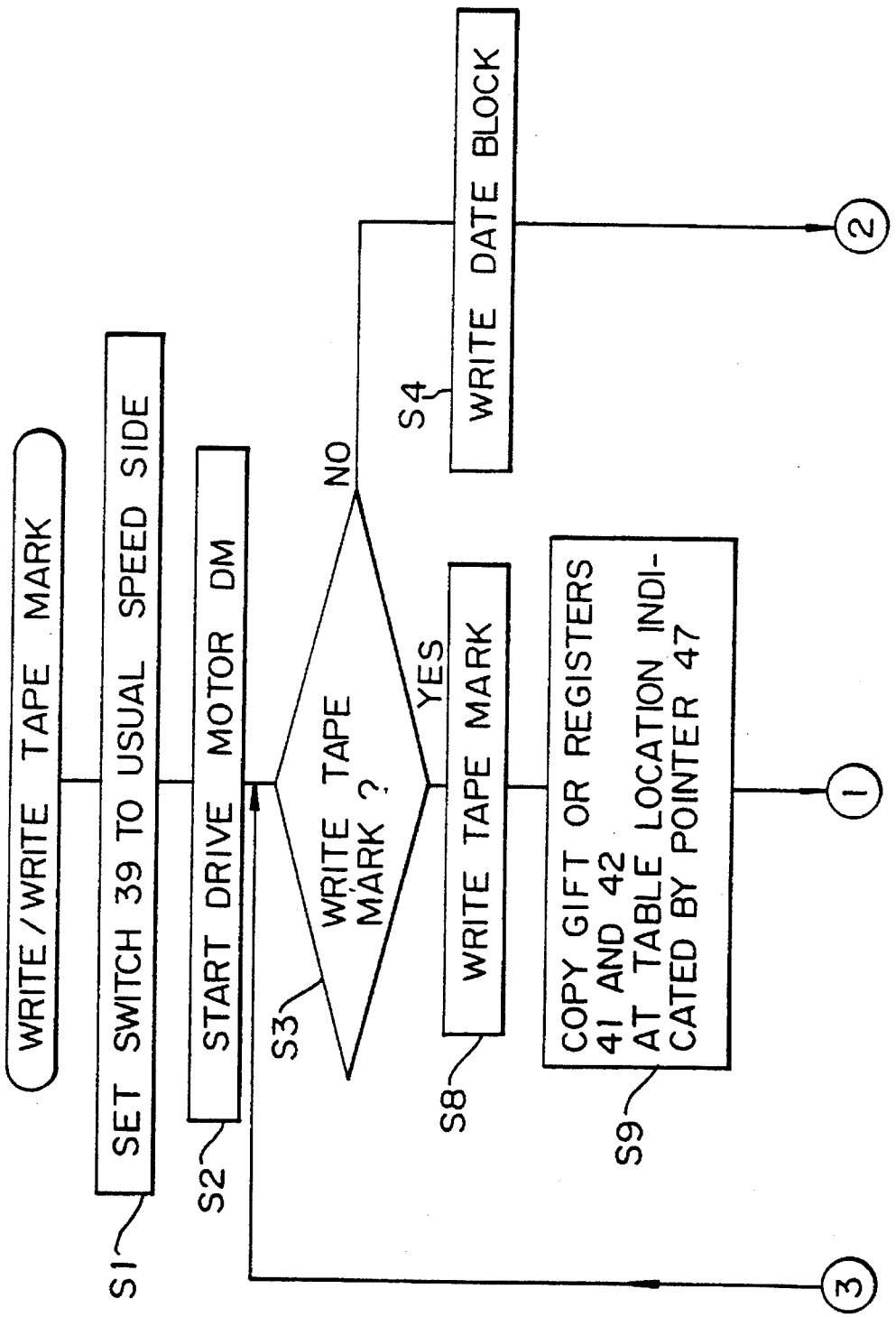

FIG. 19A and FIG. 19B are flow charts showing the operation for processing a write operation of block data and a write operation of tape marks at the file end in the case of use of the table of FIG. 17.

First, at step S1, the high speed/low speed switch 39 is set to the usual low speed, then at step S2 the drive motor DM is started.

Next, at step S3, the write command of the first data block is discriminated, then the routine proceeds to step S4, where the data block is written.

Next, at step S5, the logical block ID register 41 is incremented, then at step S6, the existence of the next command is judged. If there is a command, then at step S7, it is discriminated if this is a write command of the data block or a write command of a tape mark. The routine returns to step S3, then the same processing is repeated until a write command for a tape mark is obtained.

If it is judged at step S3 that the file end has been reached and there is a write command for a tape mark, then at step S8 the tape mark is written and at step S9 the physical block ID register 42 and the logical block ID register 41 at this time are copied to the table location indicated by the pointer 47, and a correspondence chart of the physical block IDs of the tape marks shown in FIG. 17 for one set of file data and the logical block IDs of the tape marks is prepared.

After this, the same processing is repeated every time file data is received. If the command chain is broken at step S5 or the command is other than a write command for a data block or tape mark at step S7, the routine proceeds to step S11, where the drive motor DM is stopped.

Figure 20A:
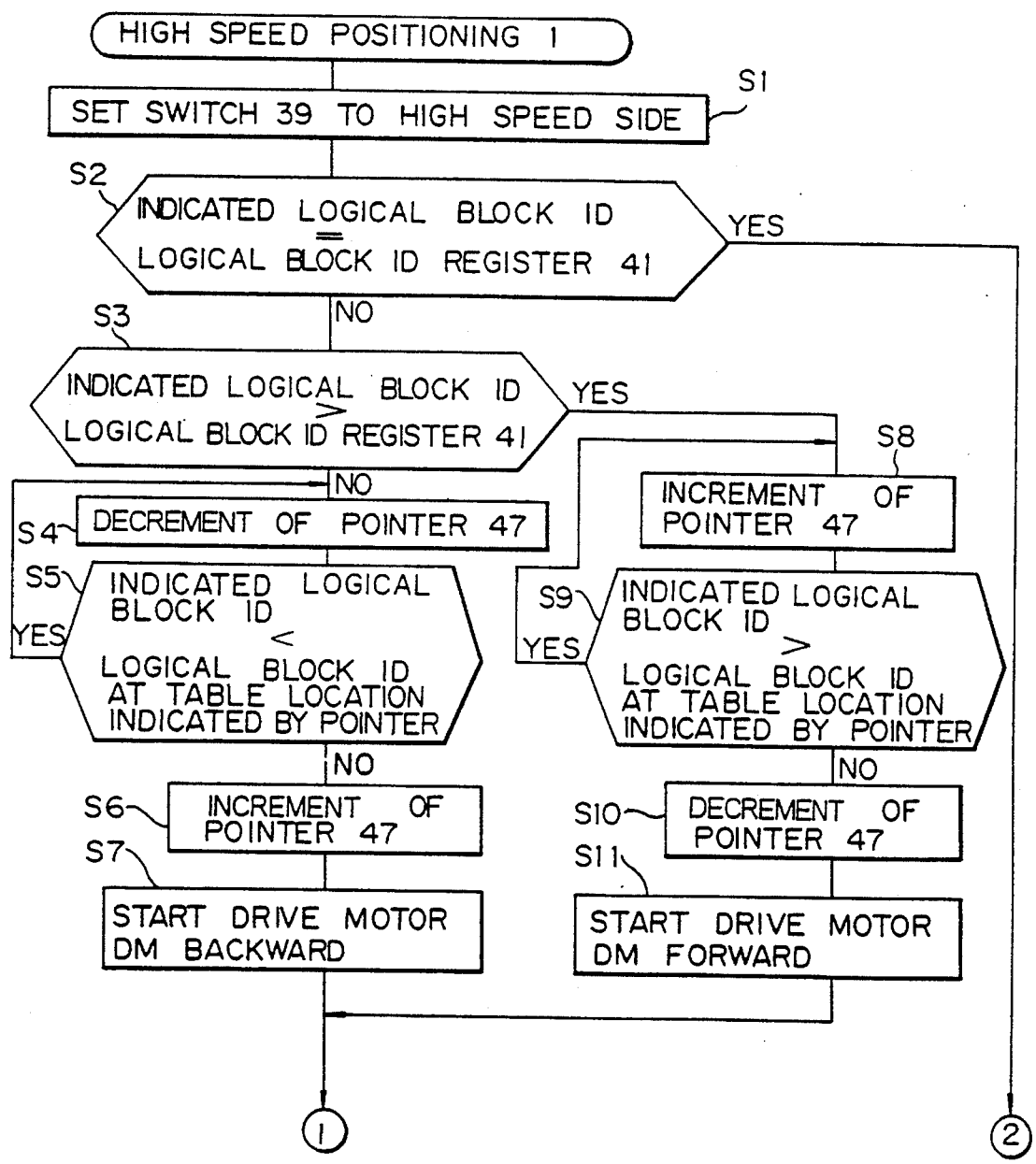
FIG. 20A and FIG. 20B are flow charts showing the operation for processing in the case of receipt of a high speed positioning command by specification of a logical block ID from the host computer in the case of use of the table of FIG. 17.
Figure 20B:
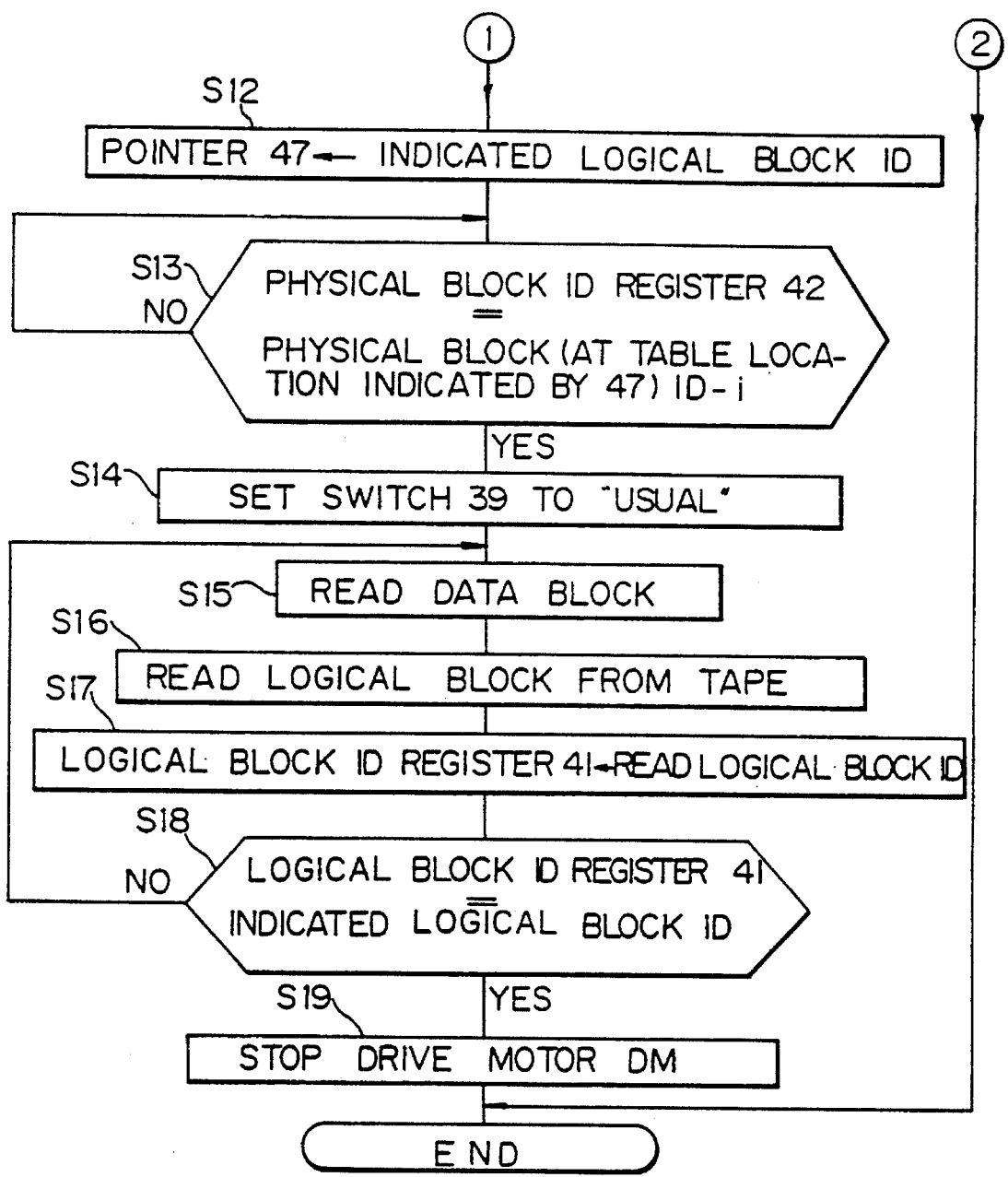

FIG. 20A and FIG. 20B are flow charts showing the operation for processing in the case of receipt of a high speed positioning command by specification of a logical block ID from the host computer in the case of use of the table of FIG. 17.

First, at step S1, the high speed/low speed switch 39 is set to the high speed side, then at step S2 it is checked if the logical block ID indicated matches the value of the logical block ID register 41 at that time. If they match, the tape positioning has ended, so the series of processing steps is ended.

If it is judged that they do not match at step S2, the routine proceeds to step S3, where it is checked if the indicated logical block ID is larger than the value of the logical block ID register 41. At step S4 and step S5, the pointer 47 is decremented until the logical block ID of the table location indicated by the pointer becomes larger than the logical block ID indicated.

Next, at step S6, the pointer 47 is incremented by one to return to the tape mark one position before the target block, then at step S7, the drive motor DM is started backward.

On the other hand, if the value of the logical block ID indicated is larger than the value of the logical block ID register 41 at step S3, then by the processing at step S8 and step S9, the pointer 47 is incremented until the logical block ID indicated becomes larger than the logical block ID of the table location shown by the pointer 47. At step S10, the pointer 47 is conversely decremented by one, the tape mark one position before the target block is indicated by the pointer 47, then at step S11 the drive motor DM is started forward.

When high speed feed of step S7 or step S11 is started, the value of the logical block ID indicated is set in the pointer 47, then at step S13, the high speed feed is performed until the value of the physical block ID register 42 obtained from the control track CTL matches the value obtained by subtracting the predetermined value "i" from the physical block ID of the table location indicated by the pointer 47.

Next, at step S14, the high speed/low speed switch 39 is set to the usual low speed side, then the processing of step S15 to step S18 is used to position to the target logical block ID while reading the data block of the tape. When the positioning is ended, the drive motor DM is stopped at step S19.

Figure 21A:
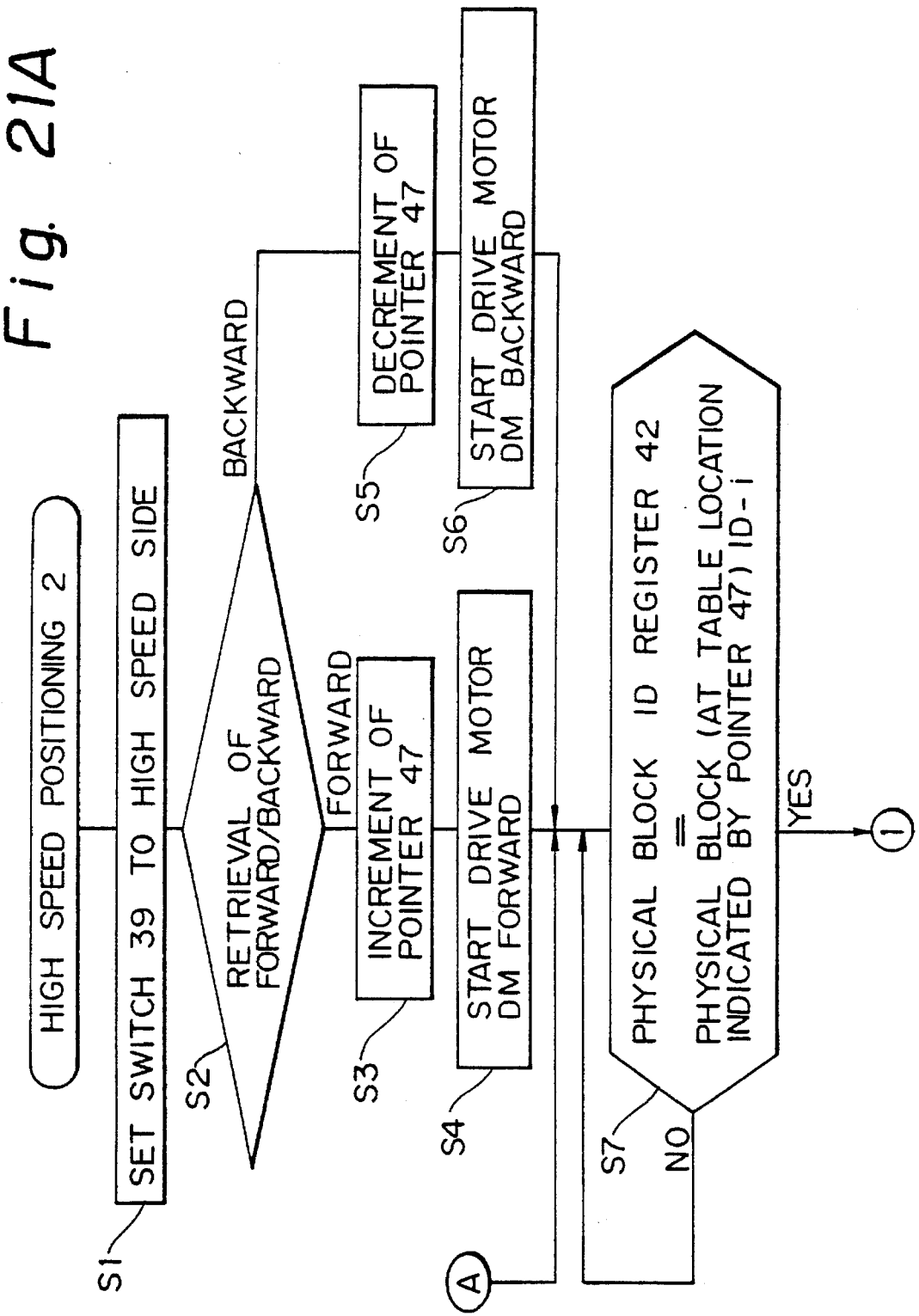

FIG. 21A and FIG. 21B are flow charts showing the operation of processing in the case of receipt of a command of "position to the next tape mark" from the host computer in the case of use of the table of FIG. 17.

First, at step S1, the high speed/low speed switch 39 is set to the high speed side and at step S2 it is judged if the retrieval is forward or backward. If forward retrieval is to be performed, then at step S3, the pointer 47 is incremented and then at step S4, the drive motor is started forward.

If backward retrieval is to be performed, at step S5, the pointer 47 is decremented and then at step S6, the drive motor is started backward.

Next, at step S7, the tape is run and high speed feed is performed until the value of the physical block ID register 42 obtained from the control track CTL and the value obtained by subtracting the predetermined value "i" from the physical block ID of the table location indicated by the pointer 47 match. When they match, then at step S8, the high speed/low speed switch 39 is set to the usual speed side, then at step S9 to step S12, the target logical block is positioned to while reading the data blocks by the usual running and finally at step S13, the drive motor DM is stopped.

The processing operation in the case of receiving from the host computer a plurality of "position to the next tape mark" commands and executing them all at once is the same as that shown in FIG. 16A and FIG. 16B.

Using the above-mentioned table 13, there is no need to place the burden of storage on the host computer. It is possible to obtain the correspondence between the logical block IDs on the magnetic tape and the physical block IDs. The positioning to the data blocks or tape marks, which in the past had been performed at the same speed as the usual reading and writing, may be performed at a high speed and it is possible to tremendously improve the access performance of the magnetic tape storage apparatus.

Second Management Information Table

By using the second management information table of the present invention, an access management system for a magnetic tape storage apparatus is realized which gives position information of the user area to the magnetic tape and manages the access in units of the medium.

In general, the magnetic tape storage apparatus can only judge whether a user area has been recorded and effectively written on the magnetic tape by actually trying to read the user data. Therefore, it is difficult in practice to manage the position information specifying a user area by the host computer. Since the effective user area cannot be determined, the access efficiency falls in some cases.

FIG. 22 is a view for explaining the conventional magnetic tape access management.

In a conventional magnetic tape storage apparatus, the areas of a magnetic tape where user data can be written are limited. When writing user data, as shown by the data blocks BL-1, BL-2, and BL-3 of FIG. 22, data is successively written in block units in the write enable area 8' of user data. When reading the user data, the written data blocks BL-1, BL-2, and BL-3 are successively read out in the direction from the head 18 to the end 19 of the magnetic tape 1.

Further, when renewing the user data, the pre-renewal data blocks are erased and then the renewed data is written.

With such a conventional access management of a magnetic tape storage apparatus, however, when writing of user data failed at the head block BL-1 of the write enable area 8' of the user data of FIG. 22, the same data ends up being written at the next data block BL-2 after the write-failed data block BL-1.

When reading out the data in such a case, the data of the write-failed data block BL-1 is read out and the end of the abnormality is confirmed, then the next data block BL-2 data is read out to obtain the correct data.

Therefore, when failing in the writing of the head data block, there was the problem that processing was performed to read out the write-failed data block data before reading out the normal data block, so the efficiency was poor.

Further, the final data block of the write enable area 8' of the user data, for example, the data block BL-3, is managed by software at the host computer side using the logical block ID's, but the data block BL-4 after the final data block BL-3 remains unerased and there was thus the problem of the data of the invalid data block BL-4 being read out due to some error or another.

According to the second management information table of the present invention, a magnetic tape storage apparatus is realized which manages the valid user data write enable areas in units of the media and improves the access efficiency.

Figure 23:
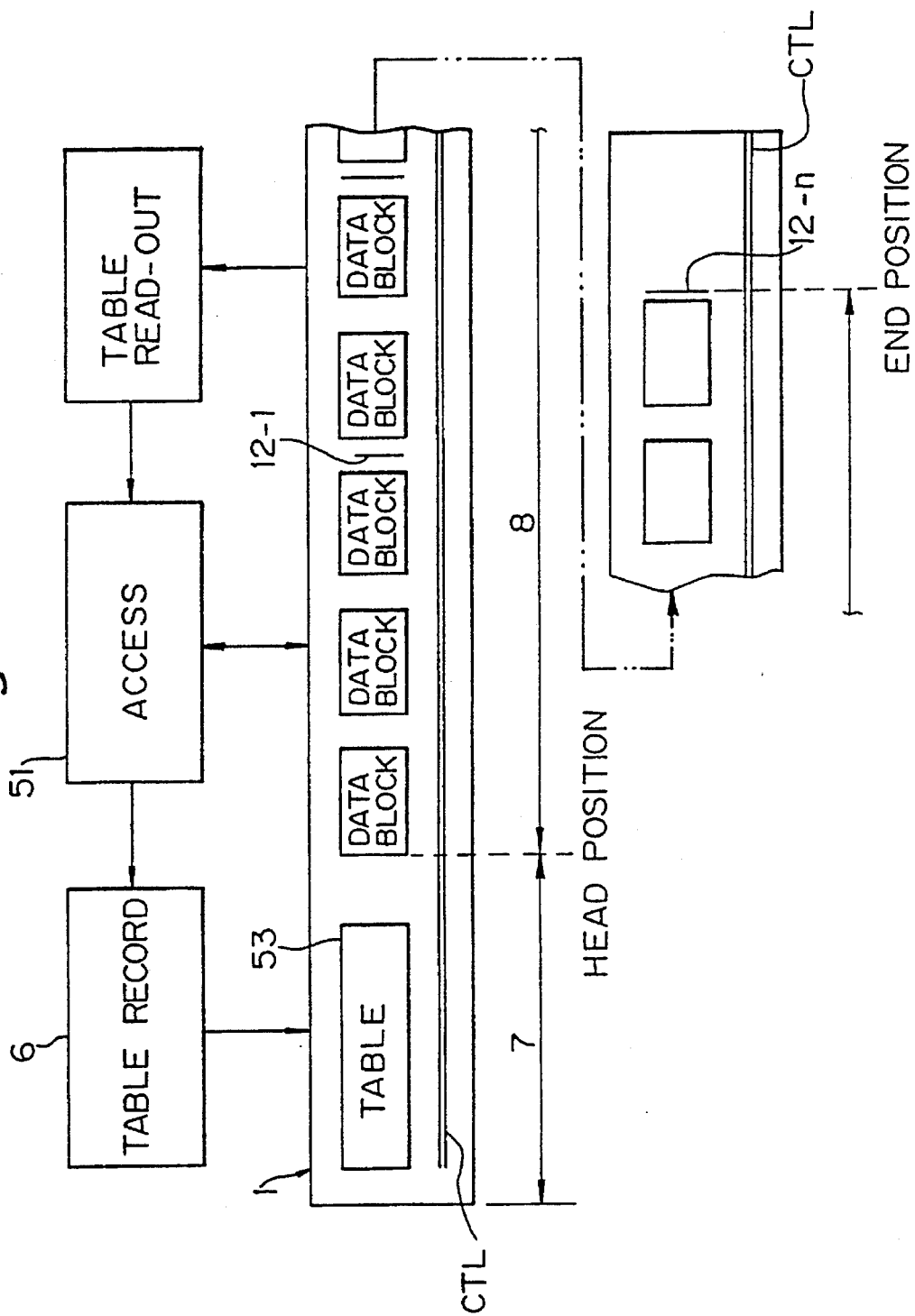
FIG. 23 is a view showing the basic structure in the case of use of the second management information table according to the present invention.

FIG. 23 is a view showing the basic structure in the case of use of the second management information table according to the present invention.

The magnetic tape storage apparatus of the figure cooperates with the control track CTL recording position information for determination of the physical position and writes on or reads from a magnetic tape 1 having a management information table 53.

In such a magnetic tape storage apparatus, provision is made of a table recording device 6 which records in the management information table 53 of the magnetic tape 1 the information of the head position and end position where user data has been effectively written and an access means 51 which performs writing or reading using as an effective area the area from the head position to end position of the user data obtained from the management information table 53 of the magnetic tape 1.

Here, the table recording device 6 records in the management information table 53 of the magnetic tape the physical position information (shown by the physical block ID) of the head data block of the user data effectively written on the magnetic tape 1 and the physical position information of the final data block of the same.

The table recording device 6 further may be made to record in the management information table 53 of the magnetic tape 1 the physical position information of the tape mark 12-1 of the head of the user data effectively written on the magnetic tape 1 and the physical position information of the tape mark 12-n of the end of the same.

Further, the table recording means 6 performs the write operation for the next position, when writing data at the head position of the user data and the write operation at that write position ends due to some abnormality, and records the position where the writing could first be done validly as the head position.

On the other hand, the access means 51 invalidates any read request received for a position over the final end of the user data validly written on the magnetic tape 1.

Further, the table recording device 6 records in the management information table 53 of the magnetic tape 1 the position information opened in the memory device 5 of the unit 3 upon unloading of the magnetic tape 1. The access device 51 reads the management information table 53 of the magnetic tape 1 upon loading of the magnetic tape 1, opens the position information in the memory device 5 of the unit 3, and manages the access of the same.

Therefore, information is recorded showing the head position and end position of the valid user data in the management information table 53, specifically the head position and end position of the data blocks of the user data or the head position and end position of the tape marks recorded at the end of data files comprised of one or more blocks.

By reading the position information recorded on the magnetic tape in the unit 3 and clarifying the areas where valid user data exists on the magnetic tape, it is possible to directly access the succeeding valid head block without processing a defective block, if there is a defect in the head block, and stop in advance the accessing of unnecessary blocks existing after the valid final block.

Figure 24:
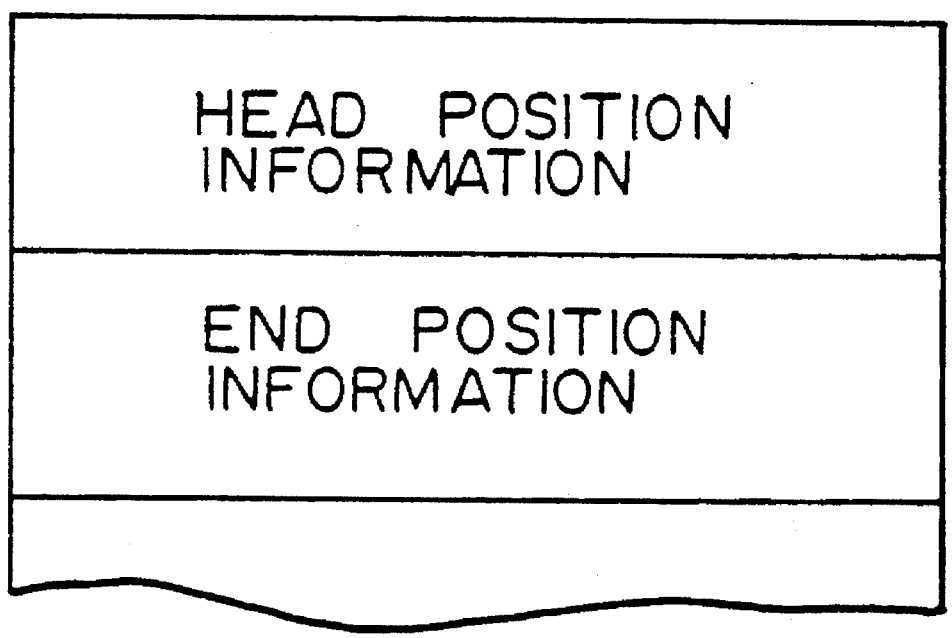
FIG. 24 is a view showing the second management information table.

FIG. 24 is a view showing the second management information table.

The embodiment of a magnetic tape storage apparatus in the case of use of the second management information table 53 is exactly the same in structure as that shown in FIG. 8. That is, referring to FIG. 8, the magnetic tape drive unit 2 is comprised of a drive controller 32 and a drive 34. Upon a command from the storage control unit 3, a direct access operation is performed, such as loading of the magnetic tape, tape feed to the access position, and unloading. That is, the table 53 recorded on the magnetic tape is read out and then opened in the data buffer 22. Based on the data of the head position and end position showing the user data area in which valid data was written, shown by the table 53, the microprocessor 21 executes accessing processing on the access request from the host computer.

Figure 25:
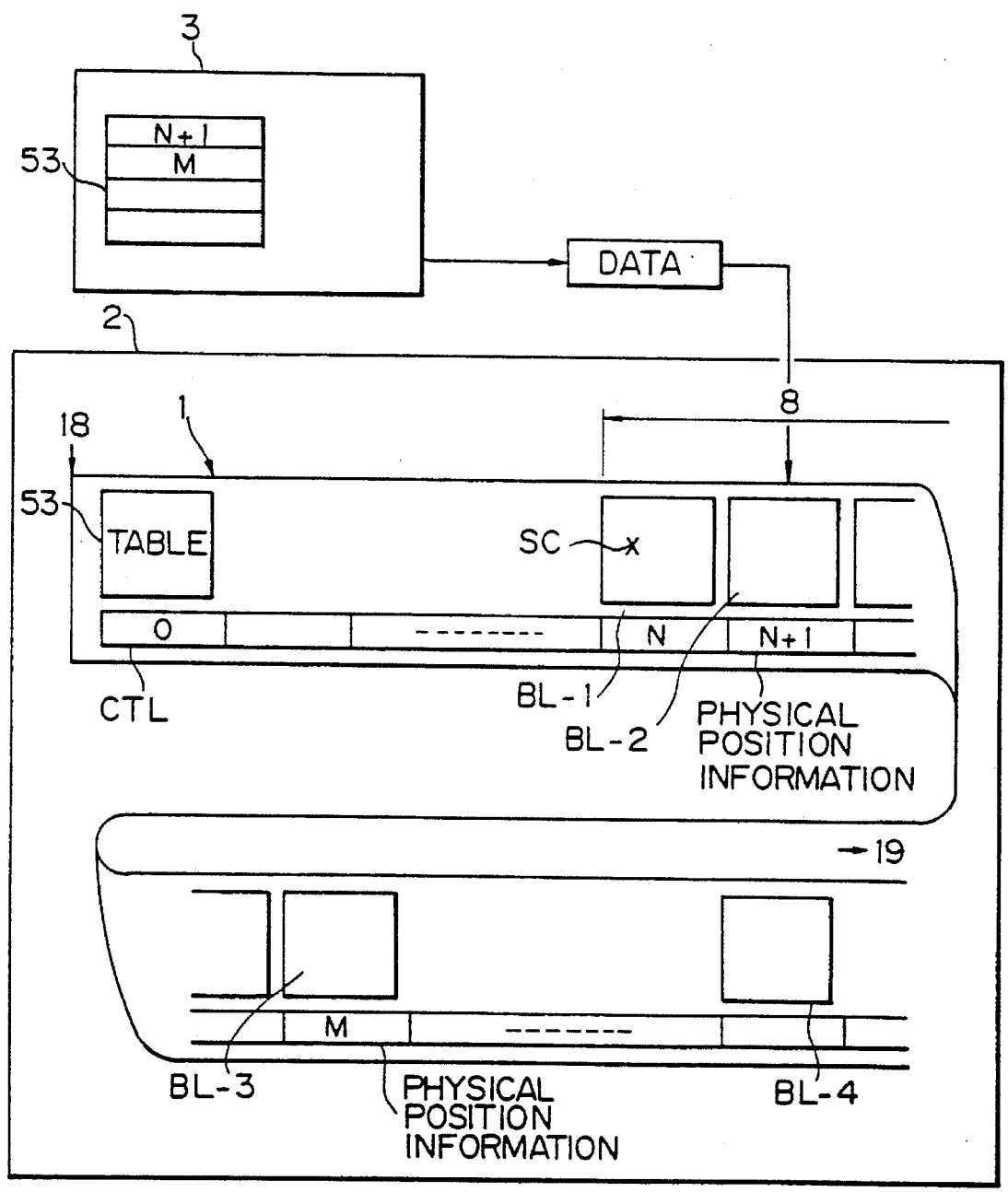
FIG. 25 is a view showing the state of the access management by the table 53 together with the format of the magnetic tape.

FIG. 25 is a view showing the state of the access management by the table 53 together with the format of the magnetic tape.

In FIG. 25, first the control track CTL is recorded in advance in parallel with the usual recording area. On the control track CTL are recorded values which increase by one with every predetermined distance.

The control track CTL is written on or read from by a head Hc exclusively for the control track.

Further, the management information table 53 is provided between the start of the magnetic tape 1 and the head position of the user area.

The management information table 53 can be written on or read from only by the storage control unit 3. It cannot be written on or read from by the user, that is, accessed from the host computer.

In the user area 8 are formed the data blocks BL-1, BL-2, and BL-3 of predetermined byte lengths, on which user data is recorded.

The first block BL-1 is recorded at the position shown by the physical position information N of the control track CTL.

In this example, there is a defect such as a scratch SC in the block BL-1, so it cannot be used as a valid user data area and therefore the block BL-2 of the next physical position information N+1 becomes the head block of the valid user area 8.

On the other hand, the block BL-3 shown by the physical position information M of the control track CTL is the end block of the valid user area 8.

Here, the case is shown where an unnecessary block BL-4 which had not been erased for some reason or another exists after the end block BL-3 of the valid user area 8.

With such a format of the magnetic tape 1, the memory means 5 of the storage control unit 3 side, for example, the control storage 23 (FIG. 8), has stored in it the physical position information N+1 of the head block BL-2 and the physical position information M of the end block of the user data effectively written in the tape management information recorded in the management information table 53 of the magnetic tape 1.

The physical position information of the head block BL-2 and the end block BL-3 uses the physical block identification (ID) obtained from the control track CTL.

On the other hand, the access position is designated with respect to the physical block ID by the logical block ID from the host computer.

Figure 26A:
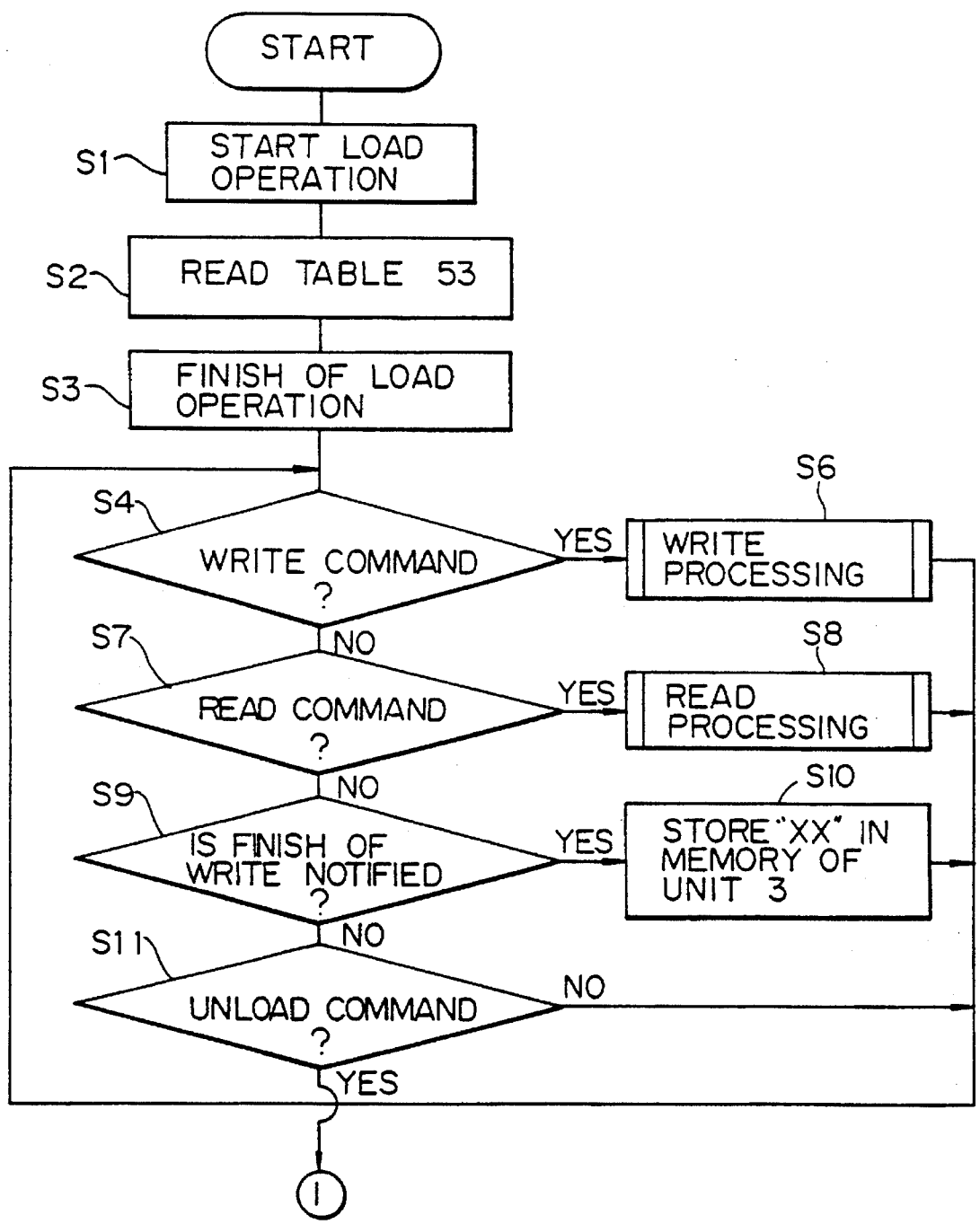
FIG. 26A and FIG. 26B are flow charts showing the operation for overall processing from the loading of the magnetic tape to the unloading of the same in the magnetic tape storage apparatus shown in FIG. 23.
Figure 26B:
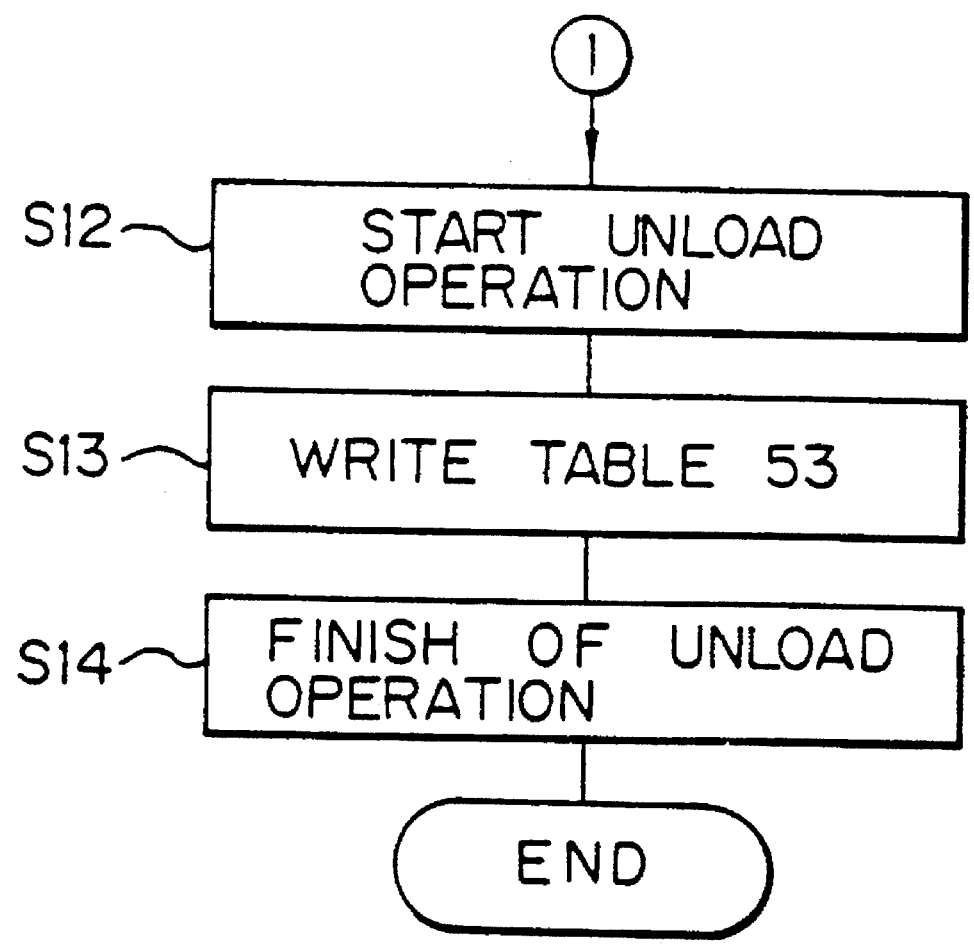

FIG. 26A and FIG. 26B are flow charts showing the operation for overall processing from the loading of the magnetic tape to the unloading of the same in the magnetic tape storage apparatus shown in FIG. 23. First, when a load command is received from the host computer, at step S1 the load operation is commenced and at step S2 the tape management information is read from the management information table 53 of the magnetic tape 1 and opened in the data buffer 22.

Next, at step S3, when the load operation ends, the routine proceeds to step S4, where when it is judged that the command from the host computer is a write command, the routine proceeds to the write processing of step S6.

The write processing of step S6 is shown in detail by the flow chart of FIG. 27.

On the other hand, when the command from the host computer is for a read operation, the routine proceeds from step S7 to step S8 where the read processing is performed. The read processing of step S8 is shown in detail in the flow chart of FIG. 28.

Further, when the instruction from the host computer is a notification of the end of the write operation, the routine proceeds to step S10, where the value XX showing the end position of writing stored in the register is stored at the memory position showing the end position in the memory of the unit 3, that is, the control storage 23.

On the other hand, if an unload command is received from the host computer, this is discriminated at step S11 and the routine proceeds to step S12, where the unload operation is started. During the unload operation, the magnetic tape is rewound to the head position. At step S13, the tape management information which had been stored in the memory in the unit 3 is written into the management information table 53 of the magnetic tape. Finally, at step S14, the magnetic tape is once again rewound to the starting position and then removed, whereby the unload operation is ended.

Figure 27A:
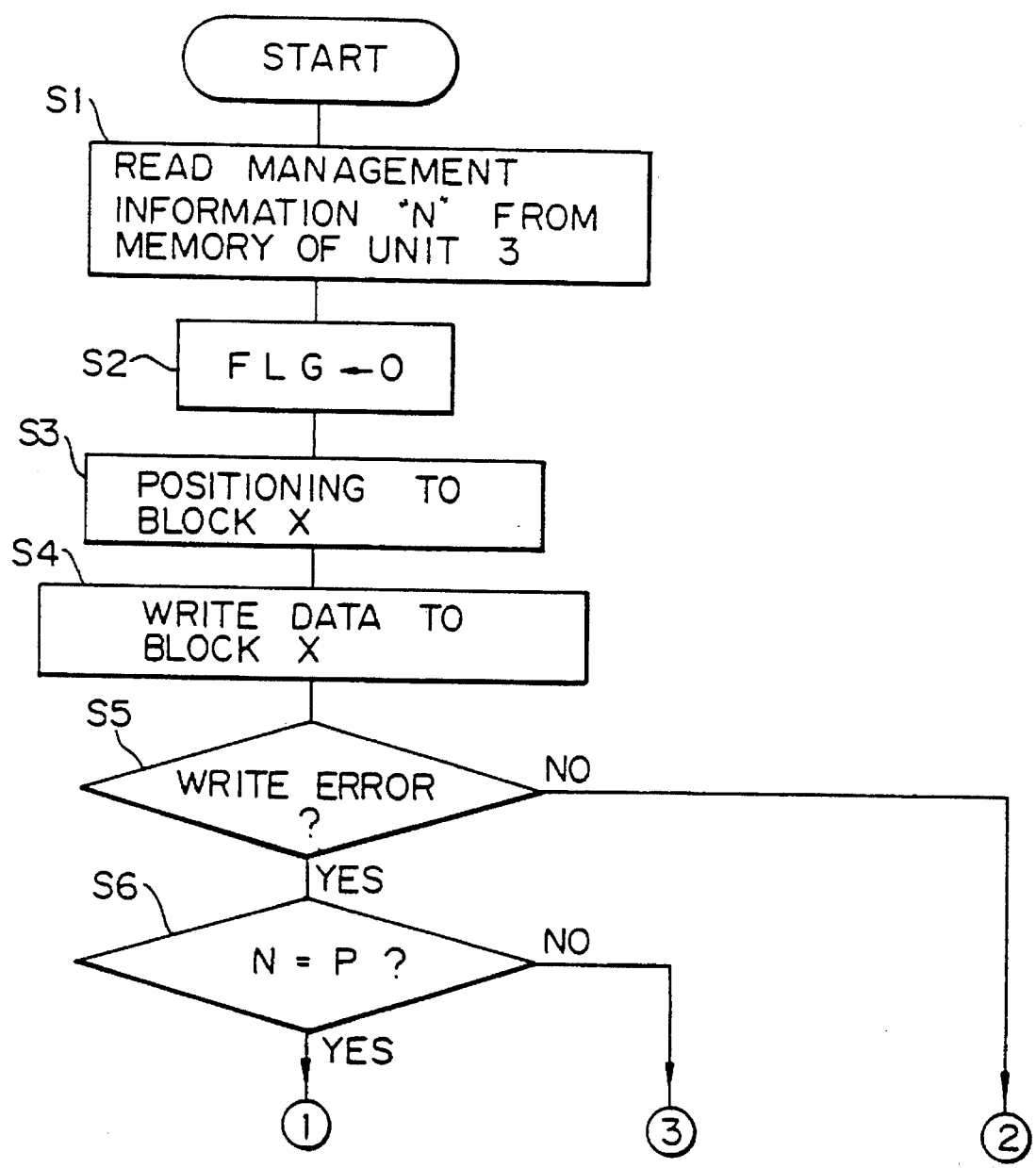
FIG. 27A and FIG. 27B are flow charts showing details of the write processing step S6 in FIG. 26A.
Figure 27B:
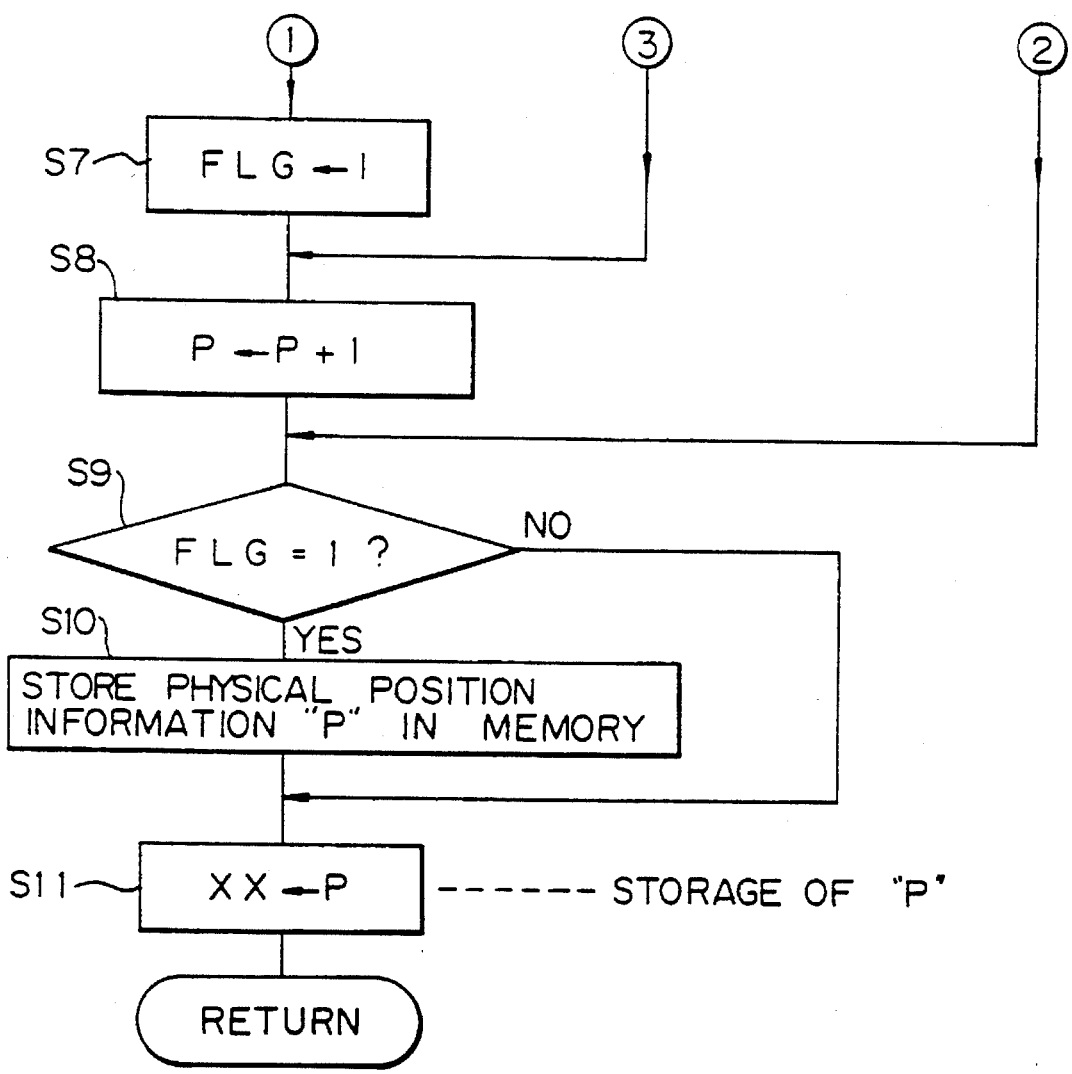

FIG. 27A and FIG. 27B are flow charts showing details of the write processing step S6 in FIG. 26A. The example is shown of the case of storage of N as the physical information of the head block of the user data opened in the control storage 23 of the storage control unit 3 shown in FIG. 8.

First, at step S1, the value N showing the physical position in the head block in the tape management information of the memory in the control unit 3 is read out and stored in the register realized by the control storage 23 etc.

Next, at step S2, the renewal flag FLG showing the existence of a renewal operation is reset to "0". Then, at step S3, positioning is performed to the data block X corresponding to the physical block ID designated by the write command from the host computer and the physical position information P of the block X is read.

After this, at step S4, the data is written in the block X. The existence of any write errors in the data write operation is checked at step S5. If there is no write error, the routine proceeds to step S9.

If it is judged that there is write error at step S5, the routine proceeds to step S6, where it is judged if the head physical position information N and the current physical position information P match. If they match, then a write error has occurred in the writing of the head block, so at step S7 the renewal flag FLG is set to "1".

If at step S6 the head physical position information N and the physical position information P at which the writing was performed differ, the flag is not set at step S7.

Next, at step S8, the current physical position information P is incremented by one, whereupon the routine proceeds to step S9, where it is checked if the renewal flag FLG is "1" or "0".

If the renewal flag FLG has been set to "1", the head physical position information P stored in the memory at that time must be made the next block, that is, the one position renewed P+i at step S8, so at step S10, the physical position information incremented at step S8 is stored at the position showing the head physical position information.

If the renewal flag FLG is not set to "1" at step S9, the processing of step S10 is not performed.

Next, at step S11, the current physical position information P is set in the register XX for temporarily holding the final physical position information M, the processing for a write command for one data block is ended, then the routine returns to step S4 of FIG. 26A.

At step S4 of FIG. 26A, if the writing continues due to a chain of write commands, the write processing of step S6, that is, the write processing shown in FIG. 27, is repeated.

On the other hand, if a notification of write completion from the host computer is found at step S9 in FIG. 26A, the routine proceeds to step S10, where the current physical information position P which had been stored in the register (XX) at step S11 of FIG. 27B is stored at the position showing the final physical position information in the memory in the unit 3 and renewed.

Figure 28:
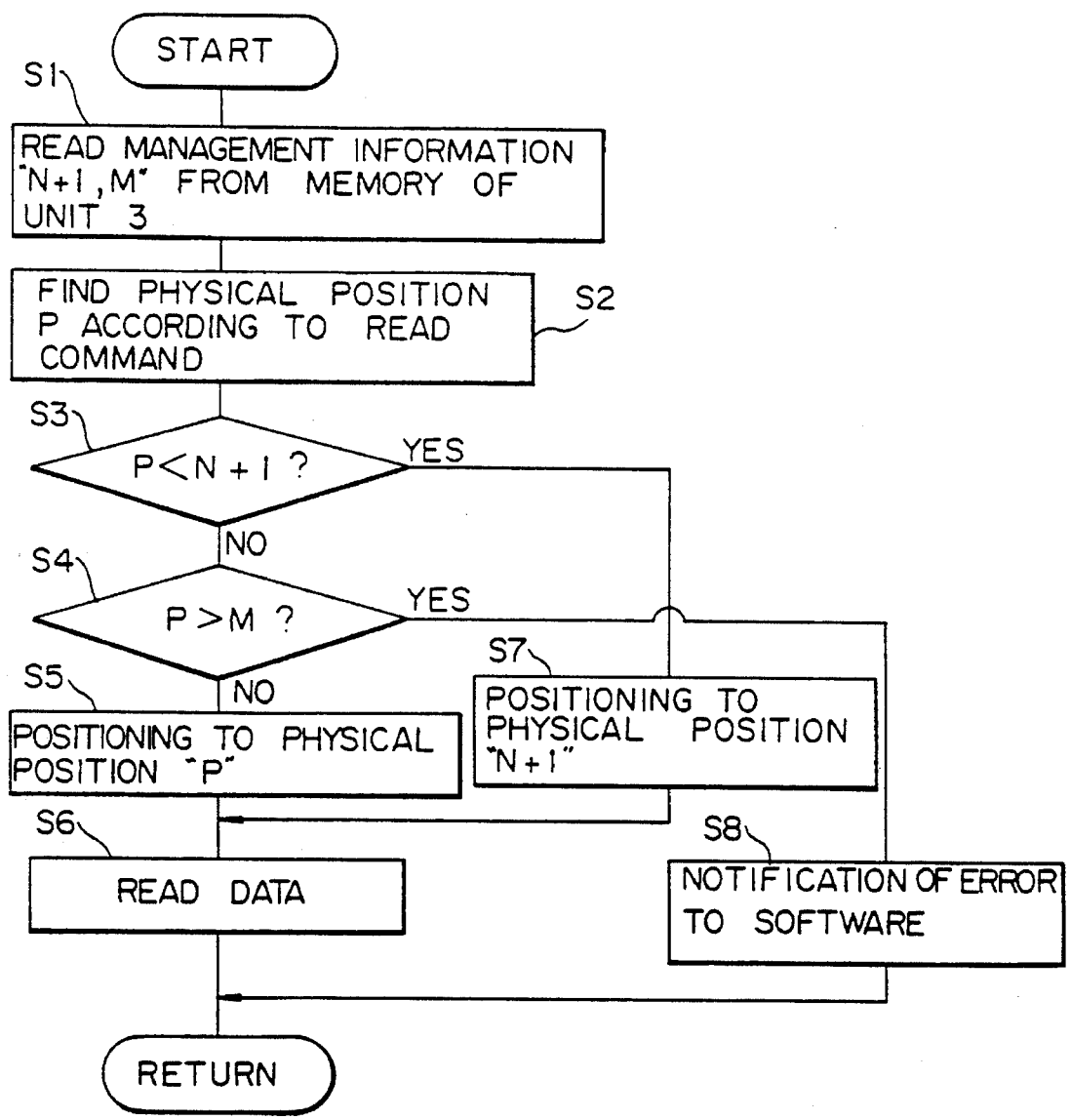
FIG. 28 is a flow chart showing details of the read processing step S8 in FIG. 26B.

FIG. 28 is a flow chart showing details of the read processing step in FIG. 26B.

In FIG. 28, it is assumed, as shown in FIG. 25, that N+1 is stored as the position information of the head block in the memory in the storage control unit 3 and that M is stored there as the physical position information of the final block.

Therefore, at step S1, the head position N+1 and the final position M are read out from the management information in the memory in the control unit 3. Next, at step S2, the current physical position information P is read out.

Next, at step S2, the physical position information corresponding to the access position indicated by the read command from the host computer is found and, at step S3, it is checked if the access physical position information P is smaller than the head physical position information N+1 stored in the memory.

At this time, the access physical position information P, as shown in FIG. 25, has a scratch SC at the first block BL-1, therefore the second block BL-2 serves as the head block. At the host computer side, however, this is not recognized and therefore the access position P corresponding to the head physical position information N which is invalid is designated.

In this case, the routine proceeds from step S3 to step S7, where positioning is performed to the head physical position information N+1 obtained from the memory. At step S6, the data is read out.

On the other hand, if the access physical position information P is not smaller than the head physical position information N+1 at step S3, the routine proceeds to step S4, where it is checked if it is larger than the final physical position information M obtained from the memory.

If the access physical position information P is not larger than the final physical position information at step S4, the routine proceeds to step S5, where positioning is performed to the access physical position information p and at step S6, the data is read out.

When the access physical position information P exceeds the final physical position information M at step S4, however, the routine proceeds to step S8, where notification of an error is made to the software, that is, the host computer.

In the above example, data blocks were used to express the head physical position information and the final physical position information showing the user area effectively written, but in another example it is also possible to use tape marks 12 recorded on the magnetic tape 1 to express the head position and final position of the user area effectively written.

That is, in general, when writing user data on a magnetic tape 1, a data file is comprised of one or more data blocks. A tape mark-may be recorded at the end of the data file to show the position of completion of the file.

Therefore, by recording physical position information on the control track CTL showing the positions of tape marks, it is possible to prepare position information of the head positions and final positions stored in the management information table 53 of the magnetic tape 1 and to manage access in the same way as with the case of position information of data blocks based on the position information of the tape marks.

By using the table 53, since the head positions and final positions showing the areas of the user data effectively written are stored on the magnetic tape itself, there is no longer wasteful reading and writing for access requests going beyond the effective range and therefore the access efficiency can be improved.

Further, since it is possible to change the valid user areas by the head position and final position, even if there is a defect in the medium, that portion can be eliminated and the magnetic tape can be effectively utilized.

Third Management Information Table

In magnetic tape storage apparatuses with high reliabilities of information storage and suited for storing large volumes of information, it is desired to be able to easily collect information on the equipment when trouble occurs so as to improve the maintenance ability. The third management information table of the present invention can meet this desire.

In conventional magnetic tape recording, when trouble occurred during recording or reproduction due to the magnetic tape, the magnetic tape where the trouble occurred was obtained, the state of use of the magnetic tape when the trouble occurred was reproduced and examined, and the necessary maintenance was then performed. In this case, the maintenance personnel require for their examination detailed information relating to the magnetic tape storage apparatus where the trouble occurred, for example, not only the version of the unit, but also the version of the microprogram operating in the same and all other information relating to the control unit and the drive unit.

However, when obtaining information for examining a magnetic tape where trouble has occurred, it takes considerable time and effort on the part of the maintenance personnel at the site to obtain the information for the examination, e.g., the unit version, the version of the microprogram, the detailed information on the control unit, drive unit, etc., so there was the problem that it was difficult and bothersome to obtain the detailed information.

According to the third management information table of the present invention, a magnetic tape storage apparatus is realized where detailed information on the units can be easily obtained from the magnetic tape itself which is sent for examination when trouble occurs.

Figure 29:
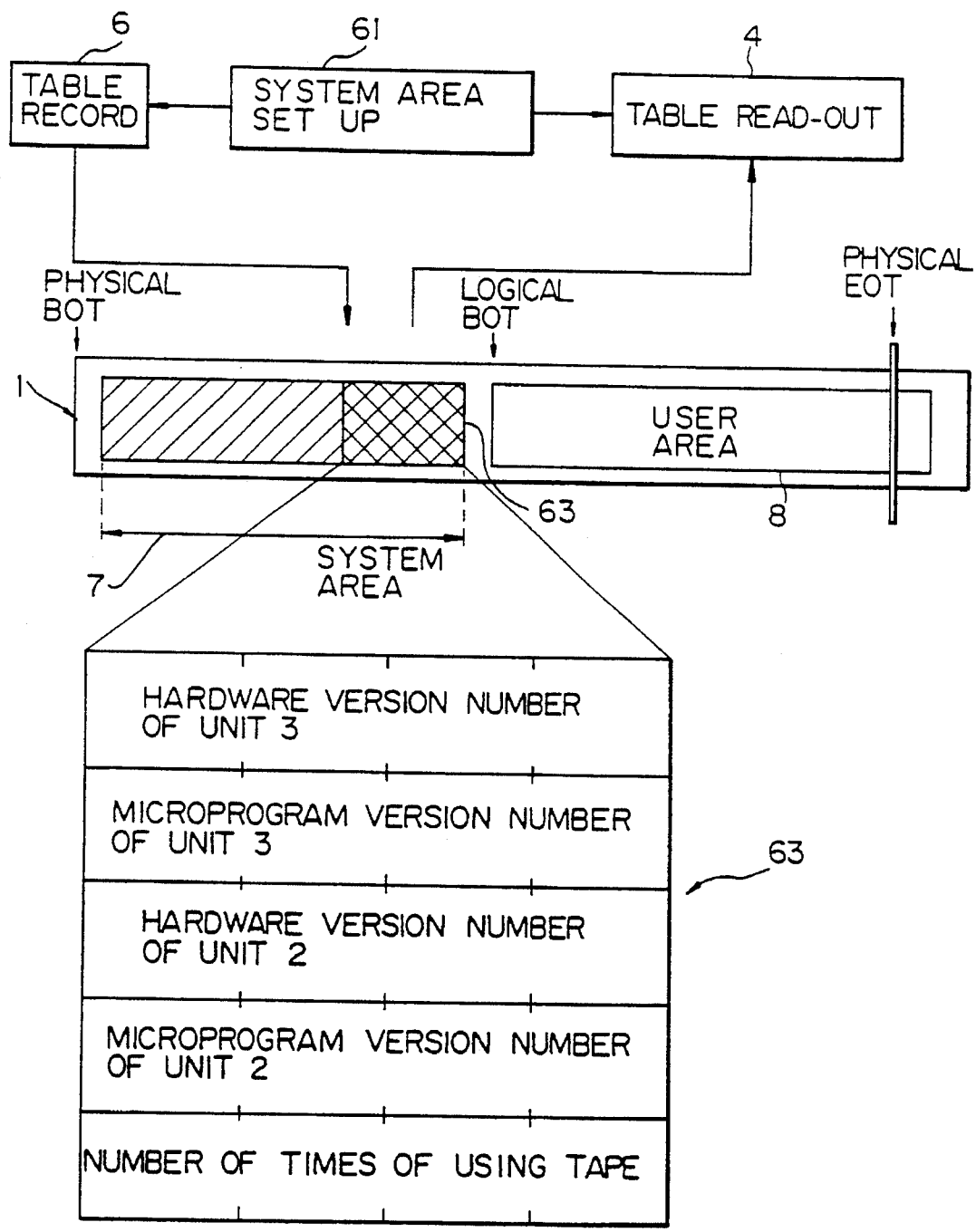
FIG. 29 is a view showing the basic structure in the case of use of a third information management table according to the present invention.

FIG. 29 is a view showing the basic structure in the case of use of a third management information table according to the present invention.

As shown in FIG. 29, the magnetic tape storage apparatus is provided with a system area setting device 61 which sets the system area 7 which can be used by just the unit itself in a specific area of the magnetic tape 1 and a table recording device 6 which records in the system area 7 of the magnetic tape 1 information on the various units when executing an unload command. The information recorded in the system area 7 of the magnetic tape 1 can be used for trouble shooting etc.

Here, the system area setting device 61 sets the system area 7 between the physical tape starting position (so-called "physical beginning of tape (BOT)") of the head of the magnetic tape and the logical tape starting position (so-called "logical beginning of tape (BOT)").

The table recording device 6 records the hardware versions of the unit 3, the version of the microprogram, and the number of times the magnetic tape has been used. Further, the table recording means 6 records the hardware versions of the drive unit 2 making up the magnetic tape storage apparatus and the version of the microprogram.

Also, the table recording device 6 reads the number of times of use of the tape from the system area 7 of the magnetic tape upon execution of the unload command and increments the number by one, then records the same in the system area 7.

Therefore, a specific area distinguished from the user area 8 of the magnetic tape is secured as a system area 7. On this system area 7 may be recorded, separate from the usual data, information on the various units which enables the magnetic tape storage apparatus which performed the recording or reproduction of the magnetic tape to be specifically determined. By reading the information in the system area of the magnetic tape when trouble occurs and in maintenance, it is possible to obtain detailed information on the configuration of the units.

The embodiment of the magnetic tape storage apparatus in the case of the use of the third management information table 63 is exactly the same as the construction shown in FIG. 8.

Figure 30:
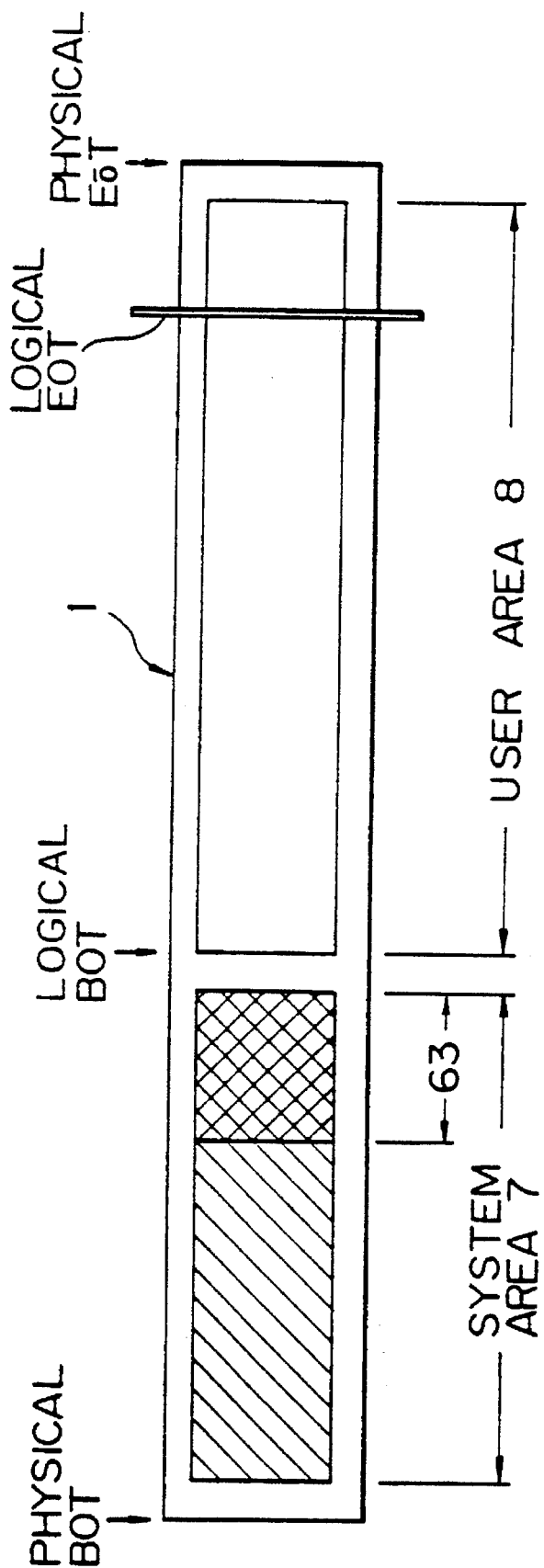
FIG. 30 is a view explaining the format of the magnetic tape used in the present invention.

FIG. 30 is a view explaining the format of the magnetic tape used in the present invention. As shown in the figure, in the magnetic tape 1, provision is made of a system area 7 between the physical BOT and the logical BOT. The area from the logical BOT to the physical end of tape (EOT) is used as the user area 8.

As mentioned earlier, the system area 7 is used only for the control of the magnetic tape storage apparatus. The user is not able to record on or refer to the system area 7. This can only be used by the magnetic tape storage apparatus.

The user area 8 performs the same recording as in a conventional magnetic tape. The format of the user area 8 should be determined by the method of use of the tape by the user. The storage control unit 3 does not have any effect on the user format.

In the figure, a management information table 63 for storing information on the magnetic tape storage apparatus is provided in the system area 7 of the magnetic tape 1.

Figure 31:
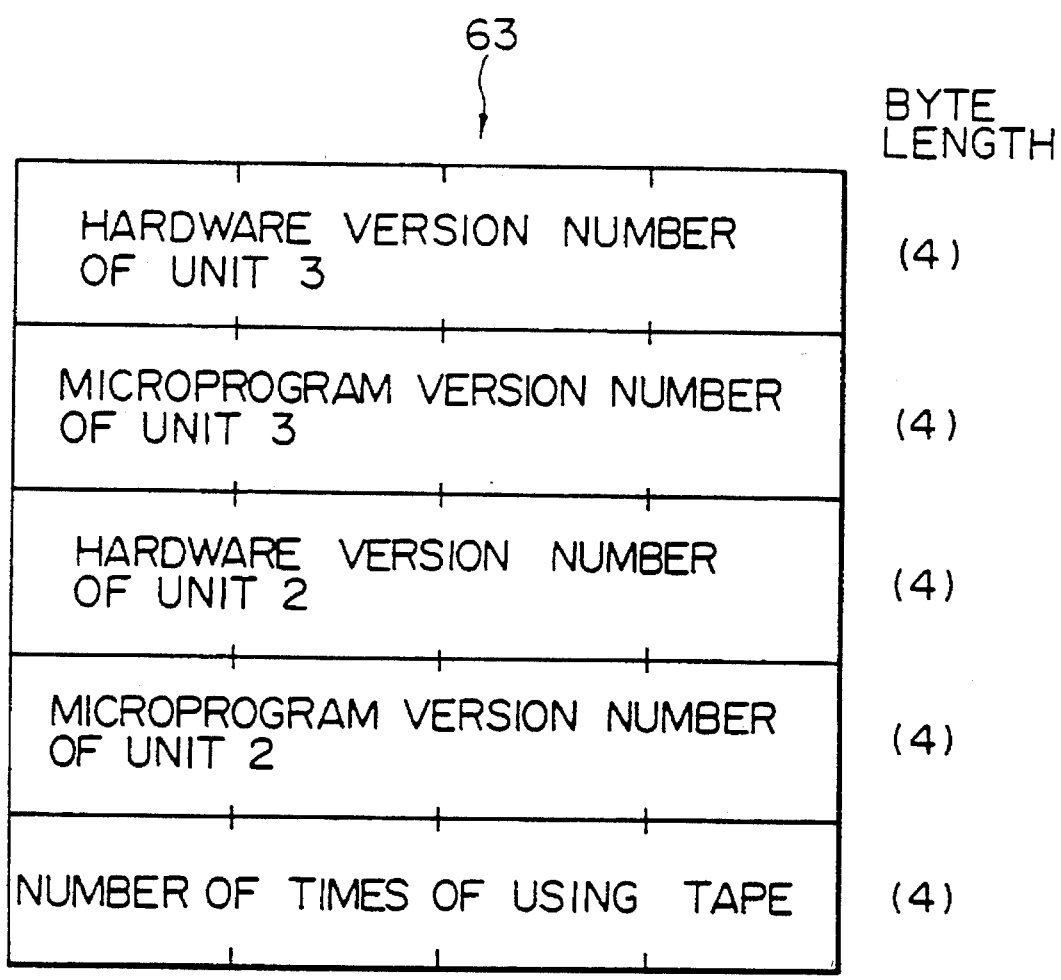
FIG. 31 is a view showing the byte length of the table 63.

The management information table 63 has recorded in it, for example, the information shown in FIG. 31.

FIG. 31 is a view showing the byte length of the table 63.

As the unit information of FIG. 31, the hardware information relating to the storage control unit 3 and the version of the microprogram of the control unit are recorded in 4 byte lengths respectively.

As the information relating to the drive unit 2 of FIG. 8, the hardware version of the drive unit and the version of the microprogram of the drive unit are recorded in 4 byte lengths respectively.

Further, information showing the number of times of use of the magnetic tape 1 is recorded as 4 byte information.

FIG. 32 is a view of the microprogram used for the storage control unit. That is, the internal structure of the microprogram executed by the microprocessor 21 of the storage control unit 3 of FIG. 8 is shown.

In FIG. 32, the 4 byte area from the head to the 10th byte is used and information showing the version of the microprogram is allocated there. The version of the microprogram is described when preparing the microprogram.

The microprogram of the construction shown in FIG. 32 is opened in the control storage 23 of the FIG. 8, then executed by the microprocessor 21. The 4 byte area from the 10th byte of the microprogram opened in the control storage is referred to, whereby the information is stored in the management information table 63 of FIG. 30 and it is possible to obtain the version of the microprogram of the control unit of FIG. 31.

FIG. 33 is a view showing the structure of the sense information obtained from the drive unit 2. That is, this shows the constitution of the sense information obtained as the response to a sense command issued by the storage control unit 3 of FIG. 8 for determining the state of the drive unit 2.

In the 4 byte area from the head to the 20th byte in the sense information is stored the information on the hardware version of the drive unit 2.

In the next 4 byte area, there is stored the version of the microprogram of the drive unit 2.

Therefore, it is possible to determine the hardware version and the microprogram version of the drive unit 2 stored in the management information table 63 of FIG. 30 from the sense information.

Further, regarding the number of times of use of the magnetic tape 1, the value of the number of times of tape use on the magnetic tape is read out and incremented by one, then recorded in the management information table 63 of the magnetic tape 1 each time the magnetic tape 1 is unloaded.

In the magnetic tape storage apparatus of the present invention, the recording of information on the equipment and the renewal of the number of times of use in the management information table 63 provided in the system area 7 of the magnetic tape 1 are performed when an unload command from the host computer is executed.

Next, the processing for execution of the unload command will now be explained with reference to the flow charts of FIG. 34, FIG. 35, and FIG. 36.

Basically the information on the equipment and the number of times of use are recorded on the magnetic tape 1 during execution of an unload command by recording, for the storage control unit 3, before the removal of the magnetic tape 1, the hardware version according to the output of the dip switch (DIP SW) 26 and the version of the microprogram taken out from the microprogram of the control storage 23.

For the drive unit 2, the hardware version and the microprogram version of the drive unit 2 are found from the sense information obtained in response to the sense command and then recorded in the management information table 63.

Regarding the number of times of use of the magnetic tape 1, the value of the number of times of use written on the magnetic tape incremented by one is overwritten on the magnetic tape 1.

Figure 34:
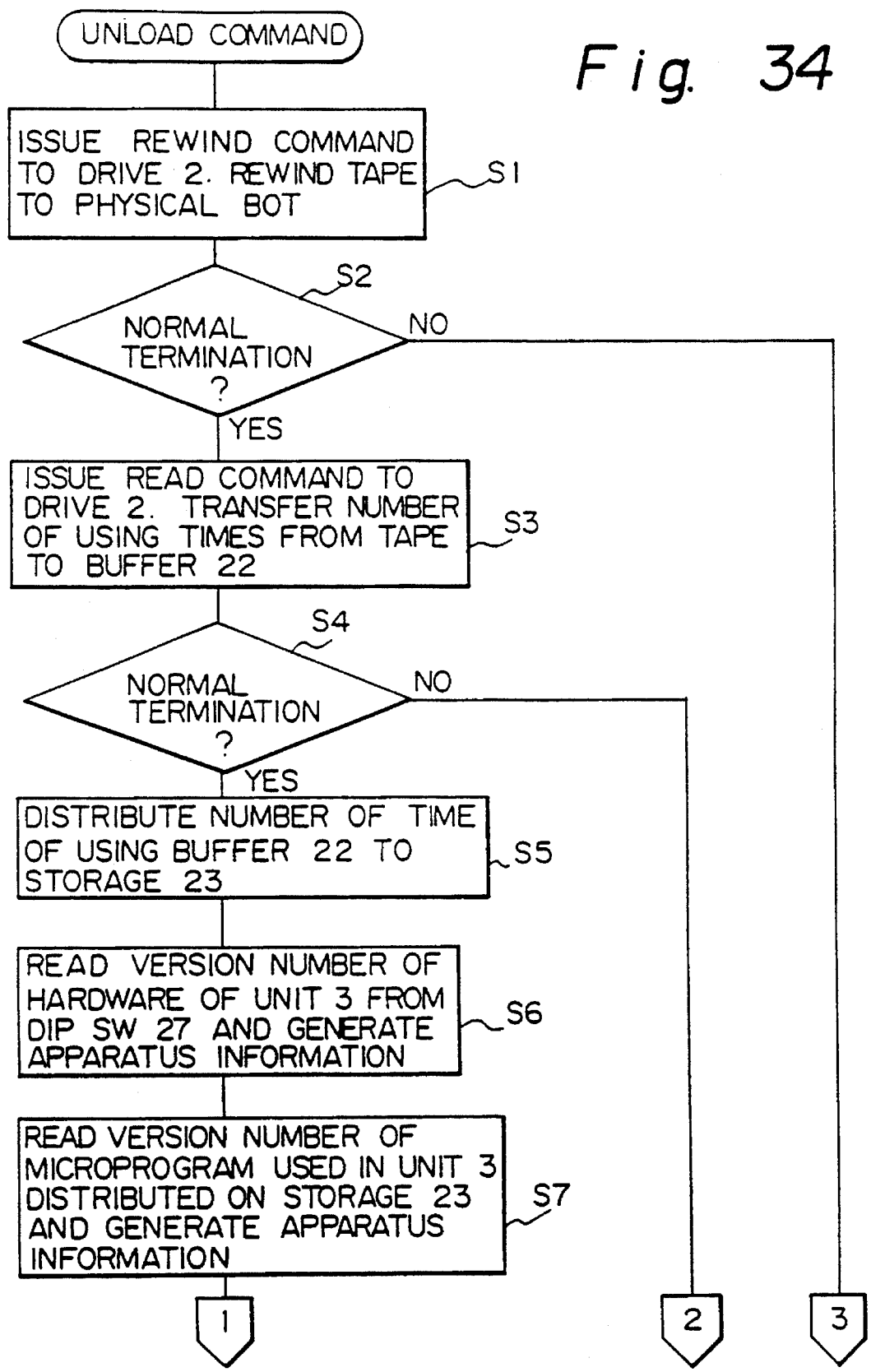
FIG. 34 is a flow chart showing the processing (part 1) when recording apparatus information during unloading.

Explaining this in more detail below, when an unload command is received from the host computer, the processing of FIG. 34 is started.

Figure 36A:
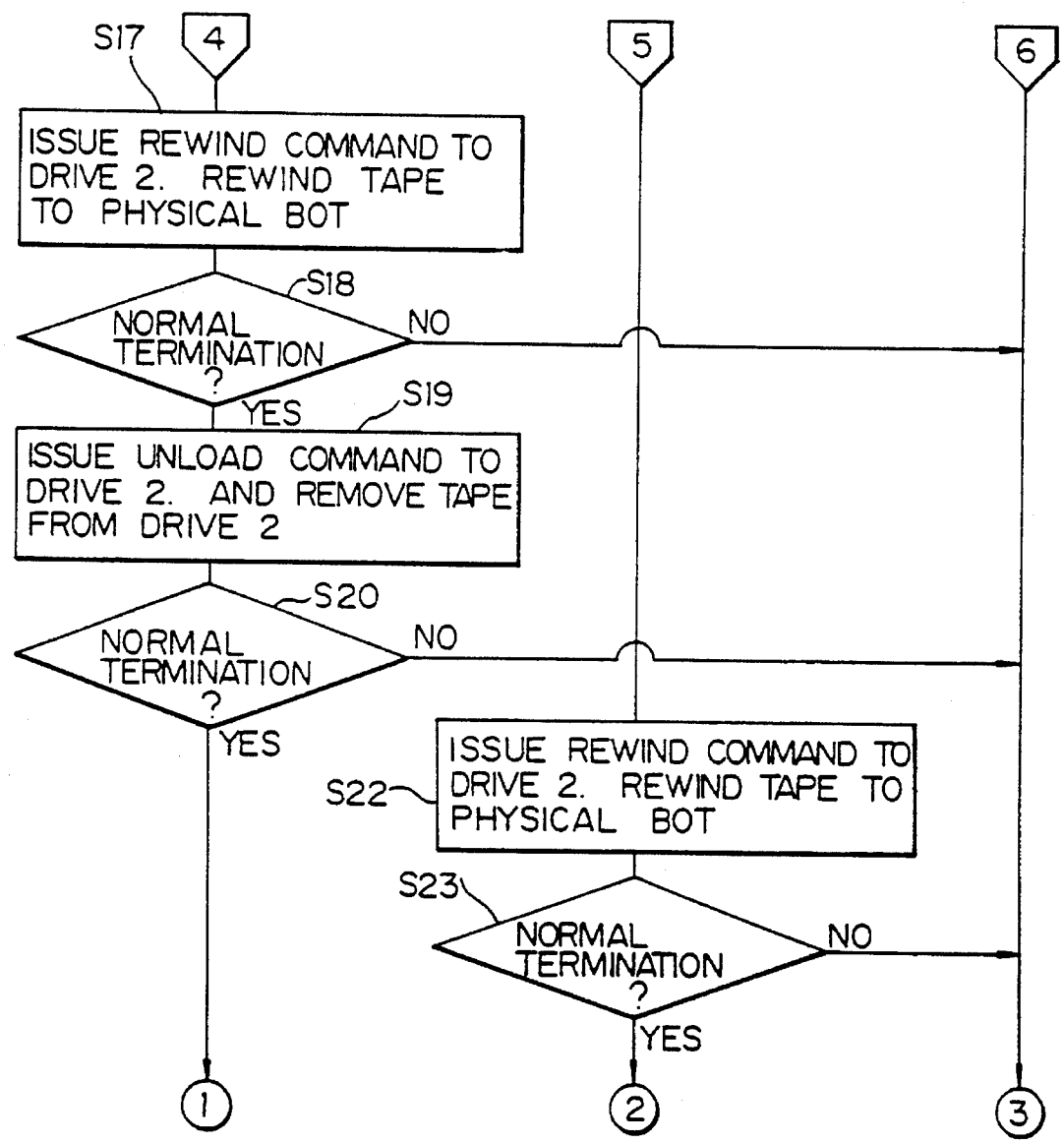

FIG. 34 is a flow chart showing the processing (part 1) when recording apparatus information during unloading. FIG. 35 is a flow chart showing the processing (part 2) when recording apparatus information during unloading. FIG. 36A and FIG. 36B are flow charts showing the processing (part 3) when recording apparatus information during unloading.

First, at step S1, a rewind command is issued to the drive unit 2 and the magnetic tape 1 is rewound up to the physical BOT.

Next, at step S2, it is checked whether normal termination has occurred, then the routine proceeds to step S3, where a read command is issued to the drive unit 12, the number of times of use is read out from the magnetic tape 1, then the value is transferred to the data buffer 22.

Next, at step S4, it is checked if normal termination has occurred, then the routine proceeds to step S5, where the number of times of use of the magnetic tape stored in the data buffer 22 is opened in the control storage 23.

At step S6, the hardware version of the storage control unit 3 set by the DIP switch 27 is read and the equipment information is prepared.

At step S7, the microprogram version in the microprogram opened in the control storage 23 is read to generate equipment information.

Next, the routine proceeds to step S8 in FIG. 35, where a sense command is issued to the drive unit 2 and sense information from the drive unit 2 is transferred to the control storage 23.

At step S9, it is checked if normal termination has occurred, then at step S10, the equipment information showing the hardware version and microprogram version of the drive unit 2 is generated from the sense information stored in the control storage 23.

Next, at step S11, the value showing the number of times of use of the tape read from the magnetic tape 1 is incremented by one to renew the same.

Then, a rewind command is issued to the drive unit 2 and the magnetic tape 1 is once again rewound to the physical BOT.

At step S13, it is checked if normal termination has occurred, then the routine proceeds to step S14, where the transferred equipment information and the renewed number of times of use are read out from the control storage 23 and transferred to the storage buffer 22.

Next, at step S15, a write command is issued to the drive unit 2, then the equipment information and the times of use on the data buffer 22 are written on the magnetic tape 1.

When the write operation has been completed, at step S16, it is checked if normal termination has occurred, then the routine proceeds to step S17 of FIG. 36A, where the rewind command is once again issued to the drive unit 2 and the magnetic tape 1 is rewound to the physical BOT.

Then, at step S18, it is checked if normal termination has occurred, then at step S19, an unload command is issued to the drive unit 2 and the magnetic tape 1 is taken out.

Then, at step S20, it is checked if normal termination has occurred, then at step S21, the normal completion of the unload command is reported to the host computer.

The above concerned the case where all the processing for the unload command was performed normally, but if there is an abnormal termination at any of step S4, step S9, or step S16, that is, if a software error is discerned, then the routine proceeds to step S22 in FIG. 36A, where a rewind command is issued to the drive unit 2, the magnetic tape 1 is rewound to the physical BOT, then the check of the normal termination of step S23 is performed and, at step S24, an unload command is issued to the drive unit 2 and the magnetic tape 1 is taken out.

Next, at step S25, it is checked if normal termination has occurred, then at step S26 detailed error information is prepared for reporting to the host computer, and at step S27, abnormal termination of the unload command is reported to the host computer.

If a software error occurs at step S22 to step S27, the renewal of the equipment information and the renewal of the unload command are not recorded.

Further, if an abnormal termination is discriminated at step S2, step S13, step S18, and step S20, there is a hardware error, so at step S28, detailed error information for immediate reporting to the host computer is prepared and, at step S29, the host computer is given a report on the abnormal termination of the unload command.

The above example related to the use of the hardware version and microprogram version as the equipment information, but if necessary it is also possible of course to record other suitable information on the equipment.

As explained above, according to the third management information table 63 of the present invention, detailed information regarding the equipment using the magnetic tape is recorded, so it is possible to easily obtain the equipment information required for trouble shooting etc. Just by obtaining the magnetic tape used when the trouble occurred and therefore it is possible to improve the maintenance efficiency.

Further, it is possible to determine the number of times of use from the magnetic tape itself, so it is possible to easily reduce how much of the overall lifetime of the magnetic tape has passed and therefore to perform the maintenance work, such as examination of trouble, efficiently.

Fourth Management Information Table

According to the fourth management information table, a magnetic tape storage apparatus is realized where any abnormalities in a magnetic tape can be determined at the start of use.

In general, when writing on a magnetic tape, if a reading operation ends abnormally due to a defect in the medium etc., the magnetic tape where the abnormal termination occurred should be used, but when large numbers of magnetic tape are managed, in some cases a magnetic tape where abnormal termination has occurred may be used inadvertently.

In conventional magnetic tape storage apparatuses, when a write or read operation ends abnormally in a certain data block of the magnetic tape during the writing or reading, error information concerning the abnormal termination is reported as status information to the host computer, a tape unload command is received from the host computer, and the magnetic tape is unloaded.

In such a conventional magnetic tape storage apparatus, even when an abnormal termination of a writing or reading operation was reported to the host computer, the occurrence of that abnormal termination was not recorded as data on the magnetic tape and therefore the magnetic tape where the abnormal termination occurred had to be marked as unusable etc. when storing it.

Since large numbers of magnetic tapes are used, however, it is not possible to fully manage the magnetic tapes where the abnormal terminations occurred and there is a chance of a magnetic tape where an abnormal termination occurred being reused mistakenly.

In such a case, the abnormality cannot be discerned until actually writing or reading to the position of the data block where the abnormal termination occurred, causing a problem of a possible delay in instructions for changing the medium.

According to the fourth management information table, a magnetic tape storage apparatus is realized where the presence of a tape defect can be immediately determined when starting to use the magnetic tape.

Figure 37:
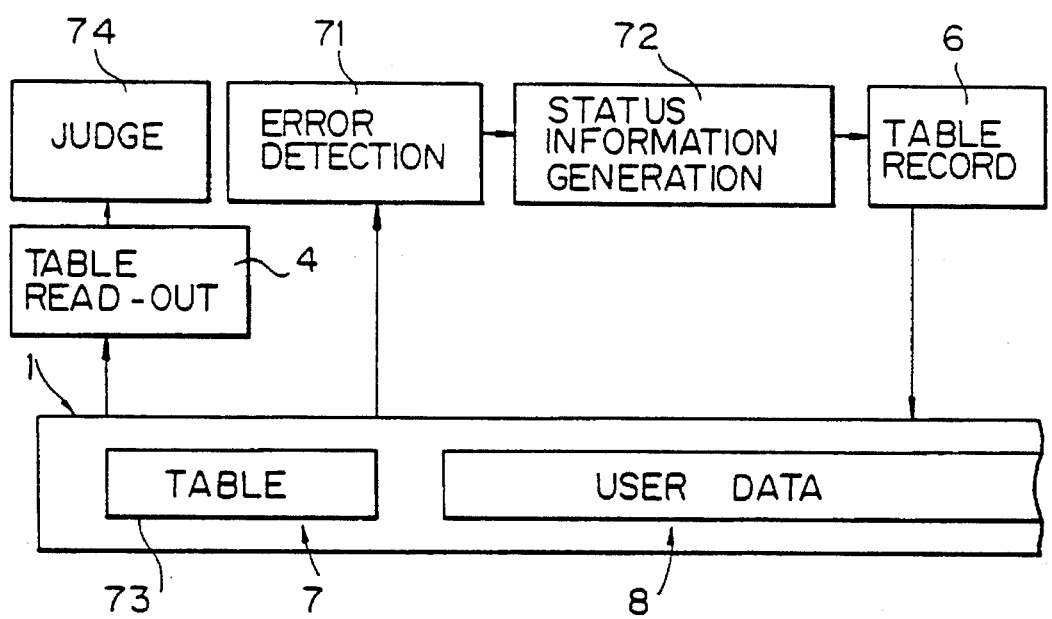
FIG. 37 is a view showing the basic structure in the case of use of a fourth management information table according to the present invention.

FIG. 37 is a view showing the basic structure in the case of use of the fourth management information table according to the present invention.

As shown in FIG. 37, provision is made of an error detection device 71 for detecting a tape abnormality from the abnormal termination of the writing or reading of the magnetic tape 1, a status information generating device 72 which prepares status information on whether the writing was performed normally or if a tape abnormality occurred based on the results of detection of the error detection means 71, a table recording device 6 which records the status information in the table 73 on the magnetic tape 1 during unloading, and a judging device 74 which judges the presence of a tape abnormality by reading the status information recorded in the table 73 of the magnetic tape 1 during loading.

Here, the table recording device 6 records the status information in the predetermined system area 7 different from the user area 8 of the magnetic tape 1.

The table recording device 6 also gives status reports indicating the tape abnormalities to the host computer when a predetermined number of tape abnormalities have been detected or when the end of the magnetic tape has been reached and records the status information on the magnetic tape 1 when unloading the tape in accordance with a tape unload command given from the host computer in accordance with the status report.

When the judgement means 74 judges there is a tape abnormality during loading, a write or read operation on the magnetic tape 1 is prohibited.

It is also possible to have the status information generating device 72 prepare status information including the position information (physical block ID) of the magnetic tape 1 where the tape abnormality was detected and have the judgement device 74 validate writing and reading of the user data for all data blocks except for the data block where the tape abnormality occurred, obtained from the status information.

Magnetic tape where an abnormal termination of the writing or reading operation has once occurred has recorded on it status information showing the tape abnormality, recorded during the unloading.

Therefore, when loading a magnetic tape where an abnormal termination has occurred for reuse, the status information recorded on the magnetic tape is read out to the unit 3, the information showing the abnormal termination in the status information is judged, and the host computer is reported to, so basically writing or reading is prohibited and therefore it is possible to discern in advance the abnormality of the tape and to prevent in advance the mistaken use of magnetic tape where an abnormal termination has occurred without actually reading or writing to the position where a data block terminated abnormally.

The embodiment of the magnetic tape storage apparatus in the case of use of the fourth management information table 73 is exactly the same in structure as that shown in FIG. 8.

FIG. 38 is a view schematically showing a reading/writing operation vis-a-vis the fourth management information table.

In FIG. 38, the magnetic tape 1 is formatted with a control block 76 of its head which can be written on or read from only by the storage control unit 3 and which cannot be accessed by the user. A predetermined area of the control block 76 is used as the table 73 storing the status information.

After the control block 76 comes the user area. Data is recorded there in block units in accordance with the format specification of the user.

On the magnetic tape 1 is further recorded a control track CTL. On the control track CTL is written a value which increases by one with every predetermined distance. By reading the control track CTL by the control head Hc, it is possible to obtain the physical position on the magnetic tape 1, that is, the physical block ID.

(1) to (7) of FIG. 38 show the steps of the processing for judgement of an abnormal tape.

That is, when the host computer issues a data write or read request as shown in (1), the data is written on or read from the user area 8 of the magnetic tape 1 through the storage control unit 3.

At this time, if there was a scratch SC at a position of the data block, the error detection shown in (2) is performed. When the error is detected, in the drive unit (2), the error information shown in (3) is prepared. Further, the status information shown in (4) is prepared and the host computer is given a report on the status information and the detailed error information as shown in (5).

The host computer, receiving this report on the detailed error information, issues an unload command to the storage control unit 3. The drive unit 2 starts the unload operation to unload the magnetic tape 1.

At this time, the drive unit 2 records the status information, including the error information, prepared at (3) and (4) as status information in the table 73 of the control block 76 at the head of the magnetic tape 1, as shown in (6).

On the other hand, when a magnetic tape 1 where writing or reading has once terminated abnormally and the status information has been recorded in the table 73 is used once more, during the loading of the magnetic tape 1, the storage control unit 3 reads the status information in the control block 76 at the head of the magnetic tape 1 as shown in (7), opens it in the memory device 5, and, if there is detailed error information in the status information showing a scratch SC, reports this to the host computer, after which writing on or reading from the magnetic tape 1 is prohibited.

Since the data blocks other than the one with the scratch SC are normally recorded and can be written on or read from, it is possible to allow reading or writing of the data blocks up to just before the data block with the scratch SC where the abnormal termination occurred.

Also, it is possible to prepare, in addition to the status information, the position, that is, the physical block ID, of the data block with the scratch SC obtained from the control track CTL at the time of error detection of (2) and, upon the next loading, allow writing on or reading from the data blocks other than the one with the physical block ID showing the scratch SC.

Figure 39:
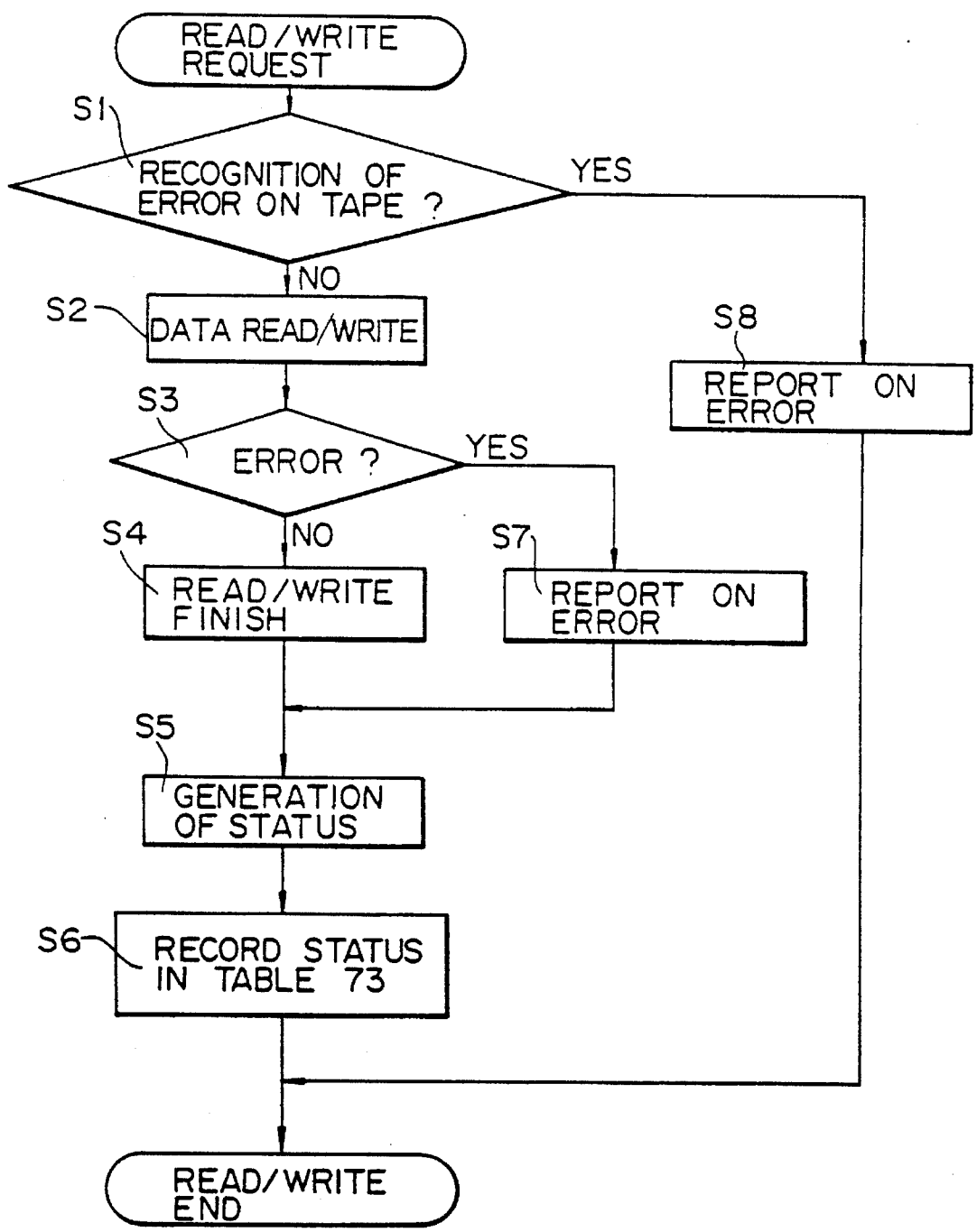
FIG. 39 is a general flow chart in the structure of FIG. 37.

FIG. 39 is a general flow chart in the structure of FIG. 37.

In FIG. 39, first, at step S1, it is discerned in response to a write or read request from the host computer if there is an error in the tape from the status information of the magnetic tape written at the time of loading. If there is an error in the tape, the routine proceeds to step S8, where an error report is made and the series of processing steps is ended. If there is no error in the tape, the routine proceeds to step S2, where the data is written or read in accordance with the request from the host computer.

If an error is judged at step S3 during the writing or reading of data, an error report is made at step S7. At step S5, the status information is prepared and the information is recorded on the tape as shown by step S6 upon the unloading on the tape unloading command from the host computer.

Of course, if there is no error at step S3, the writing or reading ends at step S4 and status information indicating the normal termination of the writing or reading is prepared at step S5. In that case too, the status information is recorded as shown in step S6 in the magnetic tape upon unloading of the magnetic tape.

Next, a detailed explanation will be given of the control processing of the magnetic tape storage apparatus using the fourth management information table while referring to FIG. 40, FIG. 41, FIG. 42, and FIG. 43.

Figure 40B:
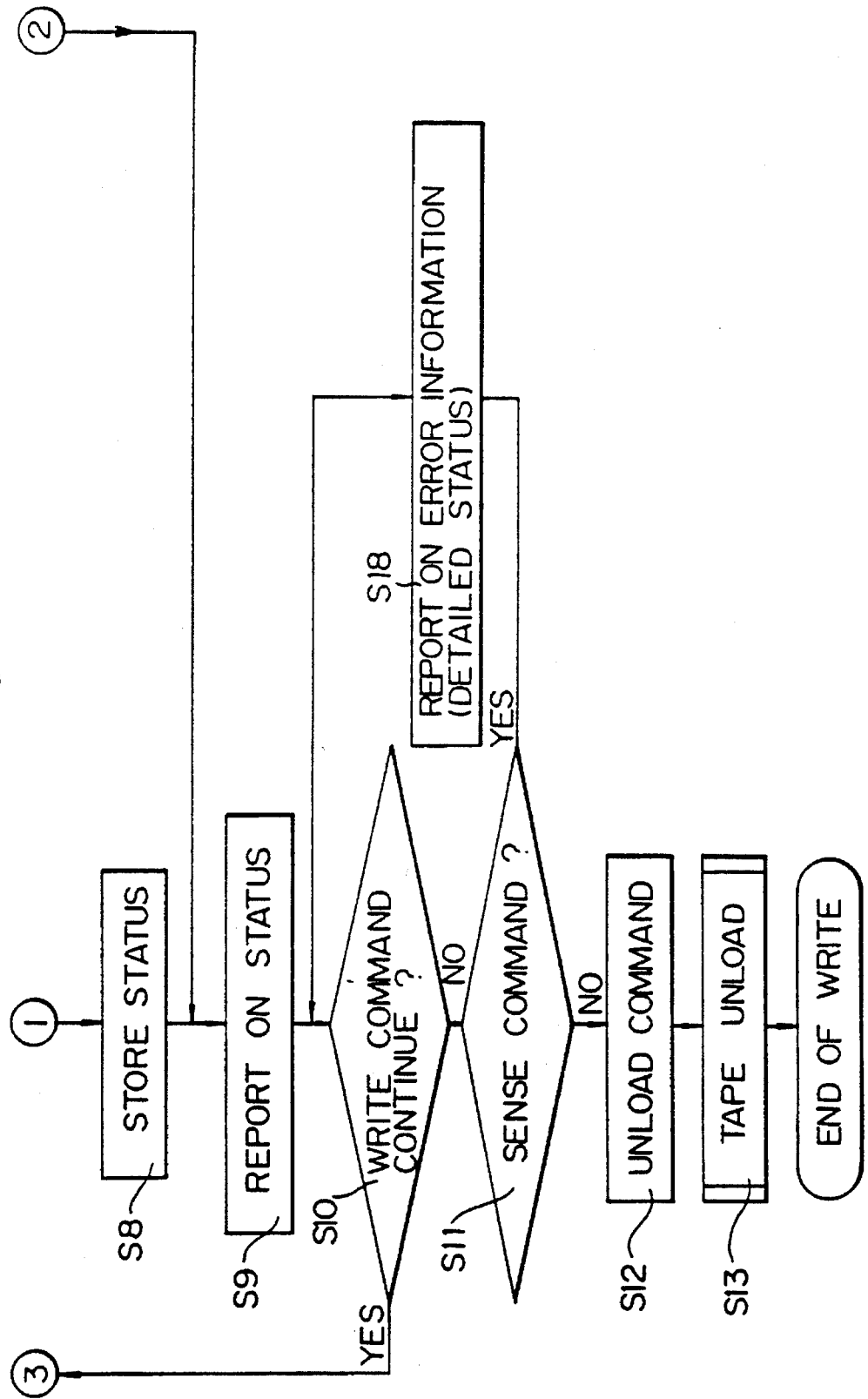

FIG. 40A and FIG. 40B are flow charts showing the control processing when receiving a write command from the host computer.

In FIG. 40A and FIG. 40B, when a write command is received from the host computer, at step S1, the tape is loaded, that is, a tape load operation is performed. This tape loading processing is shown as a subroutine in FIG. 41.

Figure 41:
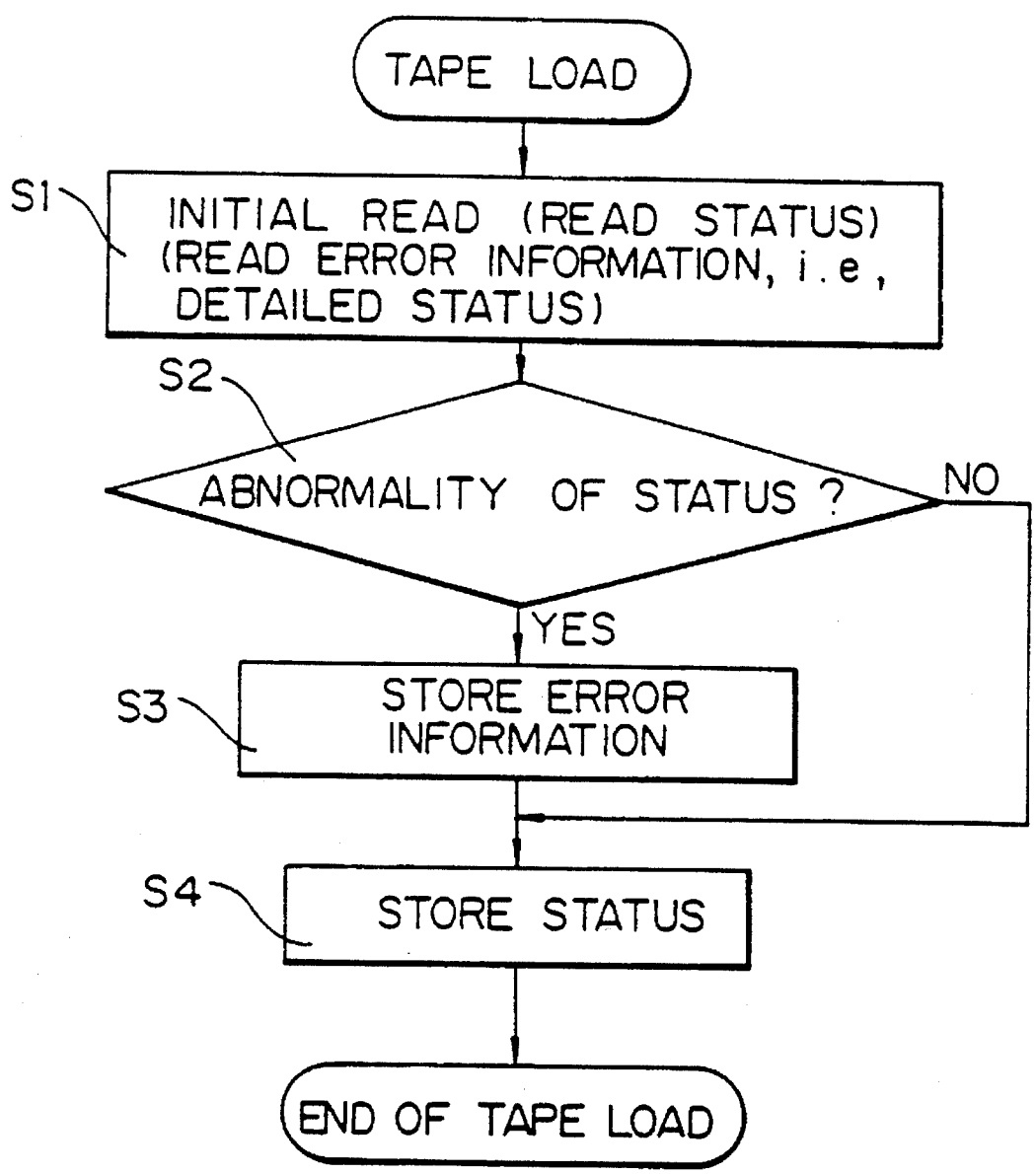
FIG. 41 is a flow chart showing the tape loading processing.

That is, in FIG. 41, first, at step S1, initial reading is performed to read the status information and error information from the control block at the head of the magnetic tape. At step S2, it is checked if there is a tape abnormality in the status information.

If it is judged that there is a tape abnormality in the status information at step S2, the routine proceeds to step S3, where the error information is recorded. At step S4, the status information is stored and the tape loading processing is ended.

If there is no tape abnormality in the status information at step S2, the routine proceeds to step S4, where the status information is stored.

The storage of the error information and the storage of the status information at step S3 and step S4 are realized by opening the control block in the data buffer 22 of the storage control unit 3 shown in FIG. 8.

Referring again to FIG. 40, when the tape has been loaded at step S1, it is checked at step S2 if there is a status abnormality, that is, if there is a tape abnormality in the status information. If there is no status abnormality, the write data from the software, that is, the host computer, is received at step S3. At step S4, the data is written.

During the writing of the data, it is checked at step S5 if there is a scratch on the tape. The processing of step S3 to step S6 is repeated until it is judged at step S6 that the writing of data has been completed.

If it is judged at step S5 during the writing of data that there is a scratch on the tape, the routine proceeds to step S14, where it is checked if the end of the tape (EOT) has been reached. If not the tape EOT, the next data block is moved to at step S15 and the writing of data is repeated.

If it is the tape EOT at step S14, the routine proceeds to step S16, where error information is prepared and, further, at step S17, status information showing a tape abnormality is prepared. The routine proceeds to step S8, where the status is stored and then at step S9, a status report is made to the host computer.

Next, at step S10, if the chain of write commands continues, the routine returns to step S3, where the same processing is repeated.

If it is judged at step S10 that the chain of write commands has been broken, the routine proceeds to step S11. If a sense command is received from the host computer, then error information is reported at step S18.

If there is no sense command, the routine proceeds to step S12, where an unload command is received from the host computer, then the tape unload processing is performed at step S13. The tape unload processing of step S13 is shown as a subroutine in FIG. 42.

Figure 42:
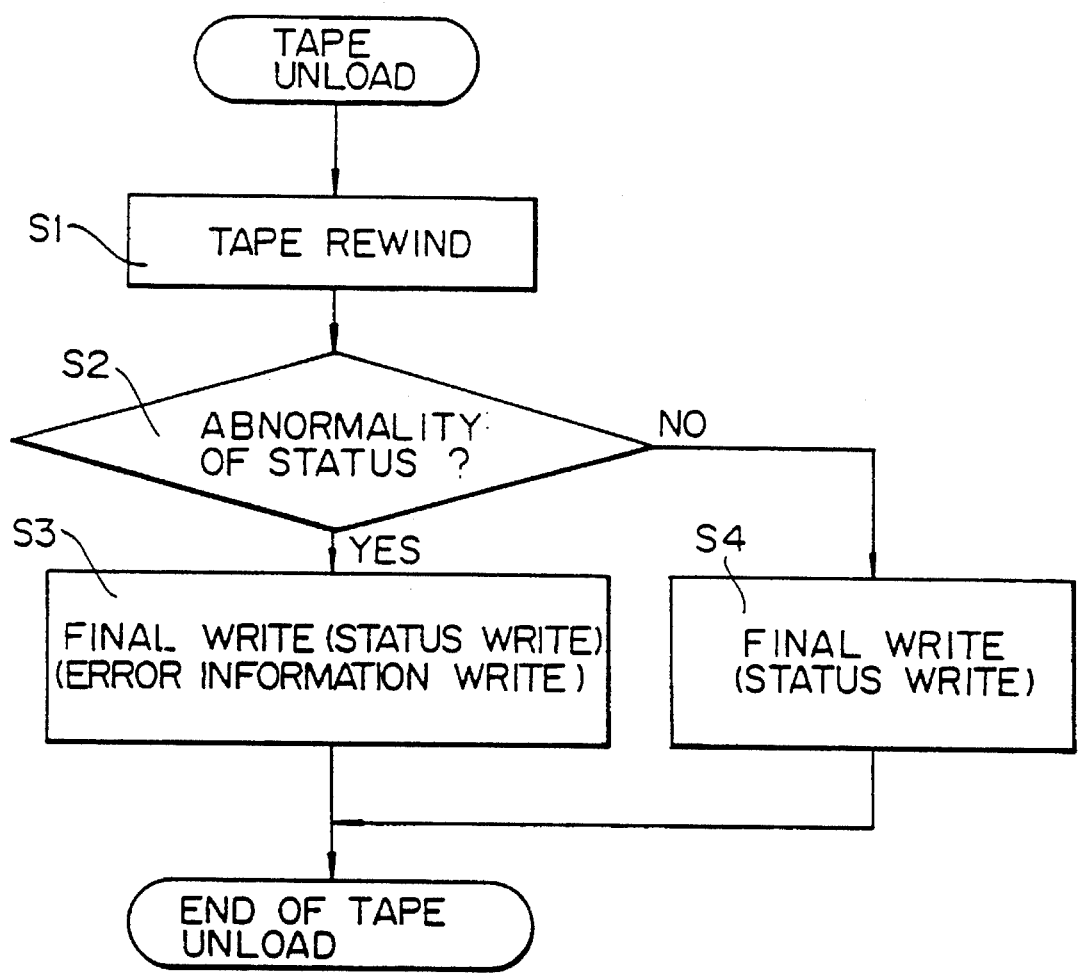
FIG. 42 is a flow chart showing the tape unloading processing.

That is, the tape unload processing of FIG. 42 is constituted by rewinding the tape to the head position at step S1, checking for the presence of any status abnormalities at step S2 and, if there is a status abnormality, writing the status information in the head data block of the magnetic tape, that is, writing the status and error information, and, if there is no status abnormality, writing only the status information at step S4, then ending the tape unload processing.

Referring again to FIG. 40A and FIG. 40B, if the tape unload processing of step S13 ends, the write operation for the series of write commands is ended.

Further, the preparation of the error information and the preparation of the status information at the time of the occurrence of a tape fault at step S17 are done after reaching the tape EOT at step S14, but as another example it is possible to provide a counter showing the number of tape faults detected, to judge that the tape can no longer tolerate use when the count has reached a predetermined value n, and to proceed to the processing of step S8 on without waiting for the tape EOT.

Figure 43B:
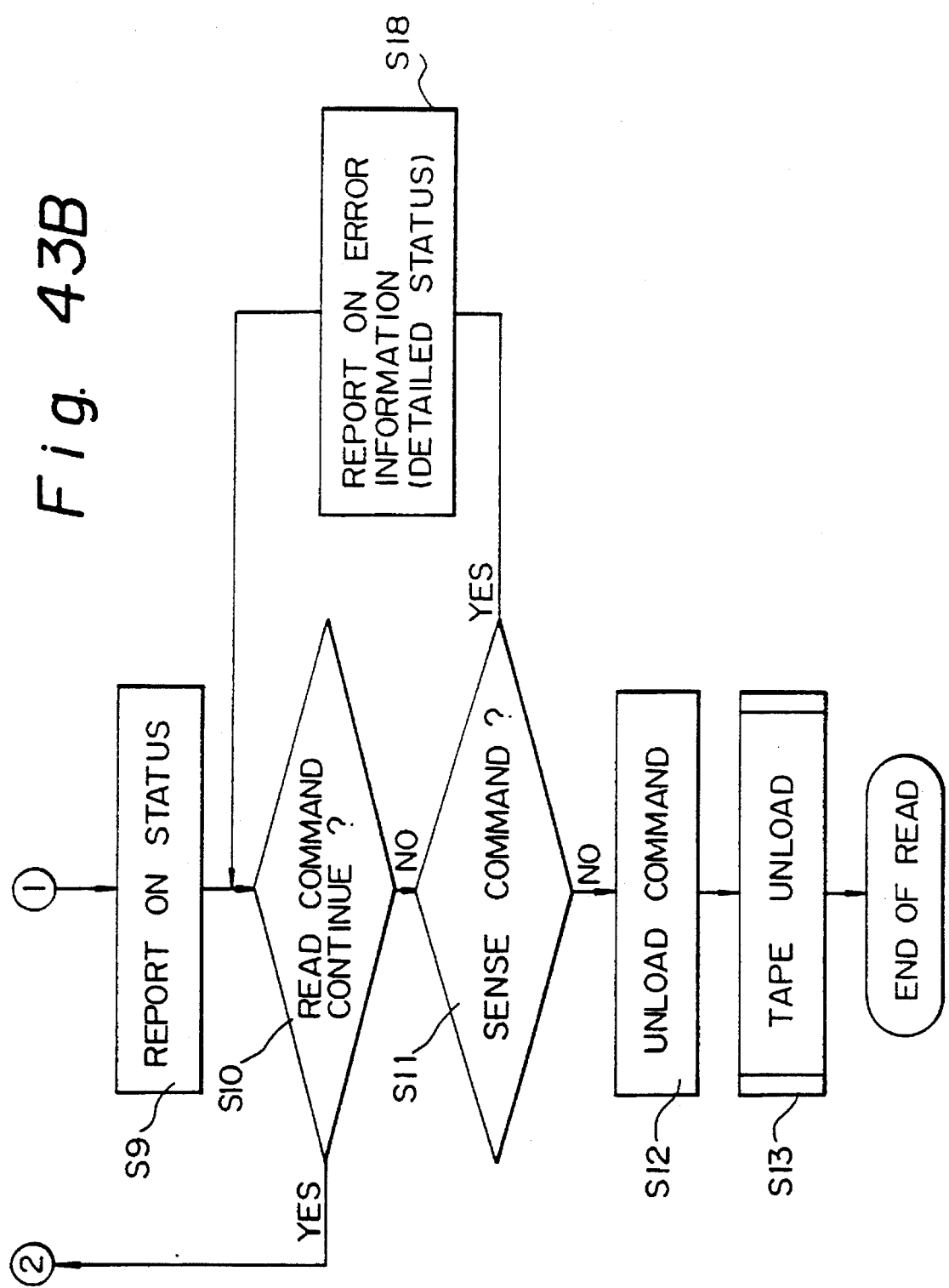

FIG. 43A and FIG. 43B are flow charts showing the processing operation when receiving a read command from the host computer.

The read operation of FIG. 43A and FIG. 43B is the same as the write operation of FIG. 40A and FIG. 40B except for the data read-out at step S3 and the end of the data read-out at step S5.

Further, for step S14 to step S17, it is also possible to provide a counter showing the number of tape faults occurring and to proceed with the processing of step S8 on when the count reaches a predetermined value n.

As explained above, according to the fourth management information table 73 of the present invention, it is possible to determine at the time of loading the tape if writing or reading of the magnetic tape is not possible without actually writing on or reading from the magnetic tape, so it is possible to eliminate the time involved in replacing a magnetic tape determined to be abnormal only after actual writing or reading.

Also, even if there is a tape fault, it is possible to perform a write or read operation on the data blocks other than the one with the tape fault since it is known at the time of tape loading that there is a tape fault and where it has occurred, so it is possible to use magnetic tapes efficiently even if they have defects.

The above-mentioned first to fourth management information tables (13, 53, 63, and 73) may be formed alone on the magnetic tape 1, but preferably these tables are all formed together on the system area 7. In other words, a group of the tables is used.

If these management information tables are recorded together at one location, such as the head portion of the magnetic tape 1, if the head portion, which is accessed often, deteriorates, it would no longer be possible to read the management information tables written in the control block and the problem might occur of an inability to normally manage the tape or the file access.

It is desirable to make normal tape or file management possible even when the management information tables have been lost due to deterioration of the magnetic tape.

FIG. 44 is a view of the basic structure showing one example of the technique for improving the security of a management information table. As illustrated, the table record device 6 records the management information table 83 (generic name for the above-mentioned tables 13, 53, 63, and 73) at several locations A, A2, and A3 of the magnetic tape 1. The table read-out device 4 reads out the management information table recorded at a predetermined specific position A (system area 7) on the magnetic tape 1, opens it in the memory device 5 of the unit 3, and, if the management information table of the specific position A cannot be read normally, reads out the management information tables of the other positions A2 and A3.

The table record device 6, when recording a management information table on the magnetic tape 1, records flag information L showing that the management information table has been renewed. The table read-out device 4, when reading out the management information table 83 from the magnetic tape 1, judges from the flag information if the table has been renewed and when it is confirmed that it has been renewed, performs the corresponding processing to prohibit access etc.

Further, the table record device 6 records the management information table at a first position (control block) between the physical beginning of tape (physical BOT) of the head of the magnetic tape 1 and the logical beginning of tape (logical BOT) of the user area 8. For the user area 8, it records the management information table at a second position A2 following the position where the writing of the data file ends and records the management information table at a third position A3 before the physical end of tape (physical EOT) of the magnetic tape 1.

The table record device 6, when writing new data in a state with the management information table recorded at the second position A2 after the position where the writing of the data file ended, writes the new data file over the management information table of the second position A2, then records the management information table at the second position A2' after the end position of the new data file.

Also, the table record device 6, when receiving an unload command from the host computer, writes the management information table opened in the unit 3 over the several management information tables recorded on the magnetic tape to renew the same.

On the other hand, as the management information table recorded on the magnetic tape 1, tape management information of the magnetic tape itself and file management information of the user data recorded on the magnetic tape are prepared and recorded.

Specifically, as the tape management information, the tape number, the existence of any tape abnormalities, and the number of times of use of the tape are recorded. Further, as the file management information, the correspondence relationship between the physical position informations (physical block ID's showing tape marks) of the data files and the logical position information (logical block ID's showing tape marks) is recorded.

Since the same management information tables are recorded at several locations on the magnetic tape in this way, even if the control block of the head of the magnetic tape deteriorates due to constant use and the management information table cannot be read out normally, the management information table recorded toward the end of the tape after the final data file of the user area 8 can be read normally and therefore it is possible to reliably prevent loss of the management information table from the magnetic tape and a failure of management.

Note that the embodiment of the magnetic tape storage apparatus in the case of improvement of the security of the management information table is exactly the same in structure as that shown in FIG. 8.

Figure 45:
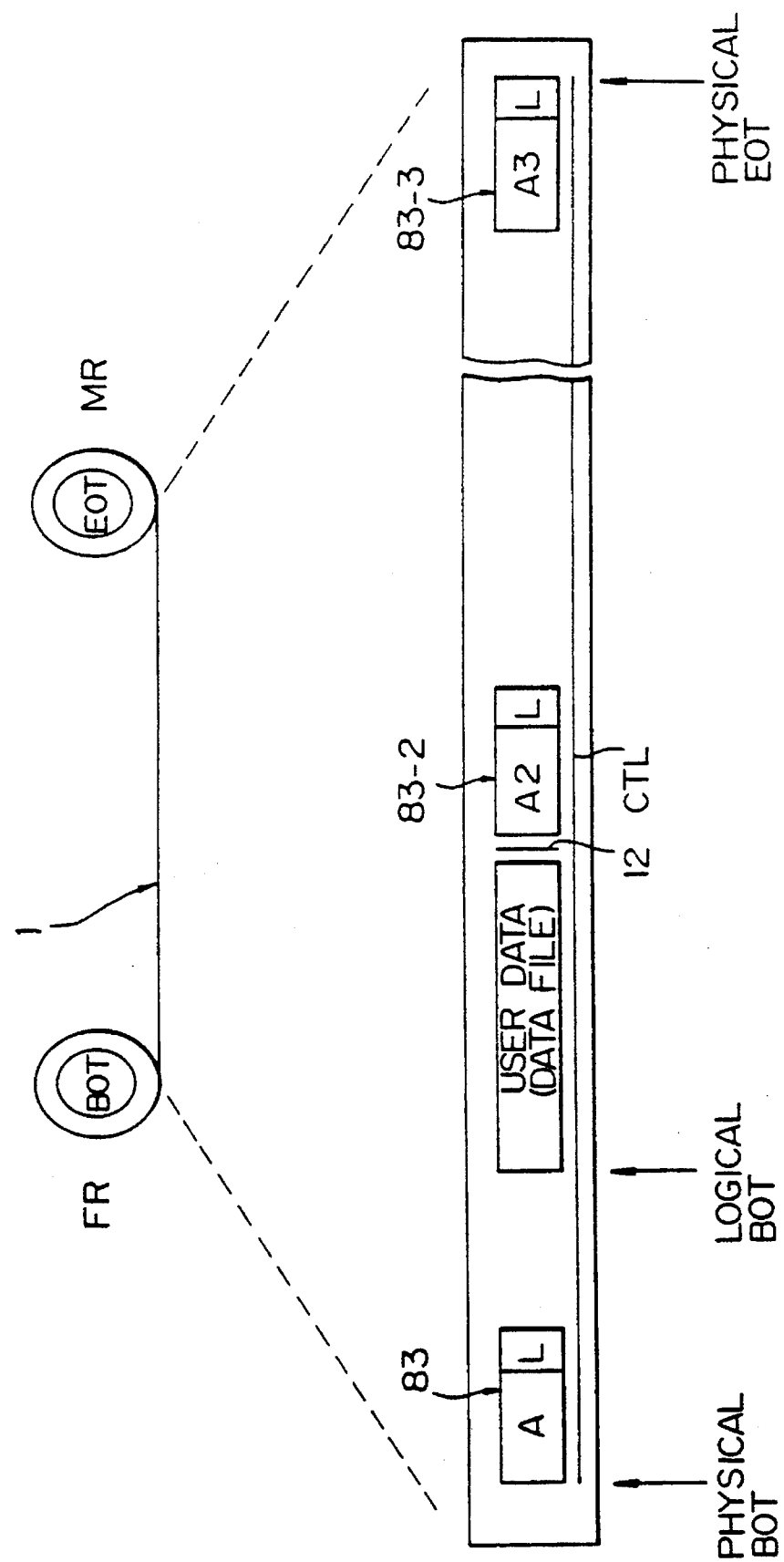
FIG. 45 is a developed view of a magnetic tape.

FIG. 45 is a developed view of a magnetic tape. In FIG. 45, the magnetic tape 1 is housed in a cassette case provided with a file reel FR and a machine reel MR. By setting the cassette in the unit, the magnetic tape 1 is drawn out from the case and brought into contact with the head in the load operation. The magnetic tape 1 has the format shown at the bottom.

First, a control block (table 83) is provided as a different type of recording area from the user data between the physical BOT and the logical BOT of the head of the magnetic tape 1. The table 83 has recorded on it the management information regarding the magnetic tape 1 and the file management information of the user data recorded on the magnetic tape.

Looking at the details of the management information table A, the details on the tape management information of the magnetic tape were given earlier. From the viewpoint of tape security, however, at least the following is recorded:

(1) Tape number (2) Information on existence of tape abnormalities (3) Number of times of use Further, as the file management information of the user data, the correspondence relationship between the physical block IDs showing the physical positions of the tape marks 12 recorded for each file, using, for example, as a unit a single data file, and the logical block IDs of the tape marks used for the file access from the host computer is recorded.

Here, a data file of the user data is usually comprised of a number of data blocks. The physical positions of the data blocks on the magnetic tape can be determined from the control track CTL recorded in parallel with the storage area of the magnetic tape 1.

That is, the control track CTL has recorded on it values increasing by one every predetermined distance from the physical BOT. By reading the control track CTL, it is possible to recognize the physical positions of the data blocks comprising a data file, that is, the user data.

Further, a tape mark 12 is recorded at the end of each data file to show the end position of the data file, therefore if the correspondence relationship of the physical positions of the tape marks 12, that is, the physical block IDs, and the logical positions of the tape marks, that is, the logical block IDs, is known, then it is possible to position the magnetic tape directly to the head using the physical block ID of the tape mark corresponding to the logical block ID designated from the host computer.

Also, at the same time as the management information table A is recorded in the control block (table 83) of the head of the magnetic tape 1, a separate control block (table 83-2) is provided after the user data currently written. This control block 83-2 also has recorded on it the same management information table A2 as the head table 83.

Also, a control block (table 83-3) is provided before the physical EOT at the end position of the magnetic tape 1. This table 83-3 also has recorded on it the same management information table A3 as the management information table A recorded in the head table 83.

In the three tables 83, 83-2, and 83-3 are recorded renewal flags L showing if the management information tables A, A2, and A3 have been renewed. These are set to "1" upon loading of the magnetic tape 1 or just after writing of data and are reset to "0" when unloading the magnetic tape 1.

That is, when the magnetic tape 1 is unloaded due to a power outage etc., it is not possible to renew by recording on the magnetic tape 1 the renewed management information table opened in the memory device 5 of the unit 3, i.e., the control storage 23. In this case, the renewal flag showing renewal remains set at "1".

Therefore, at the next loading, the renewal flag L is checked when reading the management information table from the magnetic tape 1. If the renewal flag L has been set to "1", it is judged that normal renewal of the management information table had not been performed at the previous unloading and therefore it is possible to take suitable measures such as prohibiting the access of the non-renewed management information table.

Further, the renewal flag L of the management information table A at the head is set to "1" during loading. The remaining management information tables A2 and A3 are recorded together with the management information table so as to become "1" immediately after the writing of the user data. During rewinding along with unloading of the tape, everything returns to "0", so it is possible to detect if renewal is underway or final renewal has been performed.

Of course, it is possible to Just record the management information tables A, A2, and A3 without recording the renewal flags L in the tables 83, 83-2, and 83-3.

FIG. 46 is a view explaining the first write operation of user data.

In FIG. 46, when user data 1 is written after the head control block (83), the file management information of the user data newly added is added to the management information table opened in the control storage 23 of the unit 3. This management information is recorded as a control block (83-2) directly after the position where the writing of the user data has ended.

FIG. 47 is an explanatory view showing the second user data write operation following the first user data write operation of FIG. 46.

In FIG. 47, the second user data 2 is written over the management information table of the control block (83-2) following the user data 1 shown in FIG. 46. The writing of this user data 2 results in a loss of the management information table of the data block just after the user data 1.

When the writing of the user data 2 ends, the file management information relating to the user data 2 newly written in the management information table opened in the control storage 23 of the unit 3 is added and the management information table A2' is written as the data block (83-2') just after the user data 2.

In FIG. 46 and FIG. 47, the management information table of the head control block (83) is renewed, as clear from the later explanation, basically by recording and renewal at the time of unloading, but sometimes the tape head position is positioned to by rewinding of the magnetic tape. At that time, it is also possible to record and renew the management information table of the control storage 23 in the control unit.

Further, in FIG. 46 and FIG. 47, the renewal flag L is set to "1" when the management information table of the control storage 23 in the unit 3 is written and renewed. L returns to "0" by the recording and renewal at the time of unloading of the tape. At the next loading, if the renewal flag L is "0", then it is learned that the renewal has been completed normally, while if L is "1", it is learned that the renewal has not been done normally.

FIG. 48 is an explanatory view showing the read processing of a management information table when loading the magnetic tape. The example is shown here of the case where a tape abnormality occurs in the head control block of the magnetic tape.

In FIG. 48, if the magnetic tape 1 is set in the drive unit 2 and the load operation is performed, the read-out of the head control block (83) of the magnetic tape 1 in the control storage 23 in the unit 3 is performed.

However, assume that there is a tape abnormality due to wear or deterioration at the control block (83) and that the management information table A is lost.

In this case, the magnetic tape 1 is further advanced and the control block (83-2) is read, whereby the read-out information from the head control block (83) where the tape abnormality occurred, stored in the control storage 23 of the unit 3, is written over the management information table normally read out from the next control block (83-2). The necessary information is performed in accordance with this normal management information table.

Figure 49:
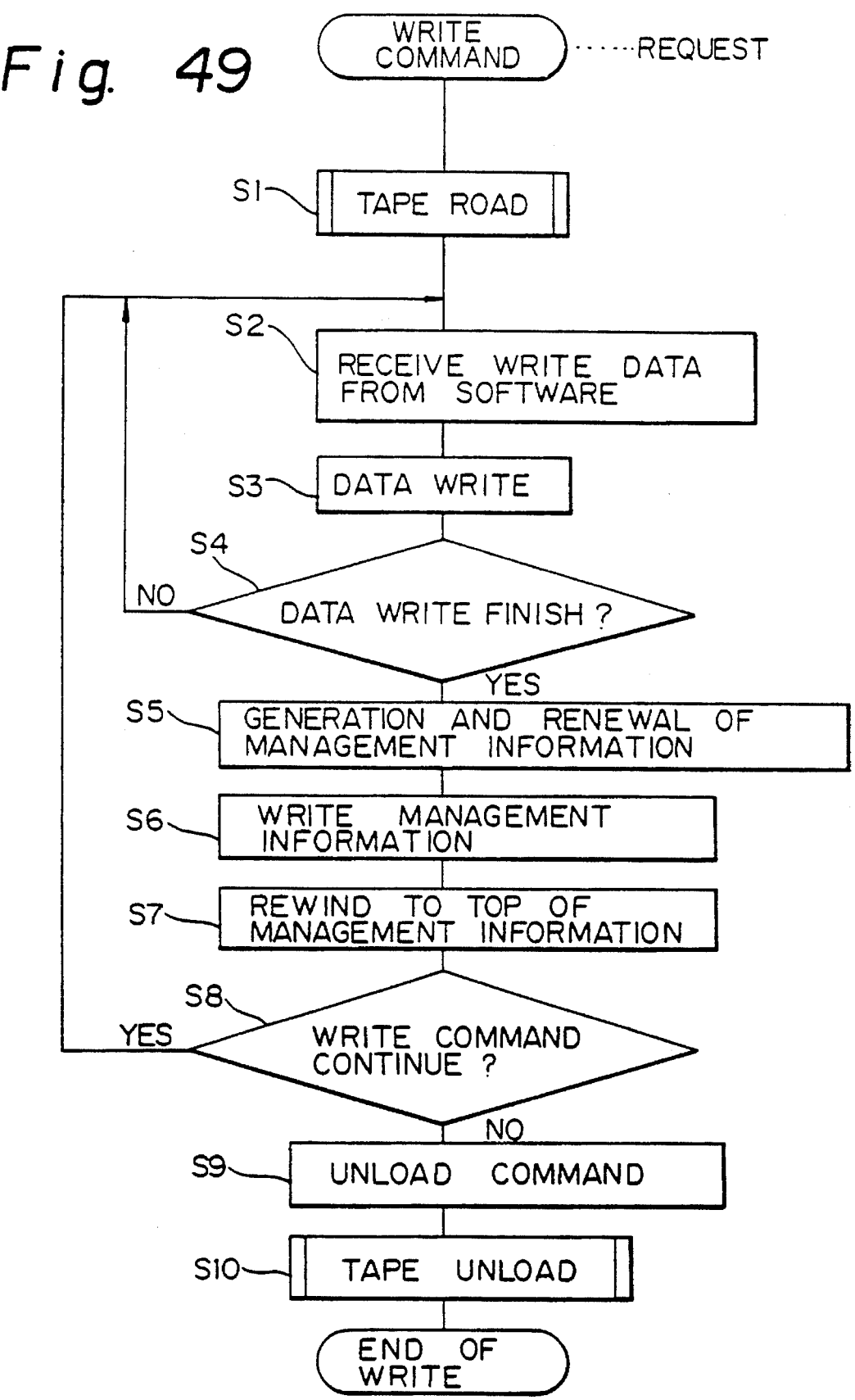
FIG. 49 is a flow chart showing a write operation corresponding to FIG. 47.

FIG. 49 is a flow chart showing a write operation corresponding to FIG. 47. That is, FIG. 49 is a flow chart showing the control processing when a write command is received from the host computer.

First, a load command from the host computer is received and, at step S1, the tape is loaded. The processing for loading the tape at step S1 is shown as a subroutine in FIG. 50.

Figure 50:
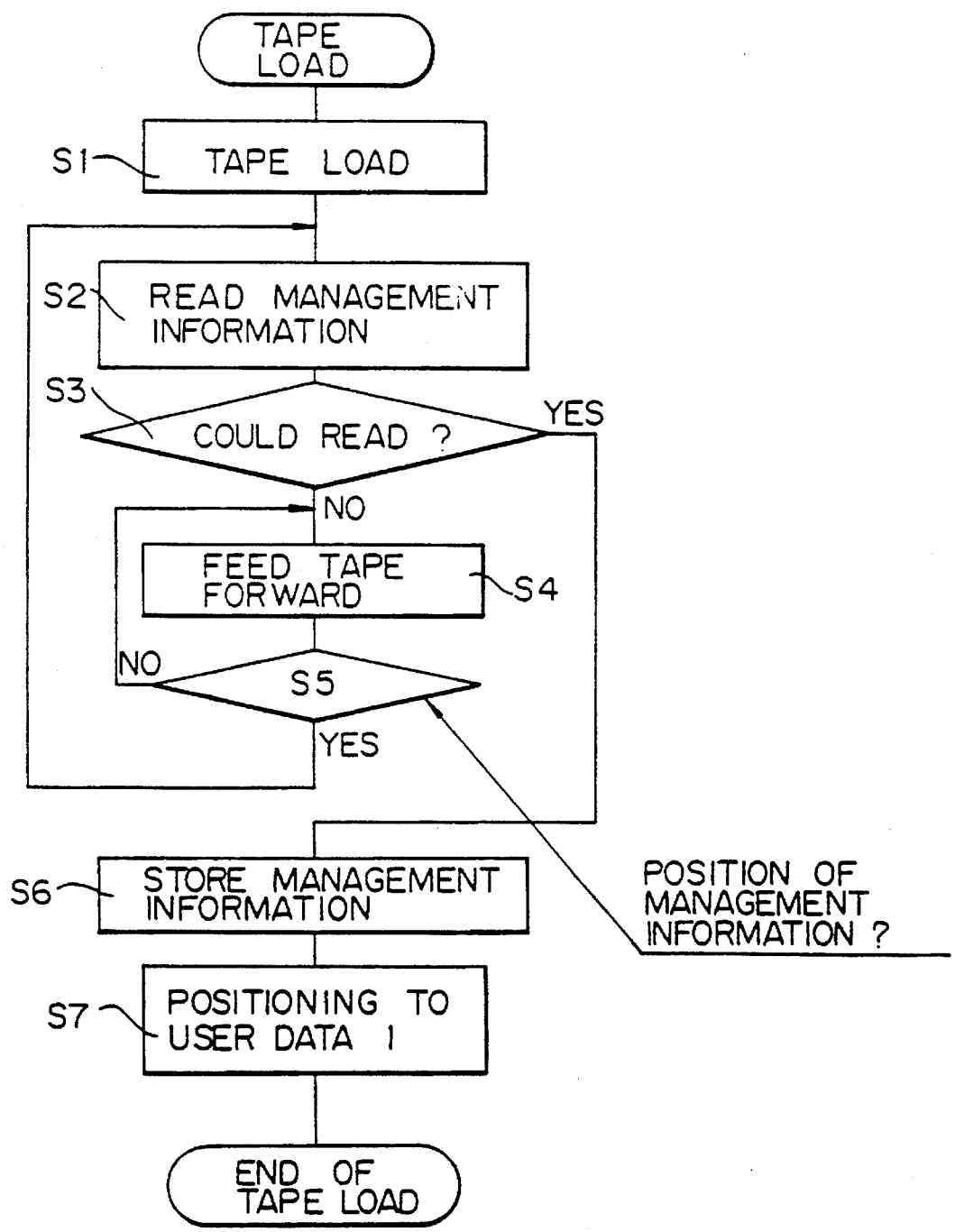
FIG. 50 is a flow chart showing the tape loading in FIG. 49.

In FIG. 50, at step S1, if the tape is loaded by the load operation, then at the next step S2, the management information table from the head control block (83) of the magnetic tape 1 is read and opened in the control storage 23 of the unit 3.

If it is not possible to read the management information table due to a scratch in the tape or another factor, it is judged that the management information table has been lost. At step S4, the tape is forwarded, then at step S5 the control block with the next management information table recorded on it is discriminated and the processing from step S2 is repeated.

If it is possible to read the management information table at step S3, it is judged that the management information table is normal, then at step S6 the management information table is stored in the control storage 23 and the renewal flag L (for the read control block) is set to "2". Then, at step S7, the tape is rewound to the initial user data 1 and the processing of FIG. 48 is returned to.

At step S2 in FIG. 49, a write command and write data are received from the software, that is, the host computer, then at step S3, the data is written.

If it is judged at step S4 that the writing of the data has ended, the routine proceeds to step S5, whereupon the file management information relating to the newly written user data is added to the management information table opened in the control storage 23 to prepare and renew a new management information table. At step S6, the management information table is written as the control block immediately after the newly written user data. Further, the control block 44 at the end of the magnetic tape and the control block 83 at the head of it are renewed by writing the management information table at the time of unloading of the tape.

The renewal flag L is set to "1" by the renewal of the magnetic tape 1 at step S6.

Next, at step S7, the tape is rewound to before the newly written management information table, then at step S8 the presence of a chain of write commands is checked for. If the write commands continue, the processing from step S2 is repeated.

If it is judged at step S8 that the chain of the write commands is broken, the routine proceeds to step S9, where an unload command is awaited and the routine proceeds to the tape unload processing of step S10.

Figure 51:
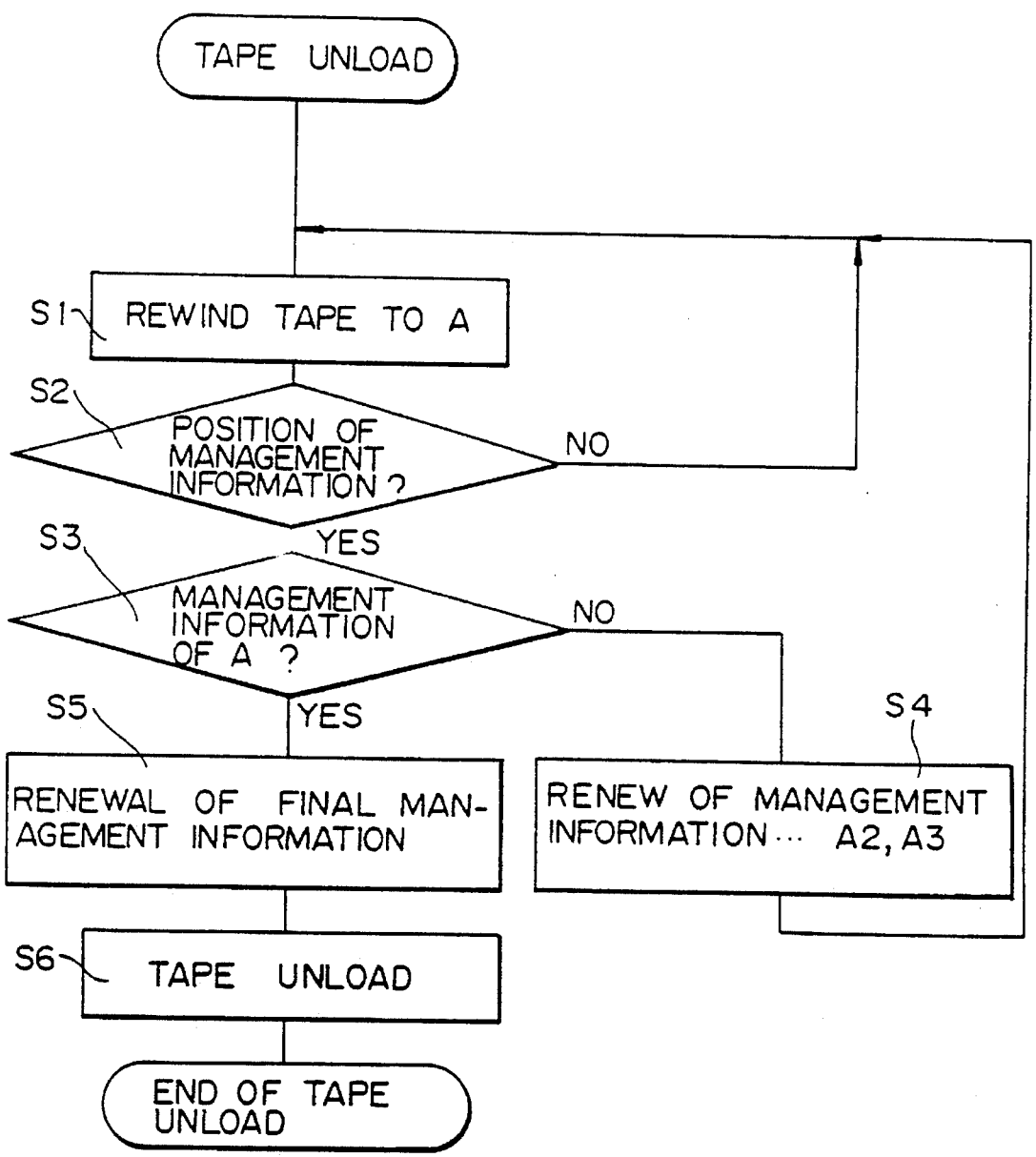
FIG. 51 is a flow chart showing the tape unloading processing in FIG. 49.

The tape unload processing of step S10 is shown in FIG. 51.

In FIG. 51, first the magnetic tape is started to be rewound to the management information table A of the head control block 83.

At step S2, it is checked if the position of the management information table is reached during tape rewinding. If it is judged that the position is of the management information table, the routine proceeds to step S3, where it is checked if it is the head management information table A. If it is not the head management information table A, it is the management information table A2 existing directly after the user data or the management information table A3 existing at the end of the magnetic tape, so the routine proceeds to step S4, where the management information tables A2 and A3 are renewed while rewinding the tape.

If it is judged at step S3 that the management information table is the management information table A of the head of the tape, then at step S5, the management information table A is renewed as the final management information table, then at step S6 the tape is unloaded.

For the renewal of the management information tables at step S4 and step S5, the renewal flags L are simultaneously changed from "1" to "0".

When the above tape unload processing ends, the routine proceeds to step S7, where the series of processing steps for the write command is ended.

Figure 52:
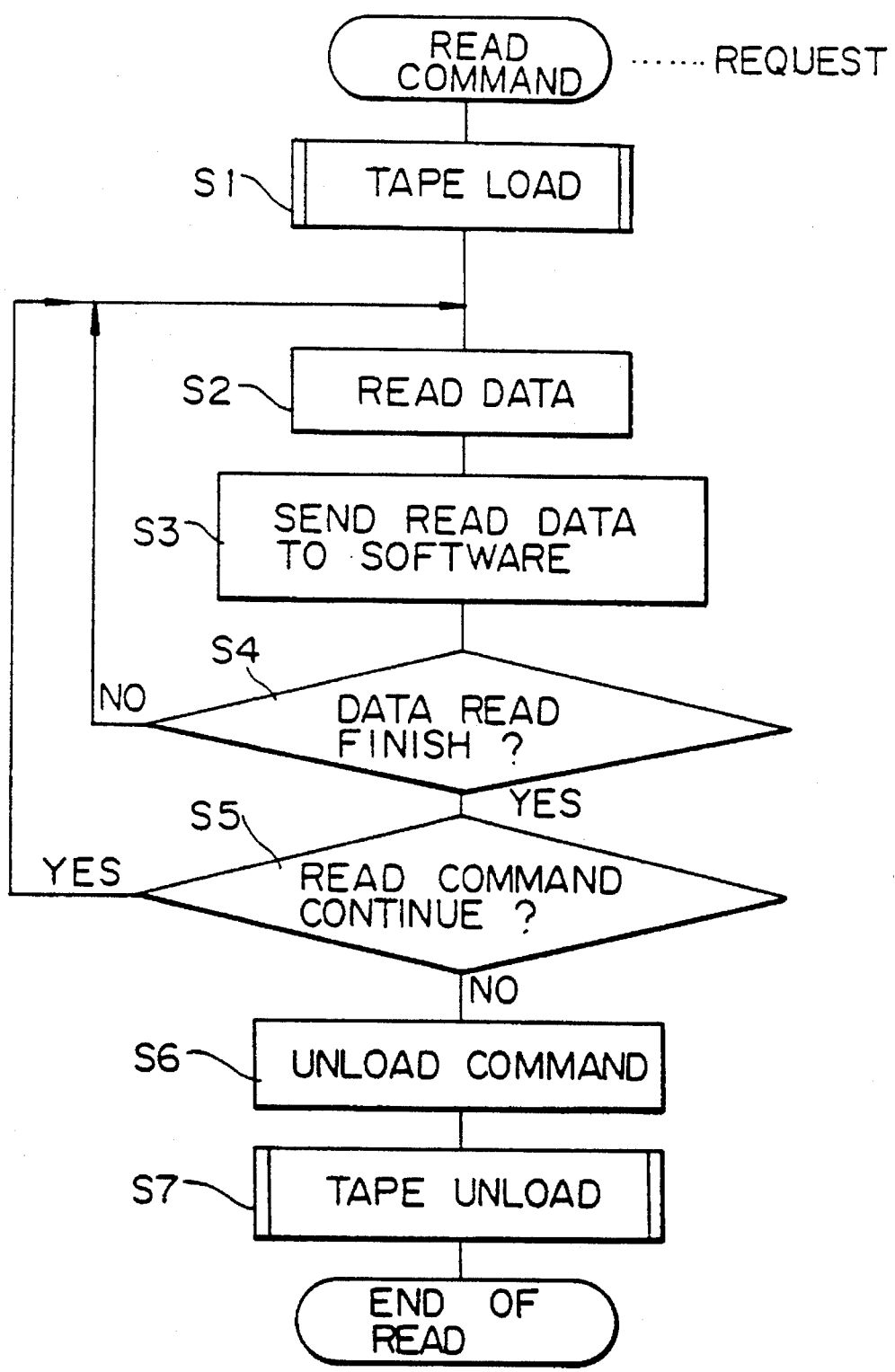
FIG. 52 is a flow chart showing the read operation in FIG. 45.

FIG. 52 is a flow chart showing the read operation in FIG. 45. It shows the processing operation when a read command is received from the host computer.

In the processing operation of the read command of FIG. 52, the read-out of the management information table during the loading of the tape at step S1 is performed as shown in the subroutine of tape loading of FIG. 50. Further, the renewal of the management information table during the tape unloading of step S7 when receiving an unload command at step S6 is performed as shown in the subroutine of FIG. 51.

Step S2 to step S5 are processing steps unique to a read command. At step S2, the data is read from the magnetic tape, at step S3, the readout data is sent to the software, that is, the host computer, at step S4, it is judged of the data read-out has ended and if so, at step S5 it is checked if there is a continuation in the chain of read commands. If the chain ends, then at step S6, an unload command is awaited and the routine proceeds to the tape unload processing of step S7.

As explained above, according to the structure of the table shown in FIG. 44, even if the management information table relating to the medium and files recorded at a part of the magnetic tape is lost due to deterioration of the magnetic tape etc., it is possible to reliably reproduce the management information table by the management information tables written at other locations and therefore it is possible to improve the reliability of access by the management information table recorded on the magnetic tape.

Also, when a magnetic tape is unloaded due to a power outage etc. before the management information table of the magnetic tape is renewed, it is possible to determine that the management information table had not been normally renewed by viewing the renewal flag at the time of the next loading, so suitable measures may be taken.

Next, the tape mark 12 shown in FIG. 10 will be explained in greater detail. More specifically, an explanation will be made of the division of files on the magnetic tape by writing of tape marks 12 and the writing of tape marks in the case of differentiation of the final file.

Usually, a single tape mark is written to show the division of a file recorded on a magnetic tape 1. Further, two tape marks are written to show the final file.

Therefore, when writing a new file after an already written final file, it is necessary to change the two tape marks 12 to a single one.

Figure 53:
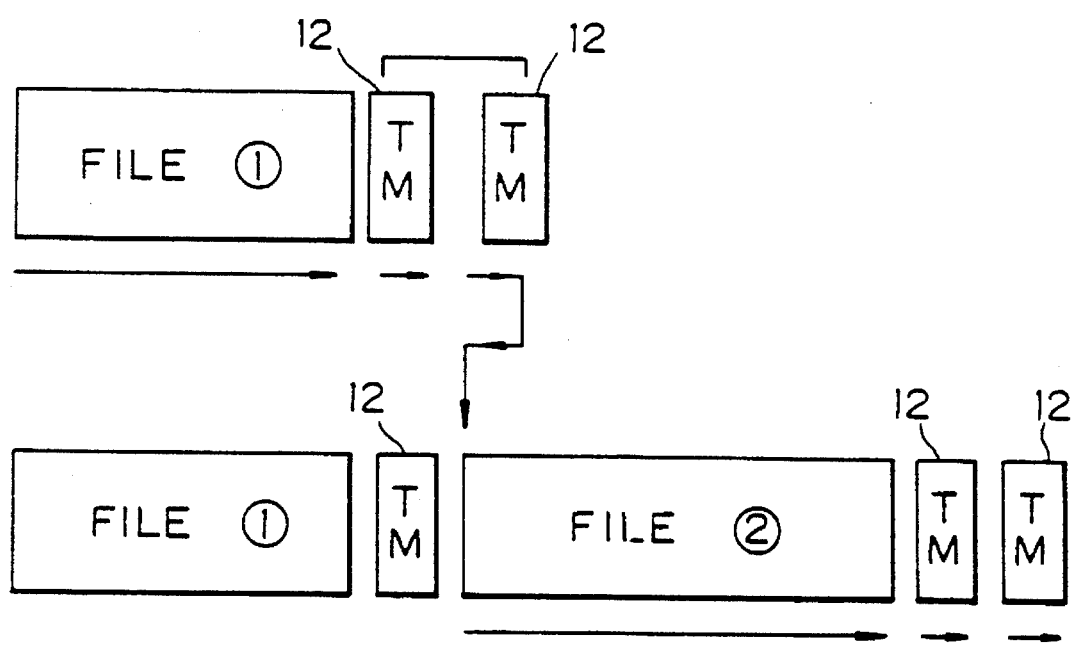
FIG. 53 is a view explaining the general method of writing tape marks.

When writing a file in a magnetic tape storage apparatus of the helical scan type, as shown in FIG. 53, when the writing of one file, for example, the no. 1 file, is ended, two tape marks (TM) 12 are written to show that it is the final file.

FIG. 53 is a view explaining the general method of writing tape marks. At the top are shown the above-mentioned two tape marks (TM) 12.

Further, as shown at the bottom part of FIG. 53, when newly writing a no. 2 file after the already written no. 1 file, the two tape marks 12 which had been written at the end of the no. 1 file are changed to a single tape mark 12 showing the division of a file, then the no. 2 file is written and then two tape marks 12 showing that it is the final file are written at the end of the no. 02 file.

Therefore, if a single tape mark is detected when reading a magnetic tape, it is learned that there is a file division, while in two tape marks are detected, it is learned that the file is the final one.

In such a conventional system of writing tape marks, however, there are several seconds of lost time from when the writing of a file ends to when the writing of the next file starts and therefore there is the problem of too much time being taken for writing.

That is, when writing a no. 2 file after the no. 1 file of the top portion of FIG. 53, first the magnetic tape 1 is read and if two tape marks are detected in succession, it is judged that the file is the final one and that nothing is written after the tape marks.

Next, positioning processing is performed for returning the magnetic tape one tape mark's worth of position back, then the next no. 2 file is written and a single tape mark showing a file division is left.

Therefore, there are several seconds of lost time until the writing of the new file starts.

It is desirable to eliminate this problem and enable efficient writing of a file without any lost time when writing a new file after a final file.

Figure 54:
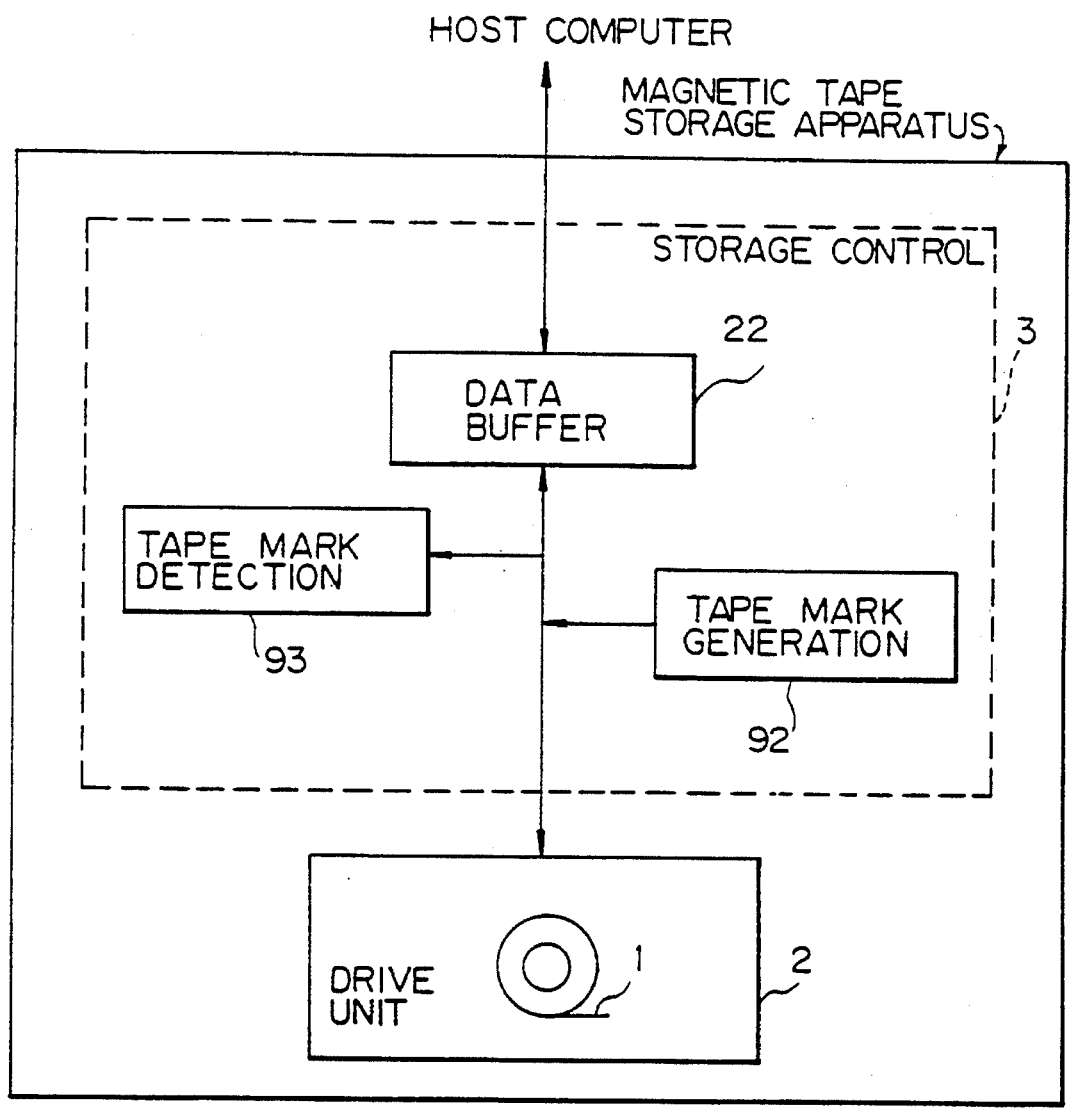
FIG. 54 is a view showing the processing device for tape marks used in the present invention.

FIG. 54 is a view showing the processing device for tape marks used in the present invention.

Figure 55:
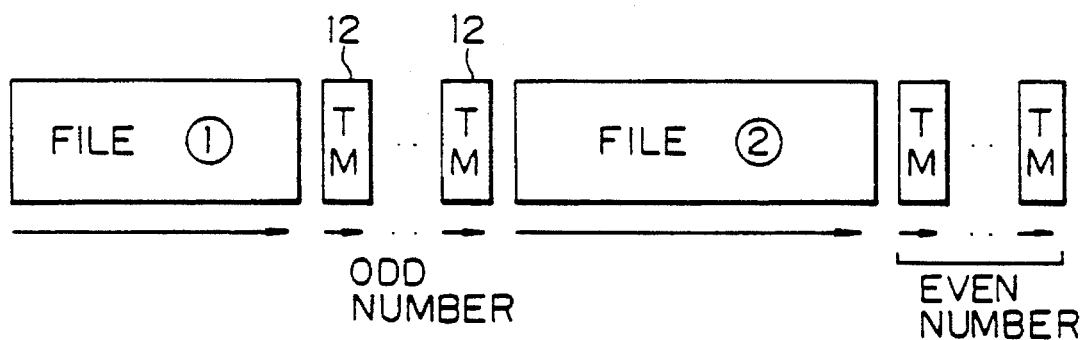
FIG. 55 is a view showing the tape marks written on a magnetic tape by the tape mark generation means of FIG. 54.

FIG. 55 is a view showing the tape marks written on a magnetic tape by the tape mark generation device of FIG. 54.

First, the data transferred from the host computer is stored in the data buffer 22 of the storage control unit 3, then the data is transferred to the drive unit 2 and written on the magnetic tape 1. The data read from the magnetic tape 1 is transferred from the drive unit to the data buffer 22 of the storage control unit 3 for storage, then is transferred to the host computer.

The apparatus of FIG. 54 is provided with a tape mark generation device 92 which, during processing for writing a file on a magnetic tape 1, generates an odd number of tape marks and writes the same at the end of the file when the file is not the final one and generates an even number of tape marks and writes the same at the end of the file when it is the final file.

Further, provision is made of a tape mark detection means 93 which, when performing processing for reading from the magnetic tape, considers detection of an odd number of tape marks 12 as one mark and judges that there is a file division, while considers detection of an even number of tape marks 12 as two marks and judges that the file is the final one.

The tape mark generation device 92, when performing processing for writing a file on the magnetic tape 1, generates three tape marks 12 and writes the same at the end of the file if the file is not the final one and generates two tape marks and writes the same at the end of the file 12 if the file is the final one.

The tape mark detection device 93, when performing processing for reading the magnetic tape 1, considers three tape marks as being one and judges there is a file division and judges, with two tape marks, that the file is the final one.

Further, the tape mark generation device 92, when writing a new file after a final file, writes a single tape mark after the already written even number of tape marks to make an odd number.

Specifically, the tape mark generation device 92, when writing a new file after a final file, writes one tape mark 12 after the already written two tape marks 12 to make three tape marks.

First, when the transfer of a file has ended in the transfer from the data buffer 22 to the drive unit during writing, if a succeeding file is recognized, an odd number of tape marks 12 is generated. If a succeeding file is not recognized, an even number of tape marks is generated. These tape marks are written at the end of the file.

When next writing a file, if an even number of tape marks 12 is detected, it is judged that the file is the final one. For example, one tape mark 12 is generated and written so as to change to an odd number of tape marks showing file division, then the next file is written.

Therefore, when writing a new file, there is no need for the positioning process to return the magnetic tape by exactly one tape mark.

Figure 56:
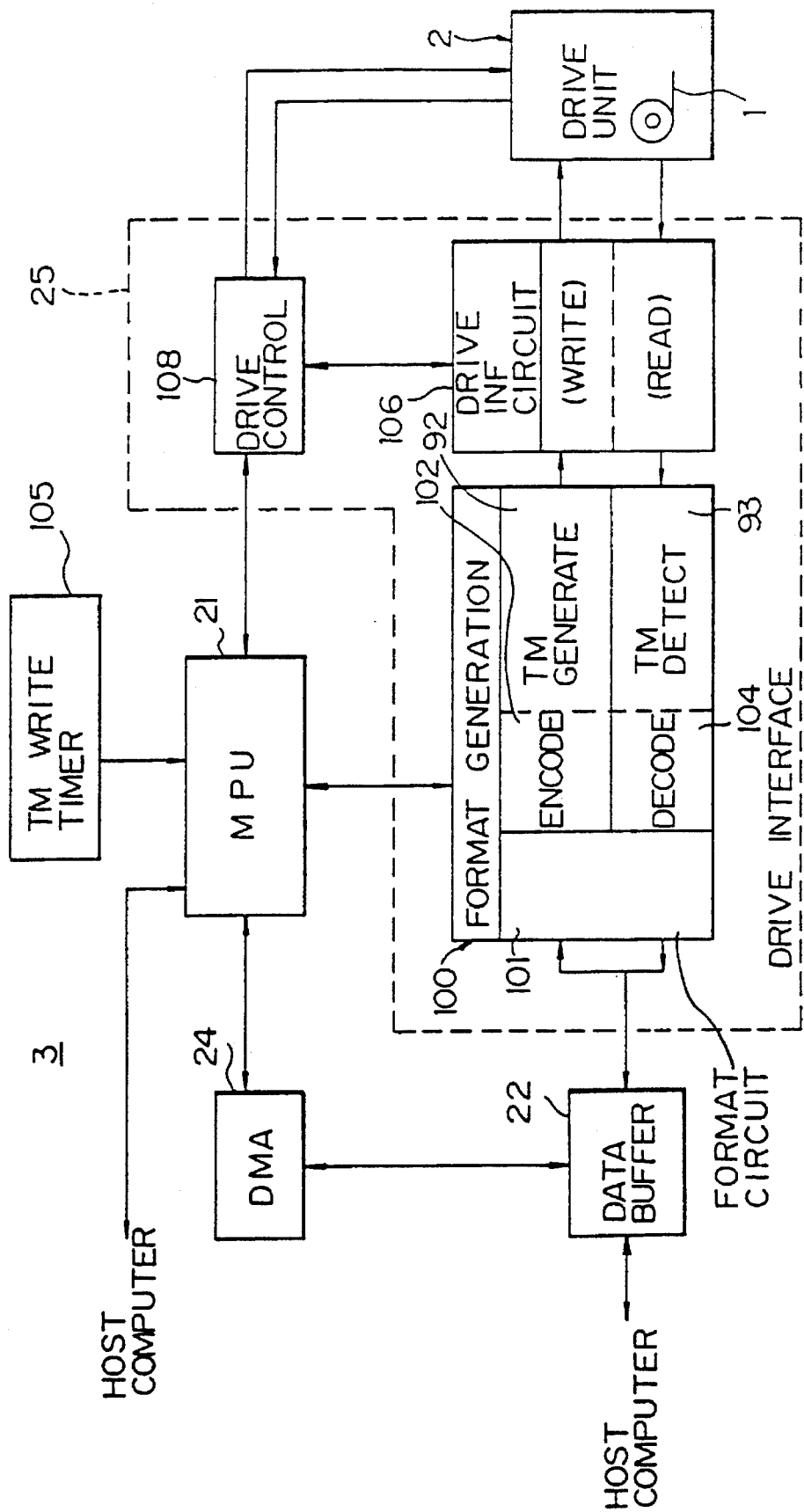
FIG. 56 is a view showing in detail an example of a portion in FIG. 8 relating to the structure of FIG. 54.

Note that the embodiment of the magnetic tape storage apparatus shown in FIG. 54 is exactly the same in construction as that shown in FIG. 8. FIG. 56 is a view showing in detail an example of a portion in FIG. 8 relating to the structure of FIG. 54. In FIG. 56, the same reference numerals are given to constituent elements the same as those shown in FIG. 8 and FIG. 54.

In FIG. 56, the data buffer 22 stores the write data transferred from the host computer or stores the read data sent from the drive unit 2. The DMA controller 24 functioning as a buffer controller notifies the microprocessor (MPU) 21 of the current state of the data buffer 22 and controls the data buffer 22 in accordance with the commands from the microprocessor 21.

The drive interface 25 has provided in it a format generator 100. The format generator 100 is provided with a format circuit 41, an encoding circuit 102, a decoding circuit 104, a tape mark generation circuit 92, and a tape mark detection circuit 93. The drive interface 25 is provided with a drive interface (INF) circuit 106 and a drive control 108.

First, the encoding circuit 102 converts the data output from the format circuit 41 to a format which can be written on the magnetic tape, while the decoding circuit 104 converts back the data read out from the magnetic tape 1.

The tape mark generation circuit 92, when the microprocessor 21 recognizes that the transfer of a file from the host interface 26 has ended, receives a command from the microprocessor 21 for generating tape marks and thereupon generates tape marks 12.

During the generation of tape marks, if the microprocessor 21 recognizes that a next file has been transferred, the generation of tape marks 12 is stopped in accordance with a command from the microprocessor 21 so as to control the number of tape marks in this case to an odd number.

Further, even if it is judged that no next file is being transferred, tape marks 12 are continued to be written for a predetermined time, then the generation of tape marks is stopped in accordance with a command of the microprocessor 21 and the number of tape marks in this case is controlled to become an even number.

Figure 57:
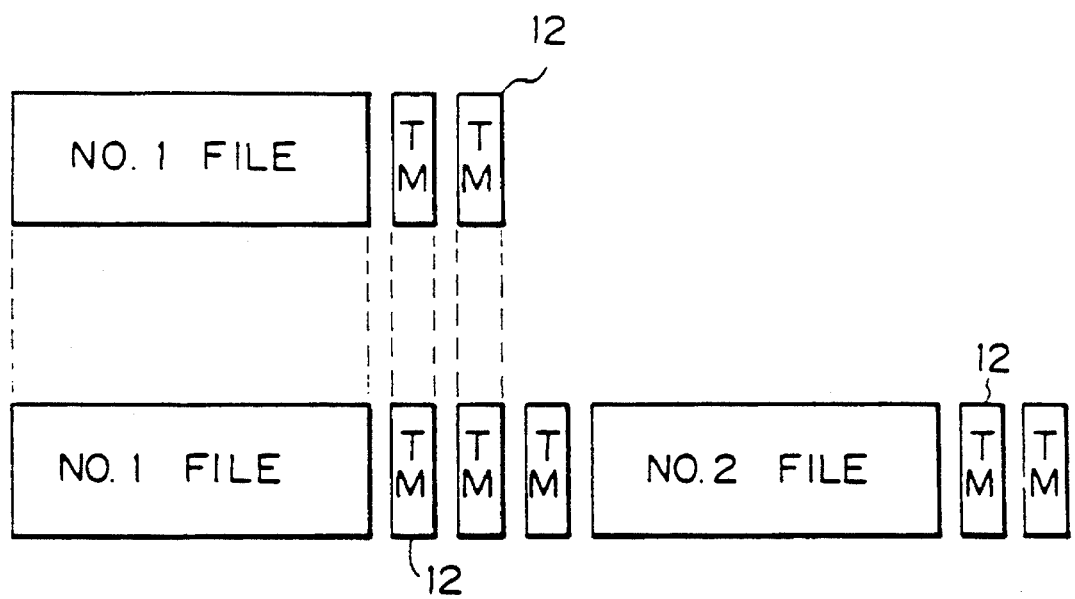
FIG. 57 is an explanatory view showing the state of tape marks TM written on a magnetic tape by the generation of tape marks by the tape mark generation circuit 92 of FIG. 56.

FIG. 57 is an explanatory view showing the state of tape marks TM written on a magnetic tape by the generation of tape marks by the tape mark generation circuit 92 of FIG. 56.

First, the top portion of FIG. 57 shows the state of writing just a single file. To show that the no. 1 file is the final file, an even number of tape marks (TM) 12 are written at the end of the file, in this example, two tape marks (TM) 12 are written.

The bottom portion of FIG. 57 shows the state where the no. 1 file and the no. 2 file are written in succession. To show the division from the no. 2 file after the initial no. 1 file, an odd number of tape marks (TM) 12, in this example, three tape marks (TM), are written. Since the no. 2 file is the final file, two tape marks (even number) are written.

When newly writing the no. 2 file after the end of writing of the no. 1 file shown at the top portion of FIG. 57, since there are an even number of tape marks (TM) 12 at the end of the no. 1 file, specifically two tape marks, the later explained tape mark detection circuit 93 judges that the file is the final one, then writes the no. 2 file, but at this time, first an additional tape mark (TM) is given to make an odd number, that is, three tape marks (TM) and then the writing of the no. 2 file is started. Therefore, since an additional tape mark is made, there is no need for the positioning processing to return the magnetic tape.

Also, in writing of tape marks in the helical scan system, a single tape mark (TM) 12 is realized by writing on the magnetic tape the tape mark pattern of the single strip portion (TR in FIG. 1).

Referring again to FIG. 56, the tape mark detection circuit 93 detects the tape marks 12 during reading and notifies the microprocessor 21 of its findings. That is, it considers detection of an odd number of tape marks, specifically three tape marks, as one mark, to judge there is a file division, and judges from detection of an even number of tape marks, specifically two tape marks, that a file is the final one.

The drive interface circuit 106 is controlled by the drive control 108 and performs communication of data between the storage control unit 3 and the drive unit 2. Therefore, the drive control 108 notifies the microprocessor 21 of the current state of the drive interface 25 and controls the drive interface circuit 106 and the drive unit 2 in accordance with commands from the microprocessor 21.

Further, the microprocessor 21 is provided with a tape mark write timer 105, which tape mark write timer 105 monitors the time for writing tape marks for a predetermined period when writing tape marks on the magnetic tape. The timer 105 can be realized using the control storage 23 of FIG. 8.

Figure 58:
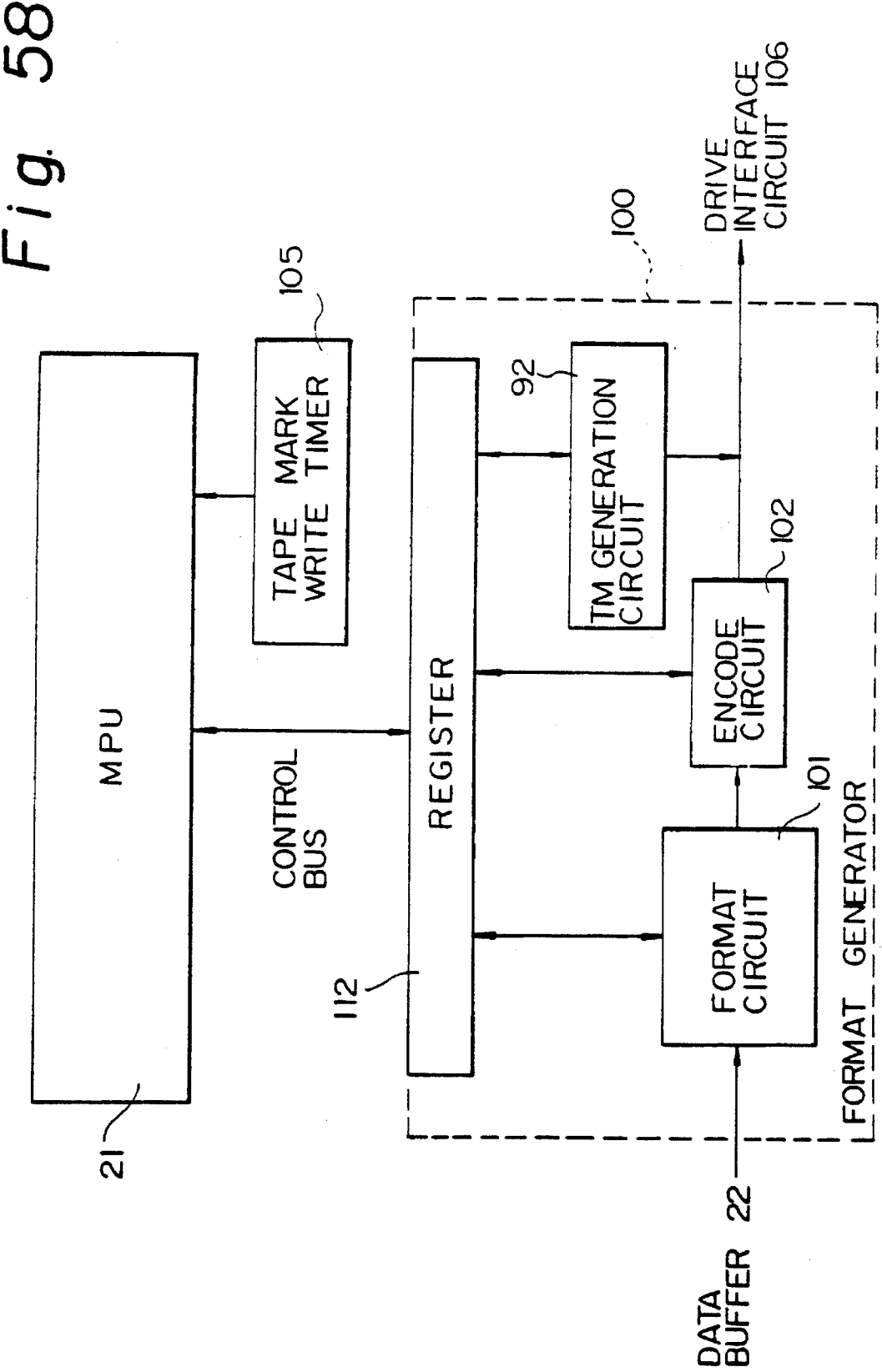
FIG. 58 is a detailed view showing a format generator 100 in a drive interface 25 in the structure of FIG. 56 at the time of writing on the magnetic tape.

FIG. 58 is a detailed view snowing a format generator 100 in a drive interface 25 in the structure of FIG. 56 for the period when writing on the magnetic tape. The communication with the microprocessor 21 is performed by the register 112.

In FIG. 58, the general operation for writing data on the magnetic tape 1 is as follows:

The data transferred from the host computer is stored in the data buffer 22, then when the buffer becomes full, is transferred to the format generator 100. When transferring data to the format generator 100, if the microprocessor 21 recognizes a command from the host computer 26 for ending a file, the tape mark generation circuit 92 is activated, a tape mark pattern is generated, and an even number (2) of tape marks 12 are written after the end of the file.

If the microprocessor 21 recognizes that there is no next file from the host interface, a command for stopping the drive unit 2 is output from the microprocessor 21 and the series of write processing steps is ended.

If the microprocessor 21 recognizes that there is a next file from the host interface, the tape marks 12 continue to be written to make an odd number (3), then the next file is written.

Figure 59A:
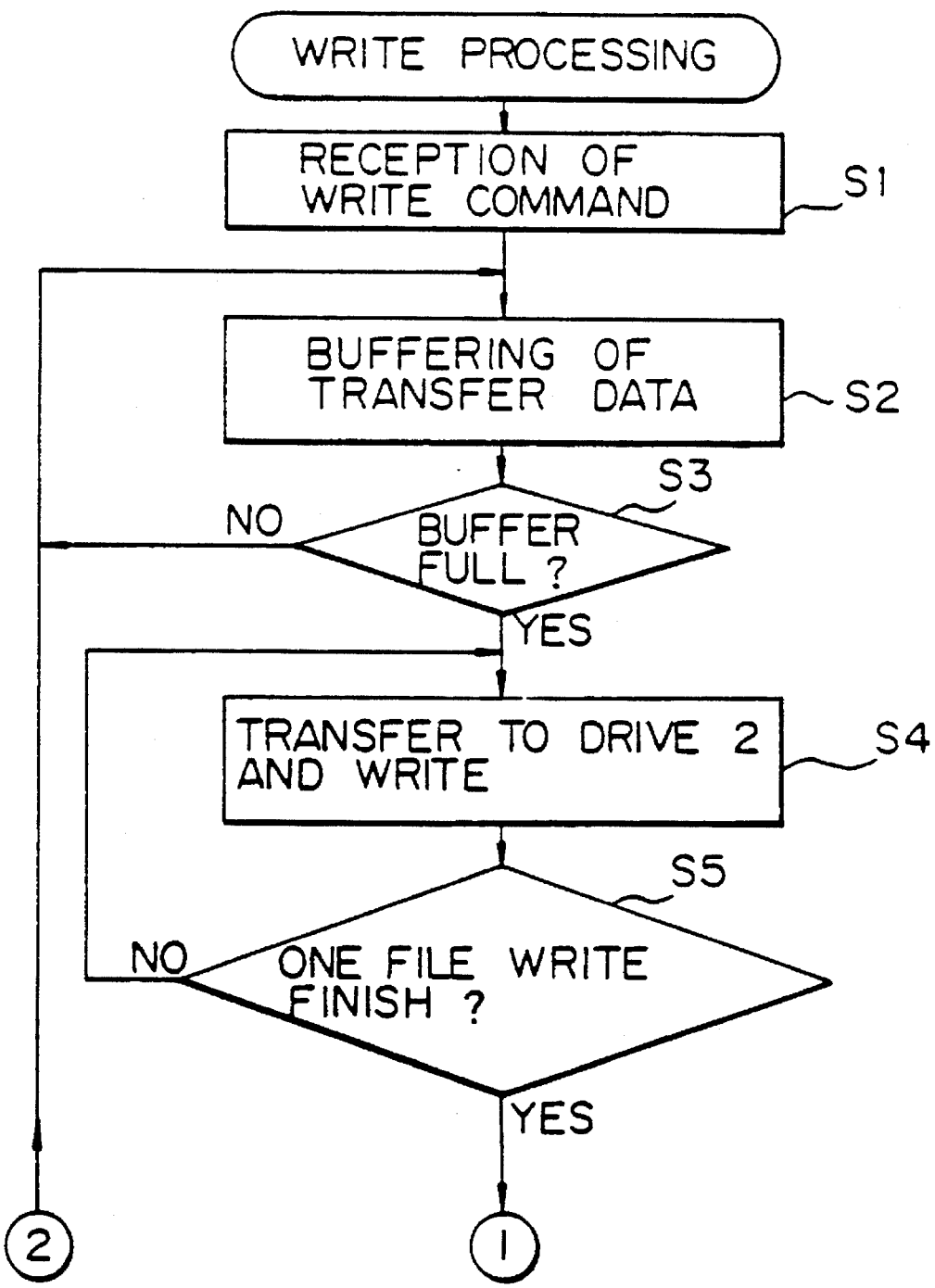
Figure 59B:
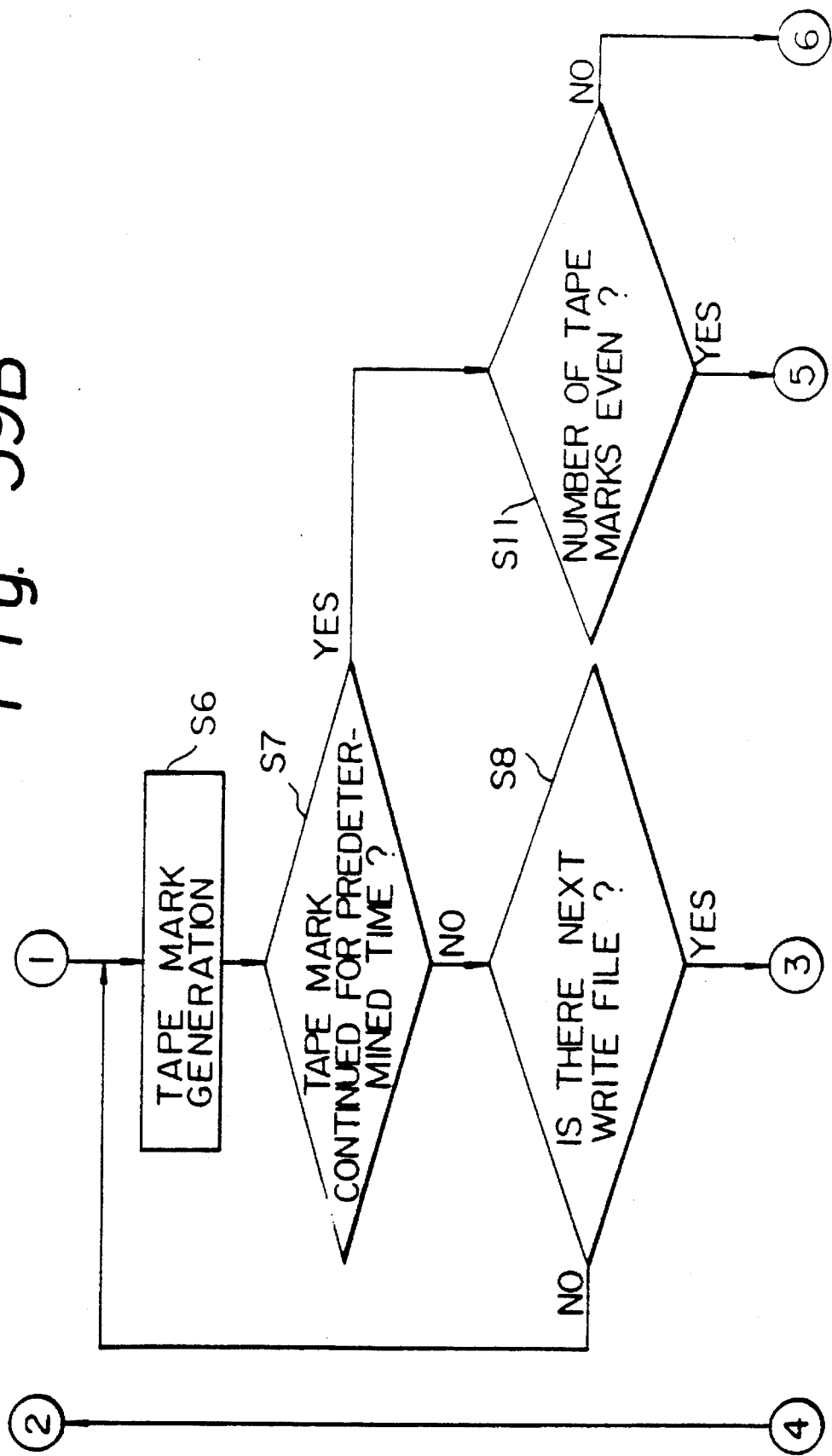

FIG. 59A, FIG. 59B, and FIG. 59C are flow charts showing the write operation in the structure of FIG. 56.

In FIG. 59A, first, at step S1, if a write command is received from the host computer, the routine proceeds to step S2, where the transferred data is buffered in the data buffer 22. Next, at step S3, a full state of the buffer is monitored for. If the buffer becomes full, the data is transferred and written to the drive unit 2 at step S4.

During this period, it is checked at step S5 if the writing of a file has ended. If not ended, the processing for transferring and writing data to the drive unit 2 is continued, while if ended, then a command for generation of tape marks 12 is made as shown in step S6 of FIG. 59B.

At step S7, it is monitored if the tape marks generated at step S6 continue for a predetermined time. Further, at step S8, it is checked if there is a next writing file.

Here, when there is no next file, the processing of step S6 to step S8 is repeated until a predetermined time elapses at step S7. The time set by the tape mark write timer 105 and judged at step S7 is set to the time required for writing an even number (for example, 2) of tape marks on the magnetic tape.

At step S8, if it is recognized that there is a next file to be written, the routine proceeds to step S9 in FIG. 59C, where it is checked if the number of the tape marks 12 written is odd. If odd, the routine returns to step S2, where the next buffering is started. If not odd, the routine proceeds to step S10, where another tape mark is added to make an odd number (for example, 3), then the routine returns to step S2.

On the other hand, when there is no next file to be written, if it is judged that writing is performed with tape marks extending over a predetermined time at step S7, then at step S11 it is checked if the number of tape marks written is even (for example, 2). If even, a stopping command is issued to the drive unit 2. At step S12 of FIG. 59C, the series of write processing steps is ended after notification of ending from the drive unit 2.

If the number of the tape marks written at step S11 is not even, then at step S13 of FIG. 59C another tape mark is added to make an even number indicating the final file, then the routine proceeds to step S12.

Figure 60:
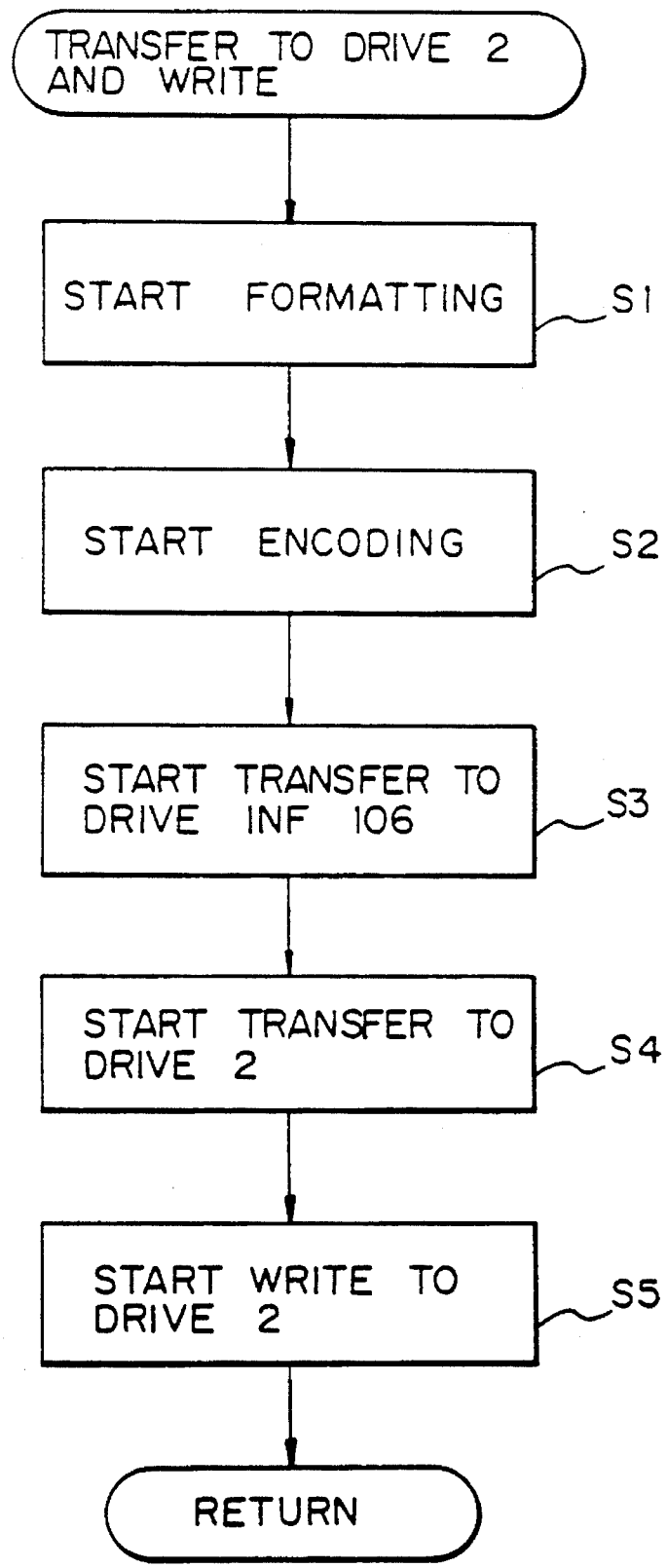
FIG. 60 is a flow chart showing details of the transfer and write processing to the drive unit 2 side at step S4 in FIG. 59A.

FIG. 60 is a flow chart showing details of the transfer and writing processing to the drive unit 2 side at step S4 in FIG. 59A.

In processing for transferring and writing data to the drive unit in FIG. 60, first, at step S1, the format generator 100 is activated to start the formatting, then at step S2 the encoding circuit 102 is activated to start the encoding, and then at step S4 the transfer of data to the drive interface circuit 106 is started. Next, at step S4, the transfer to the drive unit 2 is started, and finally at step S5, the writing by the drive unit 2 is started.

Figure 61:
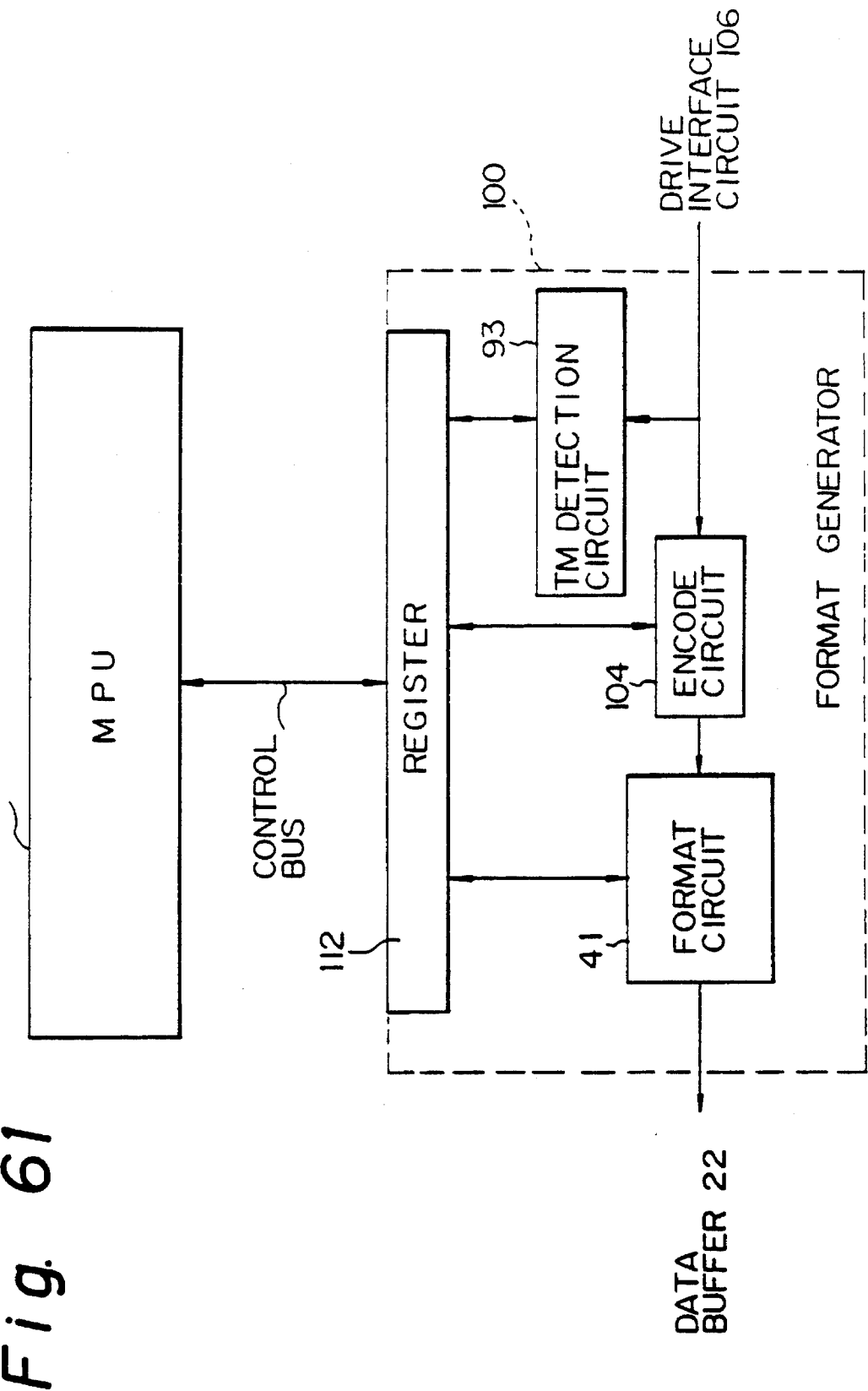
FIG. 61 is a view showing the format generator 100 in the drive interface 25 in the structure of FIG. 56 at the time of reading from the magnetic tape.

FIG. 61 is a view showing the format generator 100 in the drive interface 25 in the structure of FIG. 56 when reading from the magnetic tape.

When reading data, the decoding circuit 104 and format circuit 101 of the format generator 100 and the tape detection circuit 93 become effective.

The operation for writing data is explained briefly below.

When the microprocessor 21 receives a read command from the host computer, it controls the drive unit 2 to start the reading. The data read from the magnetic tape is input from the drive interface circuit 106 to the decoding circuit 104 of the format generator 100 where it is converted back to the format at the time of writing, then is reproduced into the original data by the format circuit 101 and sent to the data buffer 22.

At this time, the read-out data output from the drive interface 25 is monitored for tape marks 12 by the tape mark detection circuit 93. If tape marks are detected by the tape mark detection circuit 93, notification is made to the microprocessor 21 through the register 112.

Figure 62A:
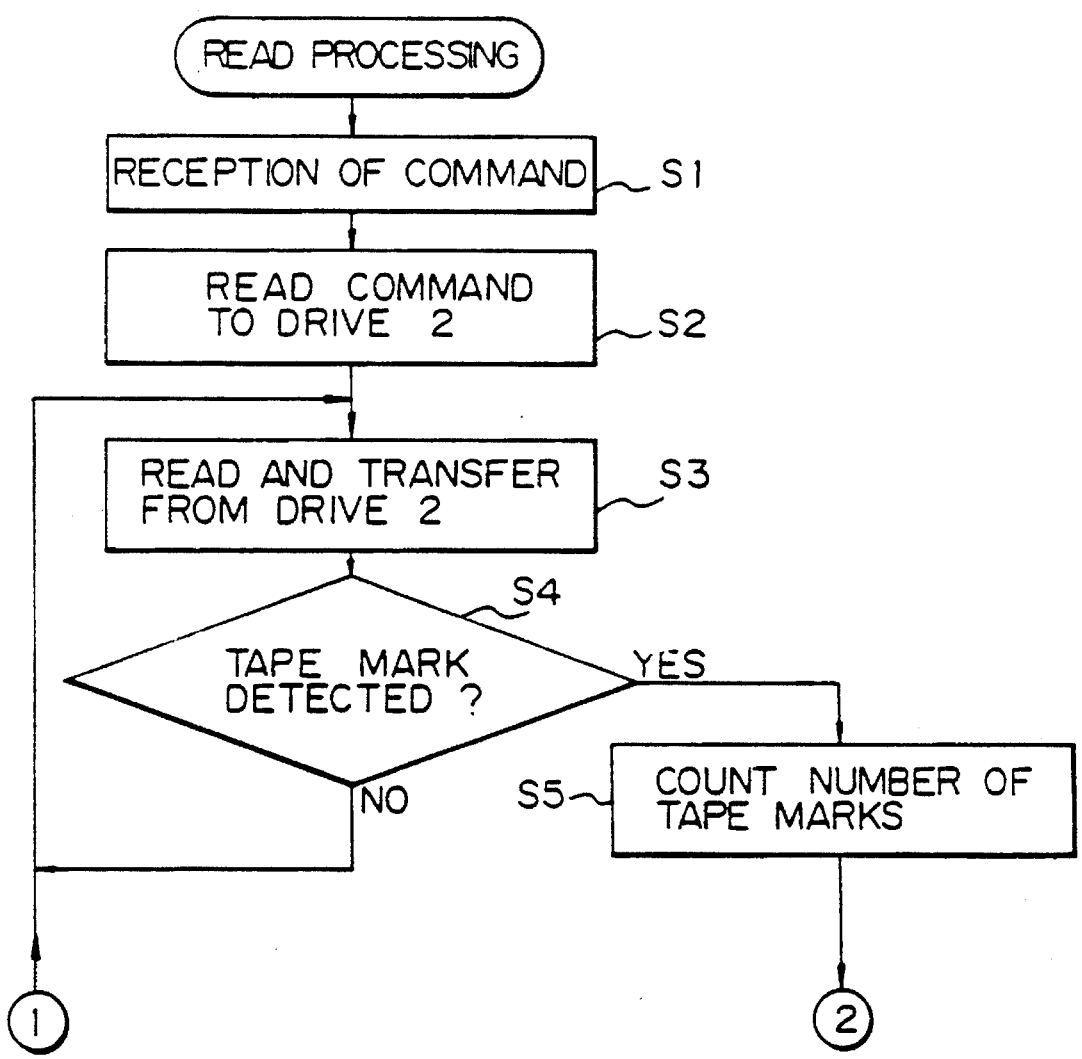

FIG. 62A and FIG. 62B are flow charts showing the read operation from the magnetic tape in the structure of FIG. 56.

In FIG. 62A, at step S1, if a read command is received, the drive unit 2 is instructed to perform reading and at step S3, processing is performed for reading and transfer from the drive unit 2.

Next, at step S4, it is checked if tape marks 12 have been detected. If tape marks have not been detected, the routine returns to step S3, where processing for reading and transfer from the drive unit is continued.

If tape marks 12 have been detected, the routine proceeds to step S5, where the number of tape marks is counted. If the count of the number of tape marks ends, then at step S6 of FIG. 62B, it is checked if the number of tape marks 12 is odd. If odd, the routine proceeds to step S7, where one file is ended and it is checked if there is a next file.

At step S8, it is checked if there is reading from a next file. If reading is to be performed, the routine returns to step S3, while if it is not to be performed, the routine proceeds to step S10, where a command is issued to stop the drive unit. At step S11, the host computer is notified of the end of the transfer, and the series of read processing steps is ended.

On the other hand, if the number of tape marks 12 at step S6 is not odd, it is deemed to be even. At step S9, the file is ended and it is checked if there is a next file. After this, the routine proceeds to step S10, where the drive unit is commanded to stop, then at step S11, the host computer is notified of the end of the transfer and the series of read processing steps is ended.

Figure 63:
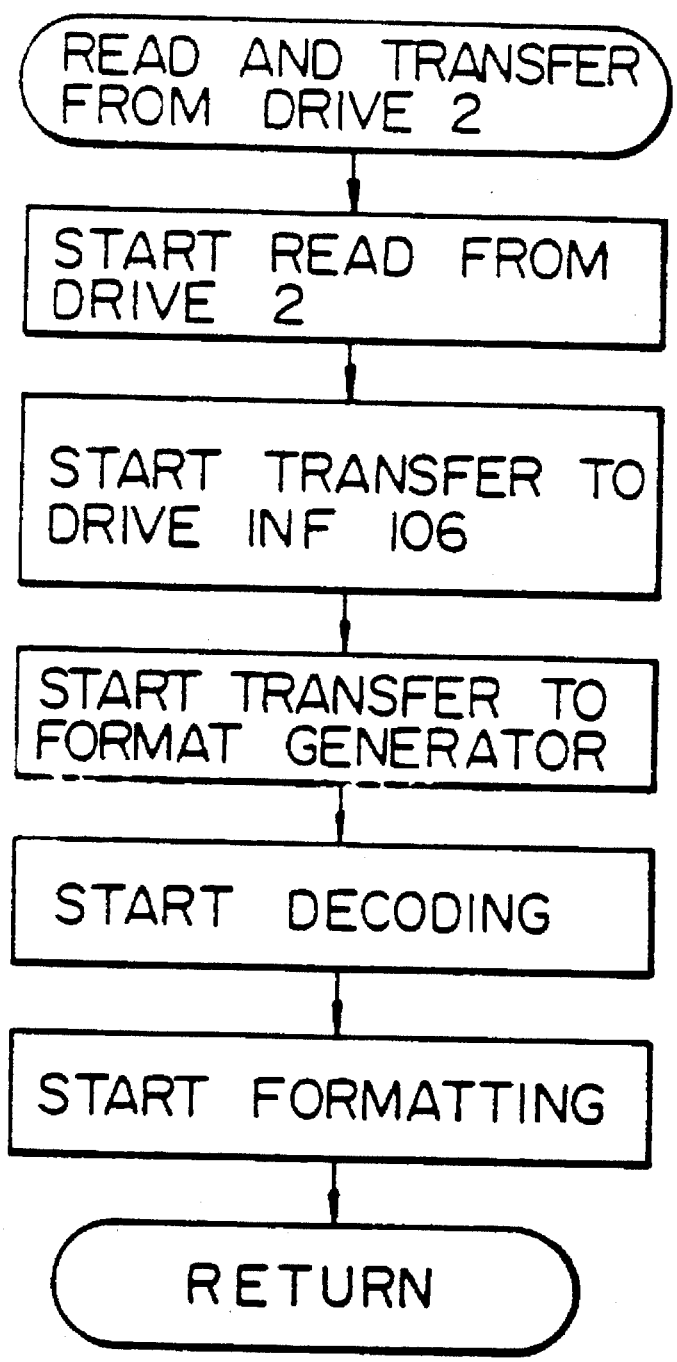
FIG. 63 is a flow chart showing details of the processing for reading and transfer from the drive unit side at step S3 in FIG. 62A.

FIG. 63 is a flow chart showing details of the processing for reading and transfer from the drive unit side at step S3 in FIG. 62A. At step S1, the reading of the drive unit is started, at step S2, the transfer to the drive interface circuit 25 is started, at step S3 the transfer to the format generator 100 is started, at step S4, the decoding is started, and at step S5 the formatting of the format circuit 101 is started.

Here, an example was mentioned where two tape marks were written as the even number of tape marks showing the final file and three tape marks were written, one more, as the odd number of tape marks indicating a file division, but so long as the relationship of the even number being less than the odd number stands, any suitable number of tape marks may be written.

As explained above, according to the structure of FIG. 54, when processing to write a number of files from a host computer to a drive unit, it is possible to divide files and distinguish the final file just by continuously writing tape marks at the file divisions. This makes unnecessary the positioning processing for returning the tape by a single tape mark, necessary in the past for dividing a file, and enables efficient write processing without stopping the transfer of data to the drive unit.

Further, during read processing from the drive unit, it is possible to reliably judge if there is a file division or if a file is the final one by determining if the number of continuing tape marks is even or odd.

By using the previously mentioned first management information table 13 (FIG. 5 to FIG. 7), a magnetic tape storage apparatus can be realized which enables extremely high speed access. An even higher speed of access can be realized in the storage control unit 3 of FIG. 8 by adding a special device to the same.

In transferring data in a magnetic tape storage apparatus of the helical scan method using a rotary head RH for the writing and reading head, the speed of transfer of the storage control unit 3 of the magnetic tape storage apparatus and the drive unit 2 of the magnetic tape is low compared with the channel transfer speed with the host computer, so provision is made of a data buffer 22 in the storage control unit 3 so as to absorb differences in the data transfer speed with the host computer by the interposition of the data buffer 22.

That is, the write data transferred after a write command from the host computer is stored once in the data buffer 22 of the storage control unit 3. When the buffer becomes full, a request for data transfer is made to the host computer. Simultaneously, a command is given for activation of the running of the tape, the write data is transferred from the data buffer 22, and the data is written on the magnetic tape 1.

If the data buffer 22 becomes empty, the running of the tape at the drive unit 2 side is stopped, the release of the request for transfer waiting is notified to the host computer, and the next transfer of data is awaited so as to repeat the same operation. If such buffer data is transferred, however, when the data buffer 22 becomes empty and the running of the tape is stopped once, before the running is resumed and writing again becomes possible, several seconds are necessary for the positioning processing for positioning to the head Hc the tape position just after the previously written data, so time is taken for the writing. If these several seconds of time can be shortened, faster speed access can be realized.

Figure 64:
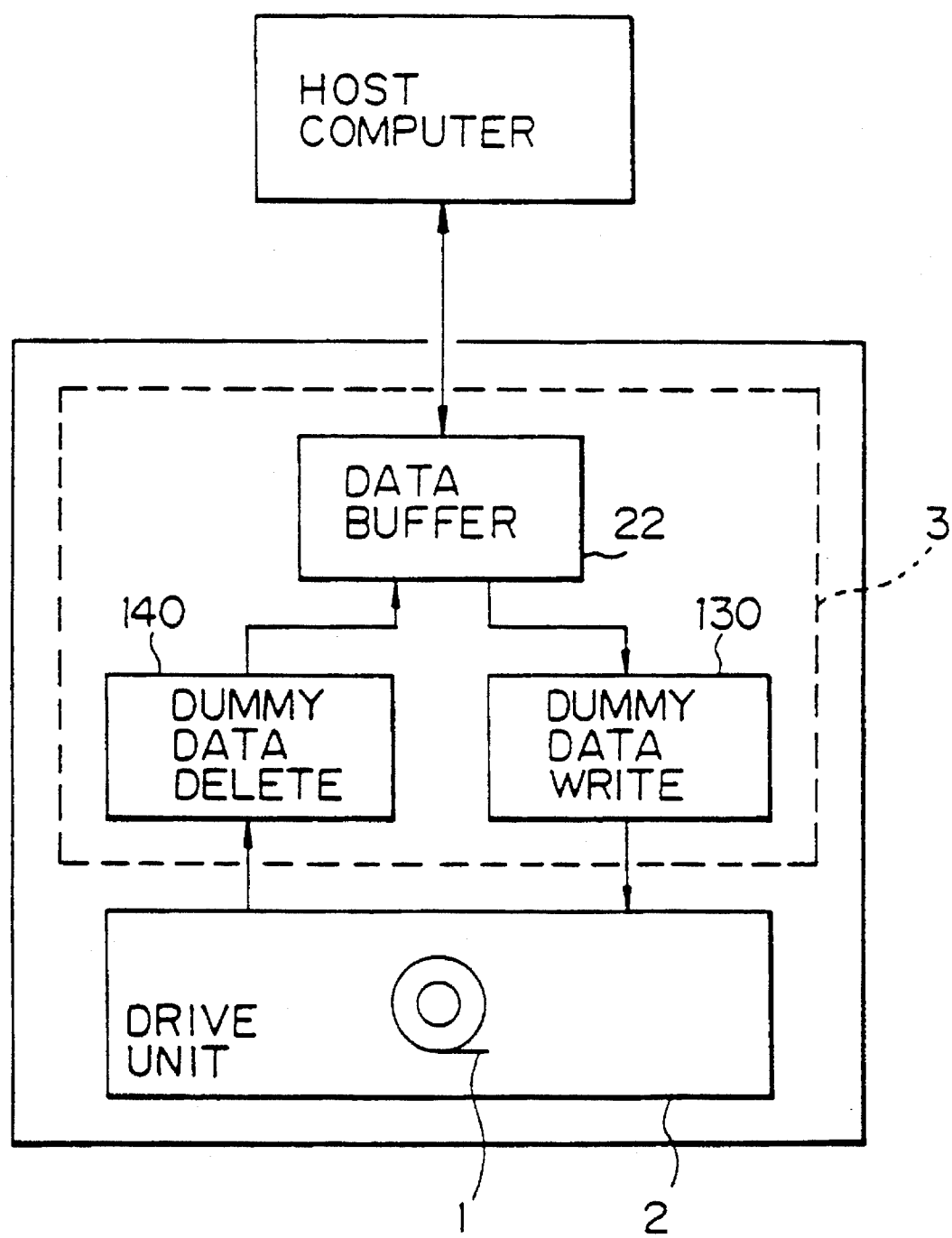
FIG. 64 is a view showing a high speed accessing device used in the present invention.

FIG. 64 is a view showing a high speed access means used in the present invention.

First, the data transferred from the host computer is stored in the data buffer 22 of the storage control unit 3, then is transferred to the drive unit 2 side and written on the magnetic tape 1. The data read out from the magnetic tape 1 is transferred from the drive unit 2 side to the data buffer 22 of the storage control unit 3 side, then transferred to the host computer.

Provision is made of a dummy data writing device 130 which transfers dummy data to the drive unit 2 side and has it written on the magnetic tape 1 when the data buffer 22 becomes temporarily empty during the transfer of data from the data buffer 22 to the drive unit 2 side during writing.

Provision is also made of a dummy data delete device 140 which prohibits the transfer of the dummy data to the data buffer 22 when detecting dummy data from the readout data transferred from the drive unit 2 side during reading.

Here, the dummy data writing device 130 adds an identification code (ID) showing that the data is valid to the head of the data transferred from the data buffer 22 and adds an ID code showing that the data is dummy data to the head of dummy data.

Further, the dummy data delete device 140 detects the ID code from the read out data transferred from the drive unit 2 and if that ID code shows the data is valid data, transfers the data to the data buffer 22. When the ID code shows that it is dummy data, the means prohibits the transfer of the data to the data buffer 22 and removes the dummy data included in the read-out data.

The dummy data writing device 130, when a notification of the end of data transfer is received from the host computer, adds dummy data for a predetermined time to the end of the data transferred from the data buffer 22.

Along with the predetermined period of dummy data added to the end of the write data, the dummy data delete means 140, when recognizing dummy data, recognizes the end of the transfer of the readout data and notifies the host computer of this when the dummy data continues for a predetermined time.

Even if the data buffer 22 becomes temporarily empty during the writing, since the dummy data is transferred, there is no apparent cessation of the data transfer to the drive unit side, so the drive unit side does not have to stop the running of the tape until the end of the writing from the host computer and it is possible to eliminate the lost time required for positioning processing at the resumption of tape running after once stopping, as had been necessary when the data buffer became temporarily empty as in the past.

Note that the embodiment of the magnetic tape storage apparatus shown in FIG. 64 is exactly the same in structure as that in FIG. 8.

Figure 65:
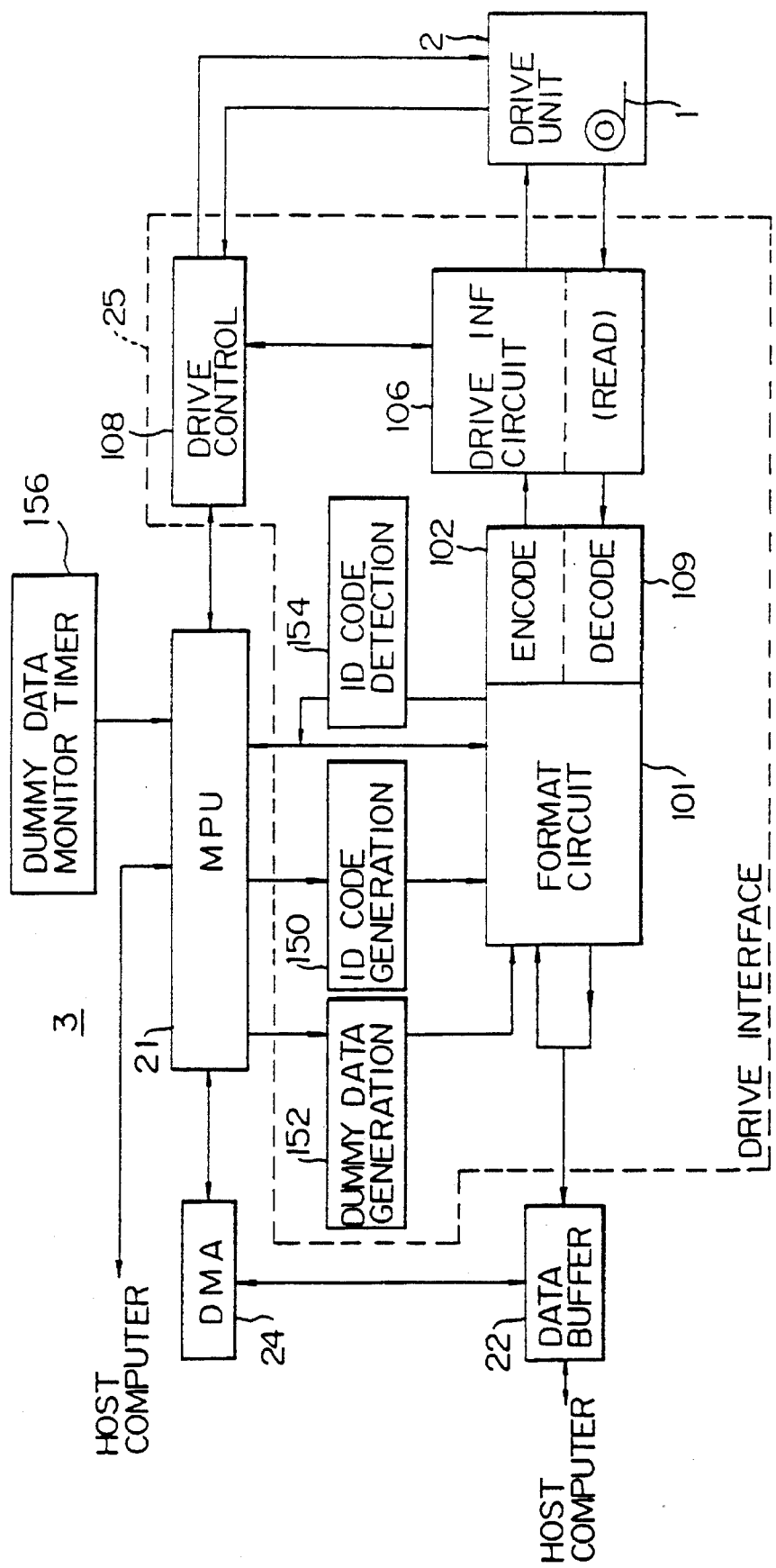
FIG. 65 is a view showing in detail an example of the portion in FIG. 8 relating to the structure of FIG. 64.

FIG. 65 is a view showing in detail an example of the portion in FIG. 8 relating to the structure of FIG. 64. The figure corresponds to the previously explained FIG. 56, except for the constituent elements given reference numerals in the 150's, which are different from in FIG. 56. These are the ID code generation circuit 150, the dummy data generation circuit 152, the ID code detection circuit 154, and the dummy data monitoring timer 156.

First, the format generator 101 performs formatting to receive related data from the microprocessor 21 and add it to the data sent from the data buffer 22.

The encoding circuit 102 converts the data output from the format generator 101 to a format which can be written on the magnetic tape, while the decoding circuit 104 converts back the data read out from the magnetic tape 1.

The dummy data generation circuit 152 receives a command from the microprocessor 21 when the fact that the data buffer 22 has become empty is detected by the DMA controller 24 and is notified to the microprocessor 21 and generates dummy data of all zeros to the format generator 101.

Simultaneously, the microprocessor 21 switches the built in multiplexer (MPX) of the format circuit 101 so as to output the dummy data from the dummy data generation circuit 152 to the encoding circuit 104 side.

The ID code generation circuit 150 receives information from the microprocessor 21 as to if the transferred data is valid data or dummy data and generates an ID code showing that the data is valid or dummy data. The ID code is added to the head of the valid data shown by DATA 1 to 3 or the head of the dummy data shown by "DUMMY" as shown in FIG. 66 in the format generator 101.

Figure 66:
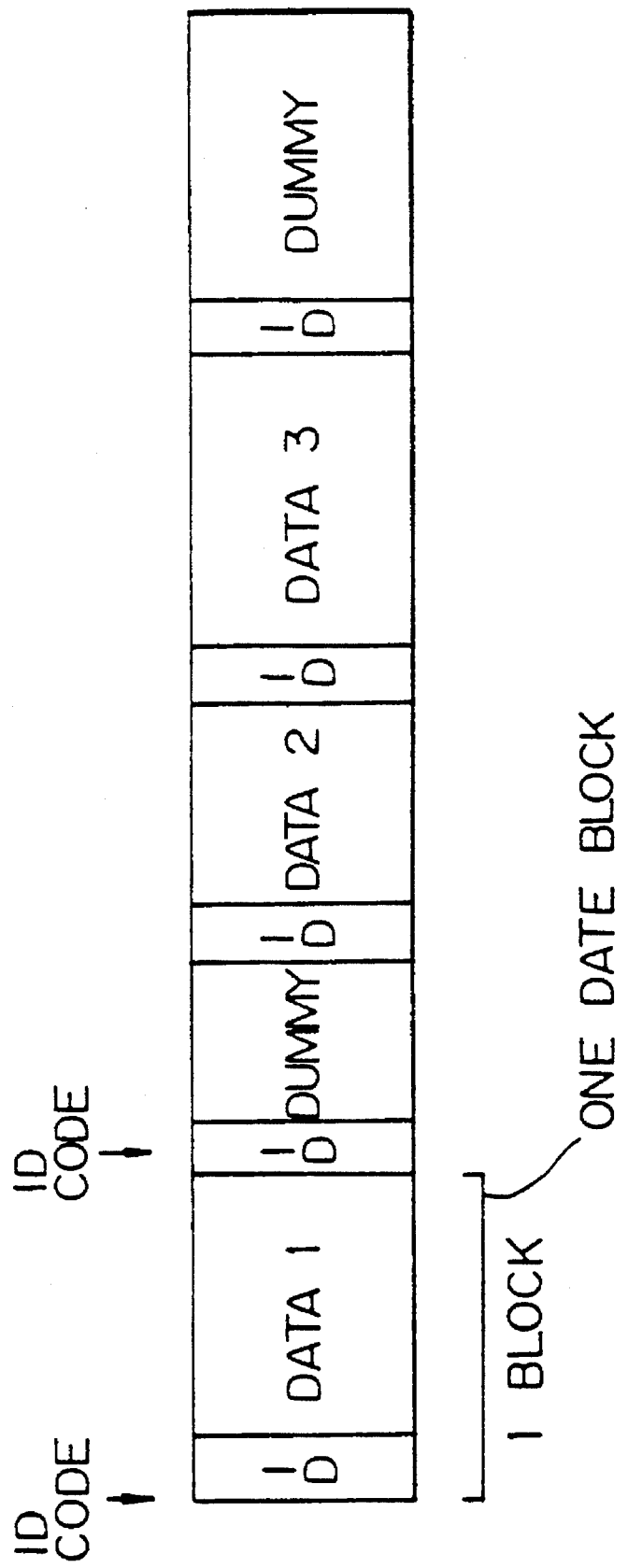
FIG. 66 is a view showing the format of data recorded on the magnetic tape in the structure of FIG. 64.

The ID code detection circuit 154 fetches the ID code added to the head of the readout data, as shown in FIG. 66, during reading of the magnetic tape 1, discriminates if the data is valid or dummy data, and notifies the microprocessor 21 of the result.

Receiving the result of judgement from the ID code detection circuit 154, the microprocessor 21 switches the multiplexer (MPX) provided at the format circuit 101, transfers the data to the data buffer 22 if valid data, and prohibits the transfer of data to the data buffer 22 if dummy data.

The microprocessor 21 is provided with a dummy data monitoring timer 156.

The dummy data monitoring timer 156 is used to monitor the time for writing dummy data for a predetermined time at the end of valid data when writing data on the magnetic tape 1 and to judge that the valid data has ended when the dummy data continues for the predetermined time when reading data.

The dummy data monitoring timer 156 may be realized by using the control storage 23 of FIG. 8.

Figure 67:
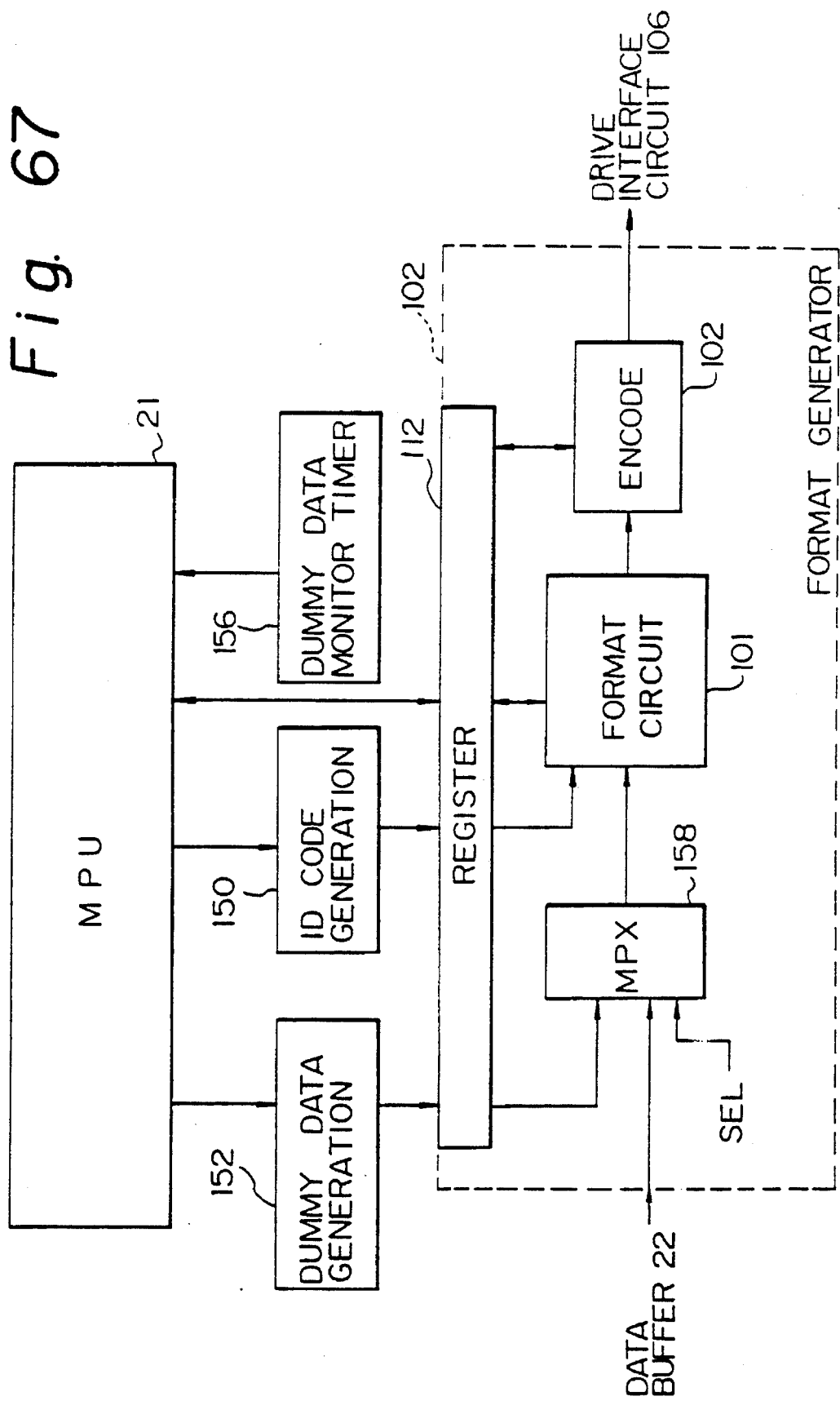
FIG. 67 is a view showing the format generator 102 in the drive interface 25 in the structure of FIG. 64 at the time of writing on the magnetic tape 1.

FIG. 67 is a view showing the format generator 102 in the drive interface 25 in the structure of FIG. 64 in the period when writing on the magnetic tape 1.

In FIG. 67, the format generator 102 is provided with a multiplexer 158, a format circuit 101, and a register 112. When writing on the magnetic tape 1, the data transferred from the data buffer 22 is input through the multiplexer 158 to the format circuit 101. Further, the output of the format circuit 101 is sent through the encoding circuit 102 to the drive interface circuit 106.

A select signal SEL is given from the microprocessor 21 to the multiplexer 158 so as to allow selection of either the valid data from the data buffer 22 or the dummy data comprising the all zero pattern from the dummy data generation circuit 152 obtained through the register 112.

The general operation when writing data on the magnetic tape 1 is explained below in relation to FIG. 67.

The data transferred from the host computer is stored in the data buffer 22, then when the buffer becomes full, is transferred to the format generator 102.

When transferring data to the format generator 102, if an empty state of the buffer is recognized by the microprocessor 21, the dummy data generation circuit 152 is activated and dummy data consisting of the all zero pattern is generated.

Simultaneously, a select signal SEL is sent to the multiplexer 158 to switch from the data base 22 side to the register 112 side. Further, the ID code generation circuit 150 is activated to send an ID code to the format circuit 101 through the register 112 and the ID code obtained through the register 112 is added to the head of the dummy data from the multiplexer 158, for formatting.

The formatted dummy data is converted at the encoding circuit 102 and recorded on the magnetic tape 1.

After an empty state of the buffer is recognized, if data starts to accumulate at the data buffer 22 in accordance with a request for data transfer to the host computer, the microprocessor 21 switches the multiplexer 158 to its original state and stops the dummy generation circuit 152. The data from the data buffer 22 is once again given to the format circuit 101 through the multiplexer 158 and writing is performed on the magnetic tape.

When the transfer of data from the host computer ends, the data buffer 22 becomes empty and the dummy data is generated, but at this time if a certain predetermined time elapses from the dummy data monitoring timer 156, a command is issued from the microprocessor 21 for stopping the drive unit 2 and the series of write processing steps is ended.

Toward this end, dummy data is always recorded for a certain time at the end of the user data written on the magnetic tape.

Figure 68:
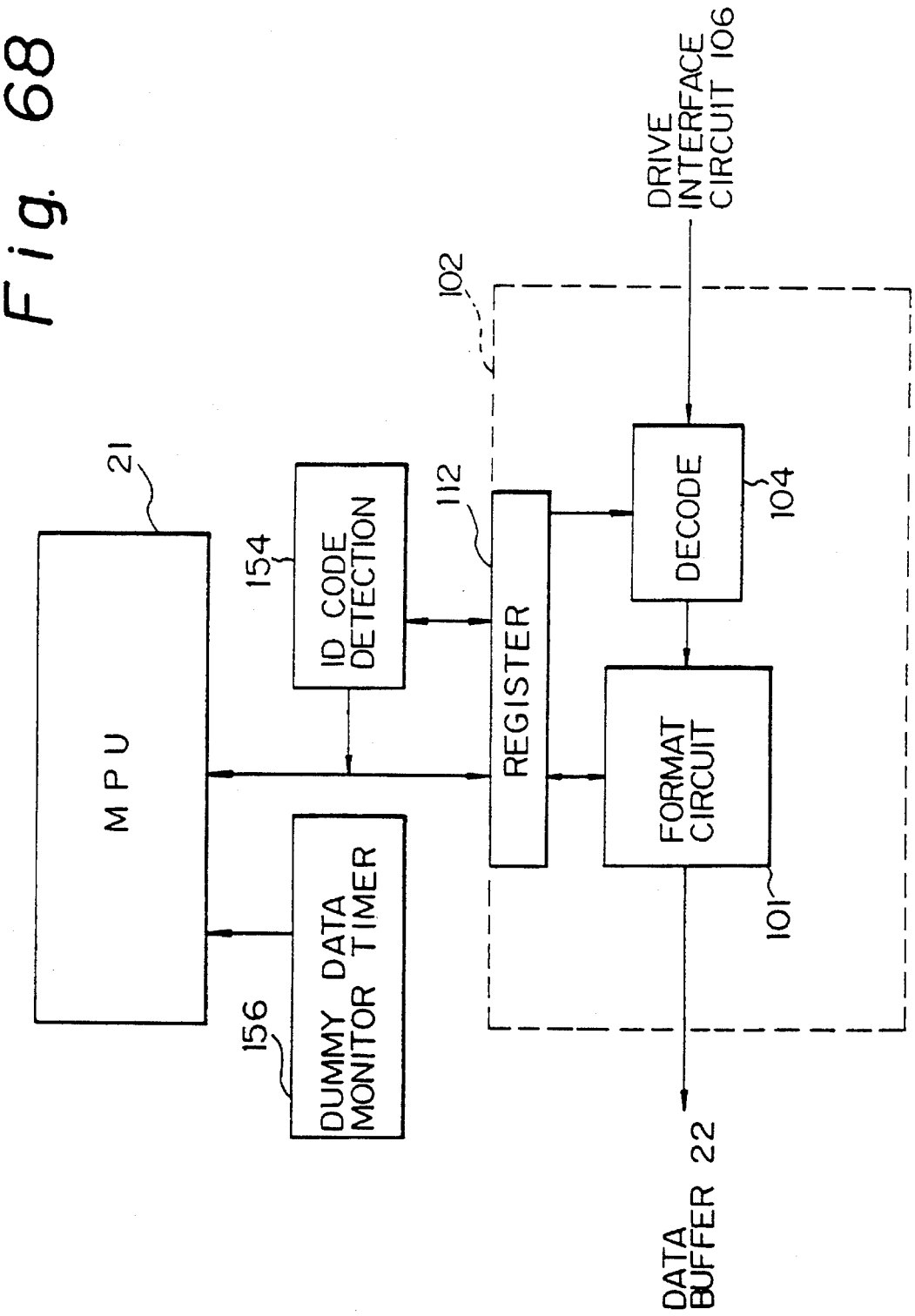
FIG. 68 is a view showing the format generator 102 in the drive interface 25 in the structure of FIG. 64 at the time of reading from the magnetic tape 1.

FIG. 68 is a view showing the format generator 102 in the drive interface 25 in the structure of FIG. 64 when reading from the magnetic tape 1.

When reading data, only the decoding circuit 104 and the format circuit 101 of the format generator 102 become effective. Also, the ID code detection circuit 154 becomes effective for the register 112.

The operation when reading data may be briefly explained as follows:

When the microprocessor 21 receives a read command from the host computer, it controls the drive unit 2 and starts the reading.

The data read from the magnetic tape 1 is input from the drive interface circuit 106 to the decoding circuit 104 of the format generator 102 where it is converted back to the format of writing, then is reproduced into the original data by the format circuit 101 and is sent to the data buffer 22.

The read-out data output from the format circuit 101 at this time is monitored by the ID code detection circuit 154 through the register 112.

The ID code detection circuit 154 judges from the ID code given to the head of the read-out data if the data is valid or dummy data and notifies the result to the microprocessor 21.

If the ID code indicates valid data, the microprocessor 21 transfers the output from the format circuit 101 to the data buffer.

On the other hand, if dummy data, the transfer of data to the data buffer 22 by the format circuit 101 is prohibited.

Further, if dummy data is judged by the ID code detection circuit 154, the microprocessor 21 monitors if the dummy data continues for a predetermined time set by the dummy data monitoring timer 156. If the dummy data continues for a predetermined time, it judges that the reading has ended and stops the drive unit 2.

Figure 69A:
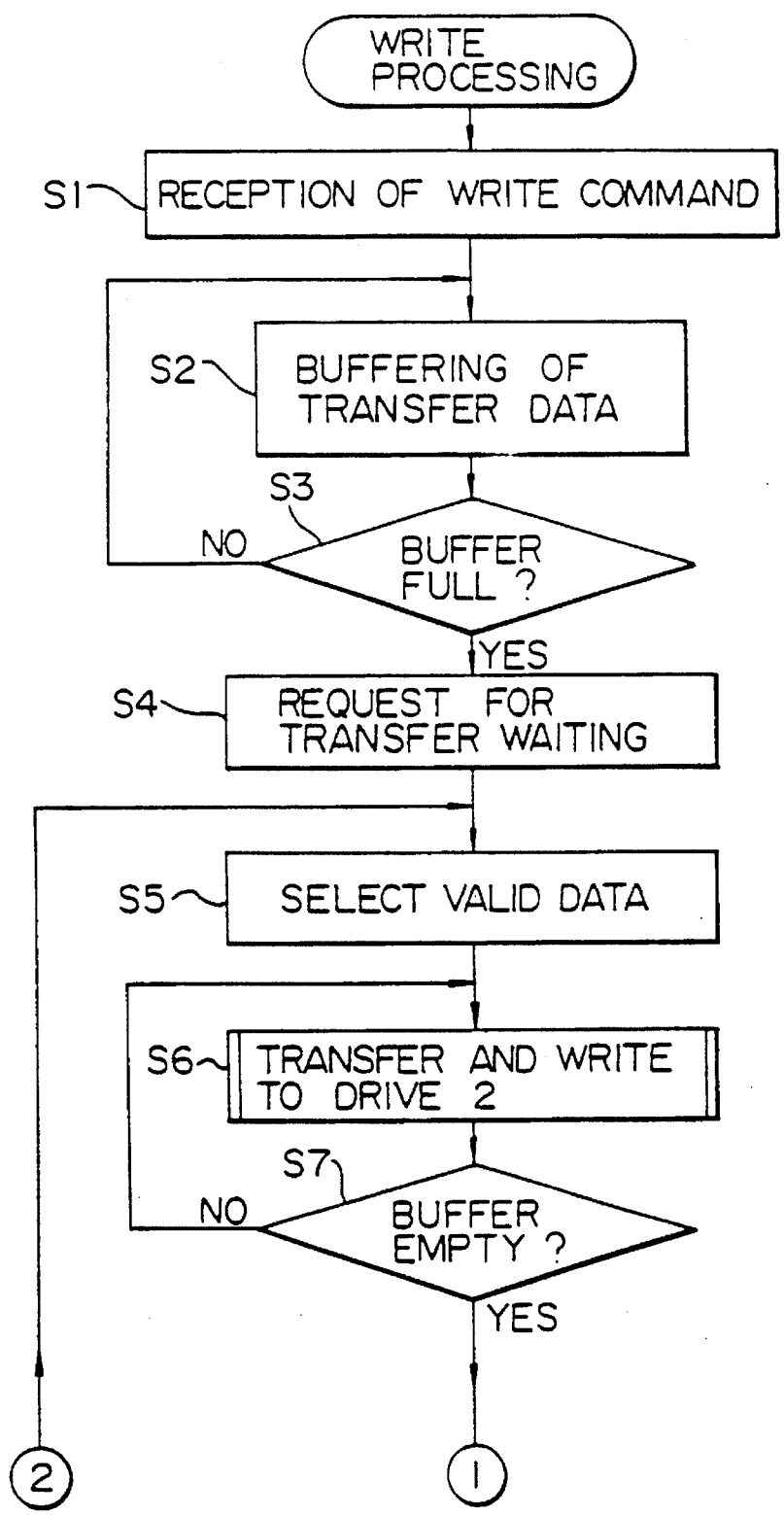
FIG. 69A and FIG. 69B are flow charts showing the write operation in the structure of FIG. 64.
Figure 69B:
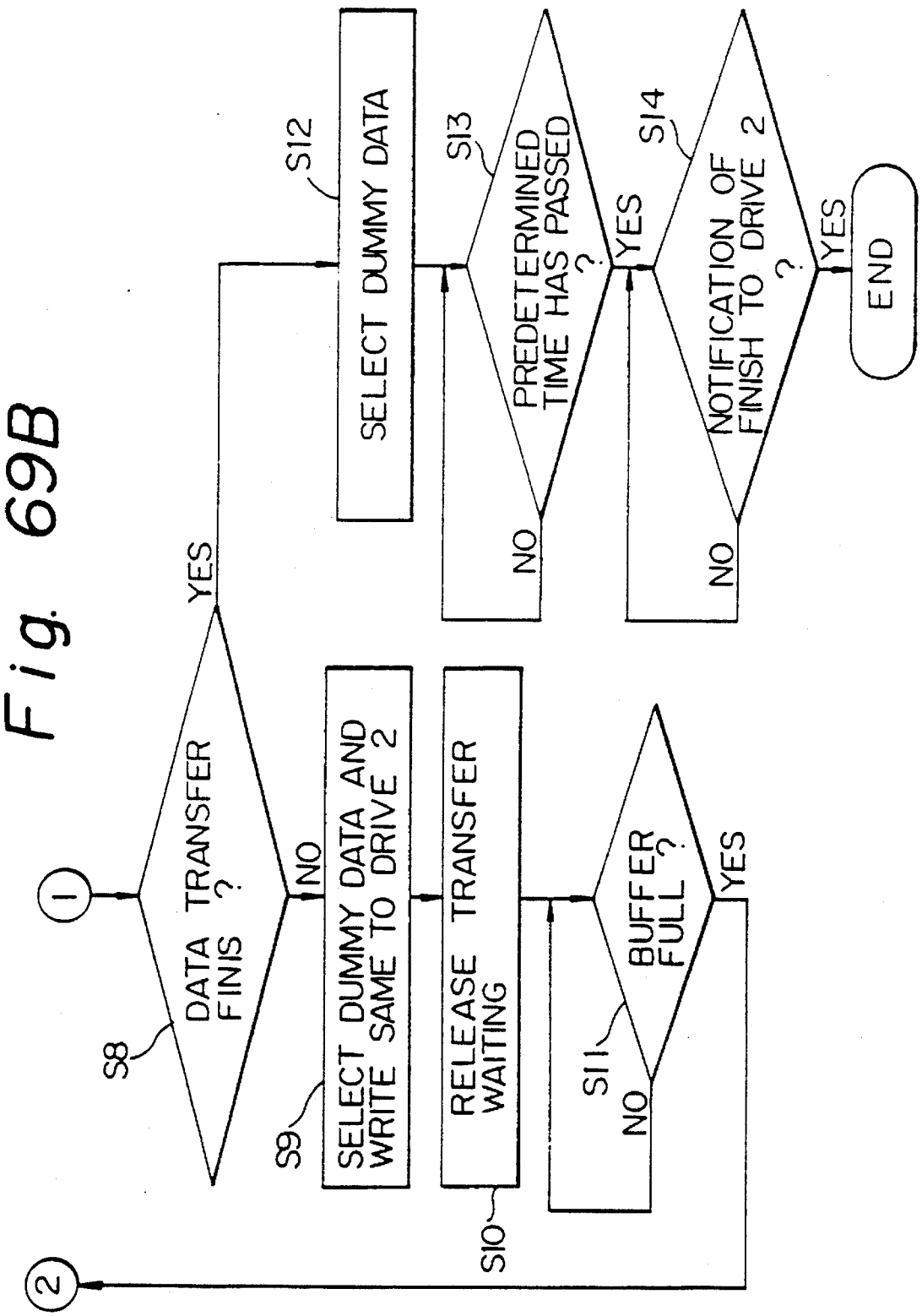

FIG. 69A and FIG. 69B are flow charts showing the write operation in the structure of FIG. 64.

In FIG. 69A, when a write command is received from the host computer at step S1, the routine proceeds to step S2, where the transferred data is buffered at the data buffer 22.

Next, at step S3, whether the buffer is full is monitored. If the data is full, a request for transfer waiting is sent to the host computer. At step S5, the valid data is selected, whereby as shown in FIG. 67, the multiplexer 158 of the format generator 102 is switched to the data buffer 22 side and transfer and write processing to the magnetic tape storage apparatus of step S6 is performed.

If it is judged at step S7 that the buffer is empty during the transfer and writing to the drive unit 2, the routine proceeds to step S8 of FIG. 69B, where the end of the data transfer from the host computer is checked for, then if the data transfer has not ended, the dummy data is selected at step S9.

By the selection of dummy data, the multiplexer 158 shown in FIG. 67 switches to the register 112 side. The dummy data of an all zero pattern from the dummy data generation circuit 152 simultaneously started up is given to the format circuit 101.

The ID code generation circuit 150 is also started up, so an ID code indicating the dummy data is given from the register 112 to the format circuit 101, the ID code is attached to the head of the dummy data, and is sent out with the same.

Next, at step S10, the release of the request for transfer waiting to the host computer is notified and the transfer of data from the host computer is restarted.

In this state, at step S11, it is checked if the empty state of the buffer has ended (if the buffer is full). If a predetermined amount of data is stored in the data buffer, the empty state of the buffer ends and the routine proceeds to step S5, where the same transfer and writing of valid data as with the initial full state of the buffer is performed.

On the other hand, if it is judged at step S8 that the transfer of data from the host computer has ended, the dummy data is selected at step S12. At step S13, the passage of a predetermined time determined by a dummy data monitoring timer 156 is monitored. When the predetermined time elapses, a stopping command is issued to the drive unit. At step S14, a notification of the end is awaited from the drive unit side and the series of write processing steps ends.

Note that details on the data transfer operation (S6) to the drive unit 2 in FIG. 69A are as shown in the flow chart already shown in FIG. 60.

Figure 70A:
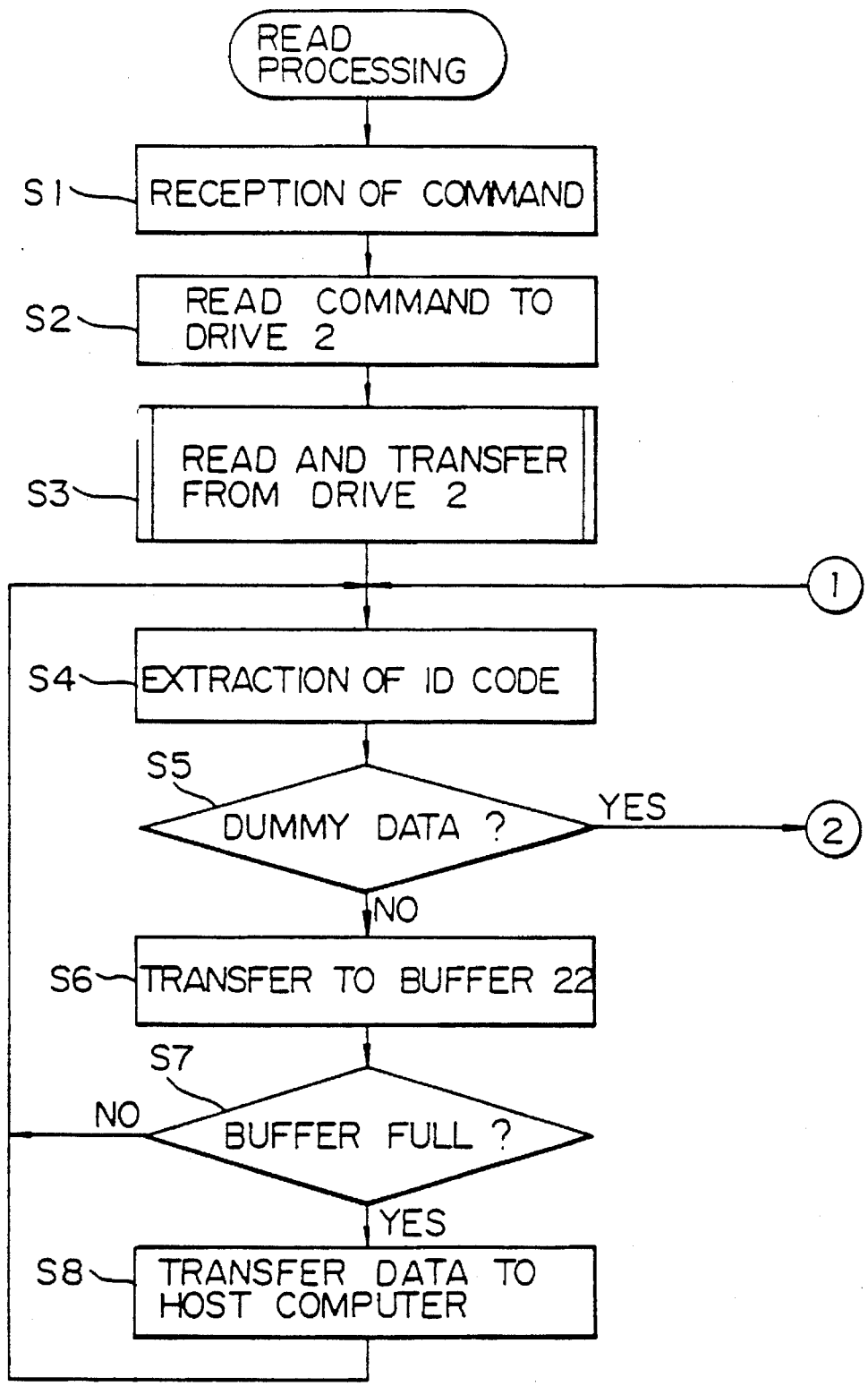
FIG. 70A and FIG. 70B are flow charts showing the read operation in the structure of FIG. 64.
Figure 70B:
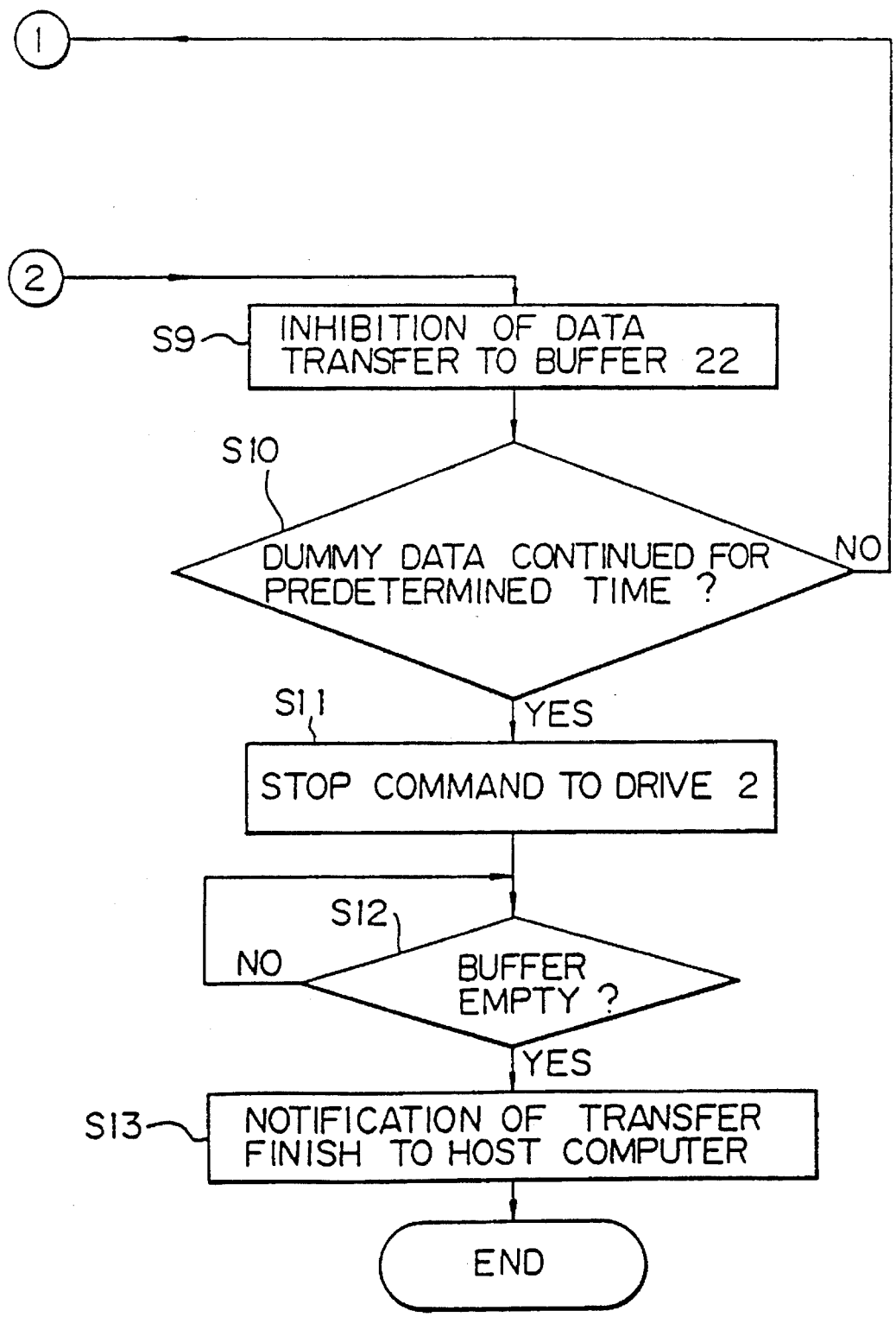

FIG. 70A and FIG. 70B are flow charts showing the read operation in the structure of FIG. 64.

In FIG. 70A, when a read command is received at step S1, read-out is instructed to the drive unit 12. At step S3, reading and transfer processing is performed from the drive unit.

Next, at step S4, the ID code is extracted and at step S5 it is checked if the data is dummy data.

If not dummy data, at step S6, the data is transferred to the data buffer 22. At step S7, if it is detected that the buffer is full, the routine proceeds to step S8, where the transfer of data to the host computer is started.

On the other hand, if it is judged at step S5 that the data is dummy data, the routine proceeds to step S9, where the transfer of the readout data to the data buffer 22 is prohibited.

Next, at step S10, it is monitored if the dummy data continues for a predetermined time. If not continuing for a predetermined time, the routine returns again to step S4, where transfer processing based on the extraction of the next ID code is moved to.

On the other hand, when the dummy data continues for a predetermined time at step S10, the read-out of the valid data ends, so at step S11, control is performed for stopping the drive unit, then at step S12, it is waited until the buffer becomes empty. At step S13, the end of the transfer is notified to the host computer, where the series of write processing steps is ended.

Note that details of the data transfer operation (S3) from the drive unit 2 in FIG. 70A are as indicated in the flow chart already shown in FIG. 63.

As explained above, according to the structure of FIG. 64, even if there is temporary empty state in the buffer 22 during transfer of buffered data from the host computer to the drive unit, since dummy data is sent, the transfer of data to the drive unit is not stopped. Even if the buffer 22 becomes empty, there is no need to stop the running of the tape and therefore the time for the positioning processing required in the past for the restart of tape running when the tape has been stopped due to the data buffer temporarily having become empty becomes unnecessary and it is possible to tremendously improve the transfer efficiency of the buffer data during writing.

Further, the dummy data included in the read-out data has no effect at all on the data transferred to the host computer since it is reliably removed at the formatting stage.

Also, dummy data may be added for a certain time at the end of valid data and the time of continuance of the dummy data may be monitored upon read-out so as to determine the end of the valid data.

We claim:

1. A magnetic tape storage apparatus including a drive unit for writing/reading information on and from a magnetic tape using a rotary head (RH) by the helical scan method and a storage control unit for controlling the drive unit, comprising:

a system area formed at a portion of the magnetic tape other than a user area where user data is recorded, said system area capable of being used only by the storage control unit;

table read-out means for reading out at least one of a plurality of management information tables relating to the magnetic tape, written in the system area, into a memory device in the storage control unit when the magnetic tape is loaded into the drive unit;

table record means, while the storage control unit refers to data of the management information tables, for performing a write/read operation on the user area on the magnetic tape, for writing status information, indicating an abnormal termination of the writing or reading of the magnetic tape, to the management information tables at a header area located at a position after a beginning of the magnetic tape and before the user area, for renewing the data of the management information tables in the memory device, and when the magnetic tape is unloaded from the drive unit, for writing the management information tables in the memory device, having the renewed data, into the system area of the magnetic tape; and judgement means for judging an existence of a tape abnormality by reading the status information from the magnetic tape when the magnetic tape is loaded into the drive unit.

2. An apparatus as set forth in claim 1, wherein said table record means writes in the management information tables the status information when the magnetic tape is unloaded from the drive unit.

3. An apparatus as set forth in claim 1, wherein said table record means further prepares a status report showing the tape abnormality to the host computer when a predetermined number of tape abnormalities have been detected or when the end of the magnetic tape has been reached and records on the magnetic tape the status information upon unloading of the tape upon a tape unloading command made from the host computer in accordance with the status report.

4. An apparatus as set forth in claim 2, further comprising means for prohibiting the write and read operations on the magnetic tape when said judgement means judges the existence of the tape abnormality.

5. An apparatus as set forth in claim 2, further comprising status information generating means for preparing the status information to include position information of the magnetic tape where the tape abnormality was detected and wherein said judgement means validates the writing and reading of the user data at data blocks other than the data block where the tape abnormality occurred, obtained from the position information.

* * * * *

UNITED STATES PATENT AND TRADEMARK OFFICE
CERTIFICATE OF CORRECTION

PATENT NO. : 5,525,902

DATED : June 11, 1996

INVENTOR(S) : Toshiya NAKAJIMA et al.

It is certified that error appears in the above-indentified patent and that said Letters Patent is hereby corrected as shown below:

Column 3

Figure 38A:
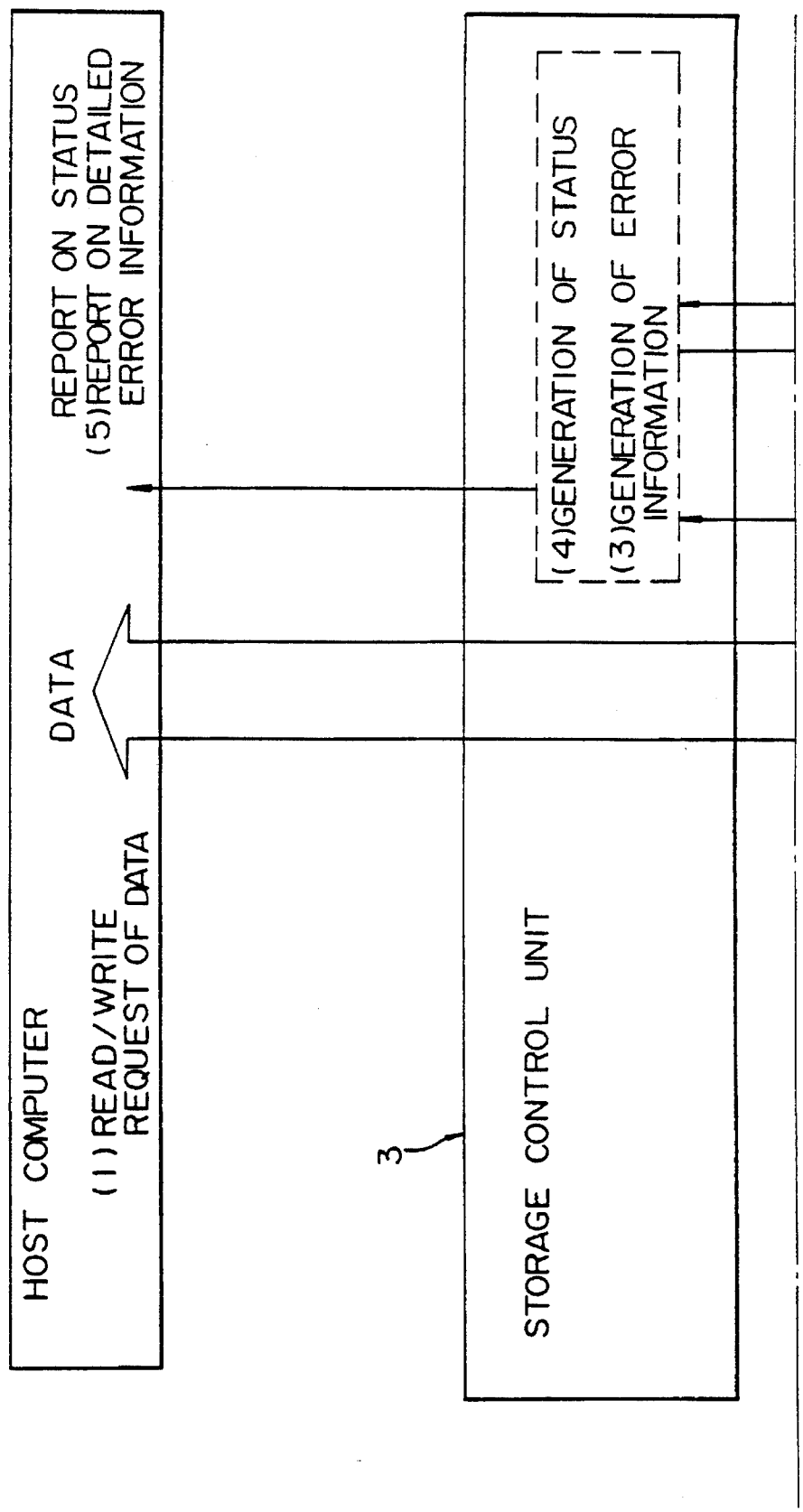
Figure 38B:
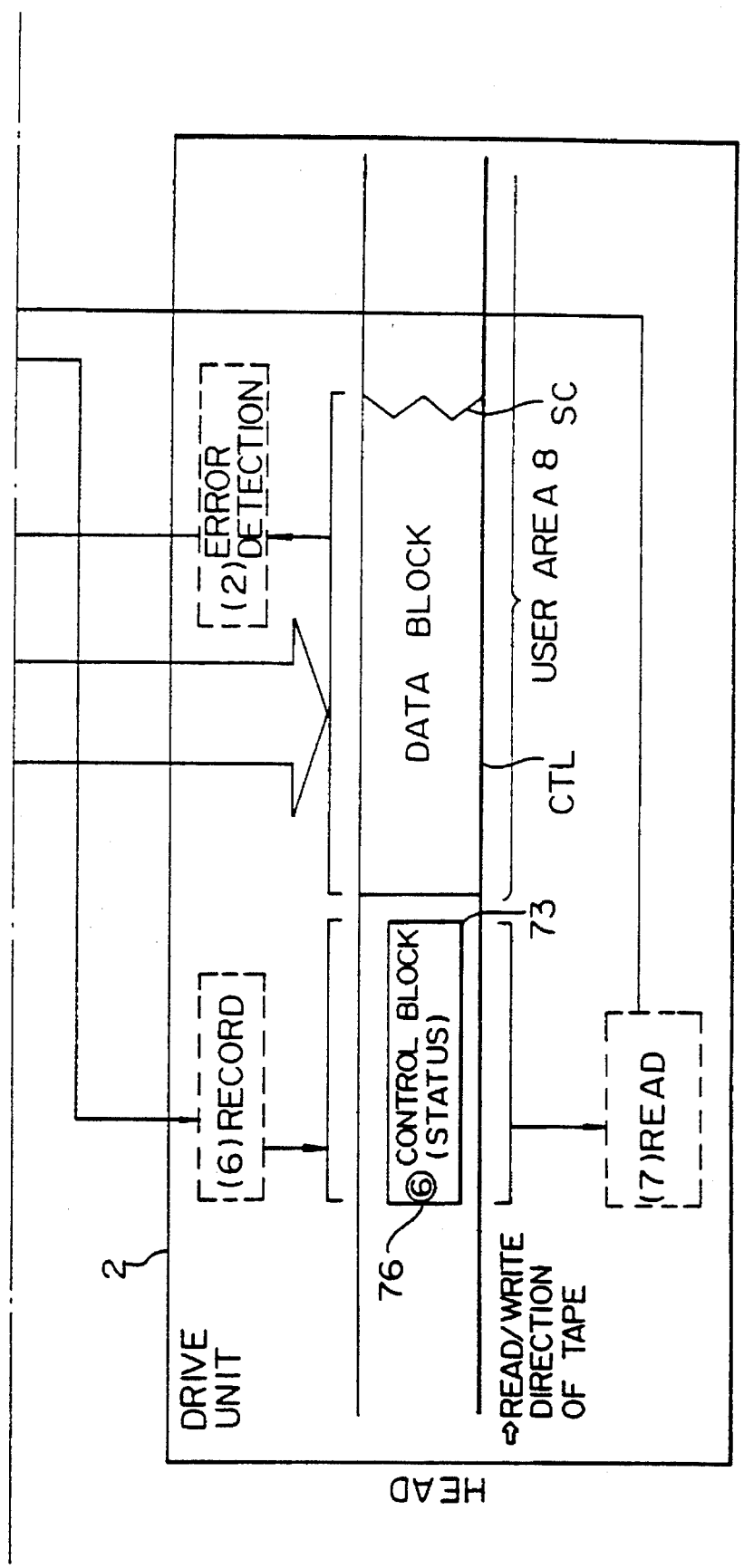

Line 31, "FIG. 35, FIG. 39A and FIG. 39B" should be --FIG. 35A and FIG. 35B--;

Line 40, "FIG. 38, FIG. 39A and FIG. 39B" should be --FIG. 38A and FIG. 38B--;

Line 65, "FIG 48, FIG. 48A and 48B" should be --FIG. 48A and FIG. 48B--.

Column 27

Line 29, "means" should be --device--.

Column 36

Line 41, "the no. 02 file." should be --the no. 2 file.--.

Column 37

Line 18, "means" should be --device--.

UNITED STATES PATENT AND TRADEMARK OFFICE
CERTIFICATE OF CORRECTION

PATENT NO. : 5,525,902

DATED : June 11, 1996

INVENTOR(S) : Toshiya NAKAJIMA et al.

It is certified that error appears in the above-indentified patent and that said Letters Patent is hereby corrected as shown below:

Column 38

Line 51, "the no. 2 file," should be --the no. 2 file,--.

Column 42

Line 41, "means" should be --device--.

Signed and Sealed this

First Day of October, 1996

BRUCE LEHMAN

Attest:

Attesting Officer

Commissioner of Patents and Trademarks